United States Patent
Weinberg et al.

(10) Patent No.: US 7,901,473 B2
(45) Date of Patent: Mar. 8, 2011

(54) PRE-BURNING, DRY PROCESS METHODOLOGY AND SYSTEMS FOR ENHANCING SOLID FUEL PROPERTIES

(75) Inventors: Jerry L. Weinberg, Gainesville, FL (US); Neil E. Ginther, Jenks, OK (US); Jed A. Aten, Covington, GA (US); Ru T. Wang, Gainesville, FL (US)

(73) Assignee: CoalTek, Inc., Tucker, GA (US)

( * ) Notice: Subject to any disclaimer, the term of this patent is extended or adjusted under 35 U.S.C. 154(b) by 1326 days.

(21) Appl. No.: 11/009,301

(22) Filed: Dec. 10, 2004

(65) Prior Publication Data

US 2005/0160667 A1    Jul. 28, 2005

Related U.S. Application Data

(60) Provisional application No. 60/529,204, filed on Dec. 12, 2003.

(51) Int. Cl.
    *C10L 5/00* (2006.01)
(52) U.S. Cl. ........ 44/620; 44/626; 44/627; 44/903; 44/904
(58) Field of Classification Search ........ 44/620, 44/626, 903, 904
    See application file for complete search history.

(56) References Cited

U.S. PATENT DOCUMENTS

| | | | |
|---|---|---|---|
| 3,954,674 A | 5/1976 | Reis | 252/502 |
| 4,076,607 A * | 2/1978 | Zavitsanos et al. | 204/157.43 |
| 4,123,230 A | 10/1978 | Kirkbride | 44/1 R |
| 4,148,614 A | 4/1979 | Kirkbride | 44/1 R |
| 4,152,120 A | 5/1979 | Zavitsanos et al. | 44/622 |
| 4,259,560 A | 3/1981 | Rhodes | 219/678 |
| 4,280,033 A | 7/1981 | Wagener et al. | 219/700 |
| 4,282,066 A | 8/1981 | Wagener et al. | 201/6 |
| 4,365,975 A | 12/1982 | Williams et al. | 48/197 R |
| 4,376,034 A | 3/1983 | Wall | |
| 4,408,999 A | 10/1983 | Nadkarni et al. | 44/627 |
| 4,678,478 A | 7/1987 | Kelland | 44/1 SR |
| 5,055,180 A | 10/1991 | Klaila | 208/402 |
| 5,393,311 A | 2/1995 | Marhanka | 44/622 |
| 5,873,982 A * | 2/1999 | Yoshimura et al. | 204/157.15 |

(Continued)

FOREIGN PATENT DOCUMENTS

| | | |
|---|---|---|
| DE | 29 07 886 A1 | 9/1980 |
| DE | 31 21 050 A1 | 12/1982 |
| DE | 32 34 315 A1 | 3/1984 |
| RU | 2096354 | 11/1997 |
| RU | 2156969 | 9/2000 |

(Continued)

OTHER PUBLICATIONS

International Preliminary Report on Patentability for PCT/US2004/041786, mailed Dec. 6, 2005.

(Continued)

*Primary Examiner* — Cephia D Toomer
(74) *Attorney, Agent, or Firm* — Strategic Patents, P.C.

(57) ABSTRACT

Measurements are taken of moisture, BTU/lb (British Thermal Units per pound), ash, forms of sulfur, volatile material, grindability, and absorption properties of any of a wide variety of mine-run solid fuels. Using that information, a dry electromagnetic process technology has been developed that can be controlled and monitored to selectively alter and enhance solid fuel properties for the application in question. Specific changes include altering the mechanical structure and chemical composition of solid fuels such as coal, coal coke or petroleum coke, increasing the BTU/lb to optimum levels, decreasing all forms of sulfur, and decreasing ash, while maintaining the BTU/lb of the fuels. A new family of solid fuel designer coals not found in nature can be produced via these methods and apparatus.

9 Claims, 12 Drawing Sheets

Handling and Processing

U.S. PATENT DOCUMENTS

| | | | |
|---|---|---|---|
| 6,068,737 | A | 5/2000 | De Chamorro et al. . 204/157.15 |
| 6,942,707 | B2 * | 9/2005 | Goraczko ....................... 44/620 |
| 2009/0038213 | A1 | 2/2009 | Weinberg et al. |

FOREIGN PATENT DOCUMENTS

| | | |
|---|---|---|
| RU | 2166751 | 5/2001 |
| WO | WO 97/07185 | 2/1997 |
| WO | WO 97/07185 A1 | 2/1997 |

OTHER PUBLICATIONS

Chironis, N. P., "Microwaves Dry Fine Coal" in Coal Age, 91(12:64-65 (1986).

Lindroth, D.P., "Microwave Drying of Fine Coal", Report of Investigations 9005, U.S. Dept. of the Interior, Bureau of Mines, 1986.

Derwent World Patent Index, WPI Acc. No. 1984-076275/198413 (English language abstract for DE 3234315 A1) (1984).

Mahadevan et al. "Pretreatment of Coal Potentiality of Microwave and Gamma Ray Pretreatments in the Desulphurization, Demineralization and Comminution", Erdoel Erdgas Kohle, Urban Verlag, DE, 48(1):33-38 (1995).

International Search Report for PCT/US2004/041786, mailed Apr. 25, 2005.

Written Opinion for PCT/US2004/041786, mailed Apr. 25, 2005.

Spear, Charles E., "Stabilization of Low Rank Coals After Drying", Feb. 27, 1997, WO 97/07185.

* cited by examiner

Handling and Processing

Process System Elements

PRE-BURNING, DRY PROCESS METHODOLOGY AND SYSTEMS FOR ENHANCING SOLID FUEL PROPERTIES

RELATED APPLICATION

This application claims the benefit of U.S. Provisional Application No. 60/529,204, filed Dec. 12, 2003, the entire teachings of which are incorporated herein by reference.

BACKGROUND

More than one-half of the electricity consumed in the U.S. is currently generated by inefficient coal-burning utility plants. In spite of the increased use of oil and gas resources, the low cost, ready and widespread availability, large reserves of coal, and large coal industry workforce ensure that coal will remain a significant resource for industrial purposes, and, especially, for worldwide energy generation for the foreseeable future. However, coals are extremely diverse and heterogeneous and generally contain significant amounts of moisture, ash, sulfur, and mineral impurities, all of which detract from its current potential to be an efficient and clean-burning fuel.

The literature of science and technology, process engineering, and patents is replete with failed attempts to improve the overall combustion properties of solid fuels. Physical and chemical methods and even biological organisms are used in coal cleaning and waste removal. Coal washing is widely used to remove the higher specific gravity ash and pyritic sulfur, but typically results in the loss of up to 20% of the coal in the process. Various but costly methods of coal drying are used in an effort to increase the BTU/lb (British Thermal Units per pound) of the coal, and many methods have been investigated in an effort to significantly reduce sulfur.

The burning or combustion of coal, even higher ranks such as anthracite and bituminous, generates significant emissions and is of increasing concern due to environmental and global warming considerations. The burning of high-sulfur coals has inflicted a heavy toll on the atmosphere in eastern Europe, China, and elsewhere, and is in large measure responsible for the widespread but unsuccessful efforts over the past 25 years to find an efficient and affordable means of desulfurization. Much of this effort has involved electromagnetics; viz, the use of ultraviolet, optical, infrared, radio, microwave, x-ray, and even gamma ray frequencies and combinations thereof. Most have met with failure. In fact, there is to our knowledge no single, effective and economically viable pre-burning process technology in commercial practice, electromagnetic or other, for removing sulfur or any of the other major constituents of coal.

The presence of moisture, ash, sulfur and other constituents in varied amounts in all coals results in a variety of problems when coal is burned or otherwise heated for any purpose. Noxious gases, such as nitrous oxides ($NO_x$) and sulfur oxides ($SO_x$), resulting from coal burning have adverse effects on the environment, including acid rain, smog, unhealthy air laden with sulfur (resulting in the common yellow sky color in large regions of China), and the deposition of toxic particulates, some carried far from their origins by upper air currents. Further, coal burning leaves behind inorganic ash with its trace elements such as mercury, the consequences of which are seldom considered when ash is handled or used as a filler in widespread and long term applications such as road building and repair. There is now added concern due to the large amounts of carbon dioxide ($CO_2$) generated during coal burning, which contributes significantly and directly to global warming. Finally, the presence of significant moisture in many coals results in inefficient burning, leading to the burning of more coal and the consequences of increased emissions thereby. Relatively little emphasis has been placed on de-moisturization (i.e., contributing to the increase in BTU/lb, which directly results in being able to burn smaller amounts of coal to generate the same amount of energy and thereby, in itself, reducing all emissions therefrom).

Numerous attempts have been made over the years to remove or otherwise reduce the amounts of ash and sulfur in coal and thereby reduce the various forms of contamination by improving the quality and combustion characteristics of coals. Unfortunately, such attempts have proved to be time consuming, costly, and impractical.

For example, attempts have been made to "wash" the coal prior to combustion. These attempts can be expensive and require extensive plant equipment additions and modifications. In washing systems, the coal must be crushed or sized using screens, pulverizers, ball mills, crushers, or other similar types of grinding equipment prior to being fed to the washer. Typically, reducing the size of the coal using such types of equipment involves relatively heavy and large equipment that is expensive to purchase, maintain, and operate.

In other examples, cleaning systems and methods involve extensively drying the coal using centrifuges, rotary drum filters, fluidized bed dryers or other similar types of drying equipment prior to burning or combusting the coal or fuel. Typically, drying the coal using such types of equipment involves complex or multiple stages of equipment that are also expensive to purchase, to maintain, and to operate.

Other attempts utilize the addition of one or more catalysts to the coal, in an effort to reduce the amount of unwanted by-products created in the combustion of the coal. For example, certain types of catalysts added to coal can reduce the amount of sulfur emitted during the combustion of the coal. These attempts are also aimed at improving the combustion characteristics, such as increasing the BTU/lb, of the coal to be burned. However, these attempts can create a different set of by-products that can be hazardous and expensive to dispose of or to store.

In the absence of pre-burning solutions to this long-standing problem, post-burning scrubbing is currently the preferred methodology of the coal-fired electric utility industry. For example, scrubbers have been installed to clean post-combustion flue gases, removing $SO_x$ and NO, compounds from the flue gases. This type of equipment and other similar systems and processes are expensive to install, maintain and operate. Unfortunately, this does not solve the $CO_2$ problem, and recent efforts to capture and re-route $CO_2$ gases do not appear promising or practical.

Finally, many coal-burning utilities blend low-sulfur coal with high-sulfur coal to reduce overall sulfur so as to meet the government-regulated index of pounds of $SO_2$ per million BTUs. This generally requires long distance transportation of heavy, moisture-laden coals with transportation costs often equaling or exceeding the cost of the coal.

SUMMARY

Described herein are methodologies, systems, and processes that employ electromagnetic energy (e.g., microwave energy) to alter the mechanical structure of coal and to separately and/or collectively alter the core coal constituents by design to enhance the combustion quality of coal fuel (e.g., decrease moisture and increase BTU/lb to optimum levels for the application in question, decrease all forms of sulfur, including the more difficult to remove organic sulfur, and decrease ash, while maintaining or improving the heating value of the coals).

Embodiments of the present invention can be designed for the type of coal and the changes in properties being sought. The systems can be modular, scaleable, and portable or fixed and can be used at in-line or off-line locations for underground or surface mining or at utility plants. Process parameters can be selected to fit the requirements of specific applications, while removing and collecting valuable by-products such as water, sulfur, and ash. On-line and off-line methods can be used to determine the properties of the processed coal, with feedback systems used to change process control parameters such as dwell time (flow rate), power, airflow, etc., to obtain the pre-selected fuel enhancement properties desired and not over- or under-process.

The process begins by gathering information on a particular coal including its location (mine mouth, surface mine, river blending facility, or utility plant anywhere before the final grinding, etc.) Another consideration is the purposes for which the processed coal will be used (for example, more-efficient and cleaner fuel can be used for coal-fired utility boilers, low-sulfur and high-volatility fuel can be used for steel and other processing, special-purpose fuel for chemical processing, etc.) and the properties being sought. Next, the tonnage amounts being considered for processing and any existing handling procedures that need to be considered, such as grinding or screening of the coal, are identified. Next, samples of the raws are measured to determine their properties. Finally, a system is designed to provide the specific processed fuel properties being sought. The system design parameters that can be pre-set or varied in real time include: the capacity of the coal-input handling system to accommodate the amounts and sizes to be fed into the processor; the size, form and type of process chamber/conveyor system to handle the sizes and flow rate(s) required in the time allotted or required for processing; the electromagnetic frequency or frequencies and power levels and the durations required to obtain the properties being sought for the coals in question; and the penetration depths required to assure that the coals are processed on average to the extent required.

The electromagnetic, pre-burning, dry and single-stage coal process technology has been shown to: alter the mechanical structure of coals, and, thereby, significantly increase grindability; decrease moisture and increase BTU/lb to optimum levels for the application in question; decrease all forms of sulfur, including the more difficult to remove organic sulfur; decrease ash; and significantly decrease the lbsSO$_2$/MMBTU emissions index, while maintaining the heating value of the coals. Moreover, unlike many earlier attempts, the coal can be processed via these methods without forming a slurry or otherwise adding a solvent or other liquid before irradiating the coal. The methods described herein can also go well beyond simply removing sulfur or any other single component from the coal, as attempted in previous methods; instead, the methods can be used to achieve targets with respect to each of a variety of coal properties, such as those identified above.

The process methodology, discussed herein, has the ability to vary process parameters so as to target specific combustion properties of solid fuels. For example, it can effectively target a specific reduction in moisture and a resulting relatively narrow range of BTU/lb even for a coal batch (every coal batch) with samples having a distribution of sizes and properties.

Representative results on demoisturization are attached, representative but not "best", results compiled to show the broad applicability of the process. The results have been arranged in order of increasing % moisture reduction to give further evidence of the fact that with these methods and apparatus, any coal can be processed to a desired level of moisture reduction. Further, with straightforward pre-processing tests we can also assess the amount of ash and sulfur in the raw coals and how a particular coal will react to the process technology, the result being that the system can, if desired, also improve other combustion properties of coal.

The material listed and described here further demonstrates that these systems, designed and operated in batch or continuous mode, can provide the demoisturization or other coal combustion properties sought; specifically, coals with %  moisture reduced to any desired level in any rank of coal down to about 1% or less;

BTU/lb increased in any rank of coal to any level up to at least the level it would have for zero % moisture or by at least 1,000 BTU/lb (since the process also reduces % ash and % total sulfur, their contributing to a further increase in BTU/lb);

% ash reduced in any rank of coal (e.g., by at least about 2%); in particular embodiments, reductions range from approximately 10% to more than 50%; and each and every form of sulfur reduced (e.g., reductions of at least about 2% of the total sulfur, at least about 3% of the pyrite, at least about 5% of the sulfate, and at least about 1% of the organic sulfur); in particular embodiments, total sulfur is reduced by 25% to 50% and, for some coals, even more.

Further, with these systems and methods, the risk of arcing (and ignition) can be reduced or removed. While small-sized pieces and sample sizes were previously employed to try to reduce the risk of arcing, the use of on-line measurements, monitoring, and feedback systems along with the accompanying adjustments in power levels, airflow levels and dwell times to control surface temperature serves to reduce arcing in embodiments of the methods described below.

Further still, the inventors' improved understanding of how electromagnetic energy penetrates coal and the greater penetration depths achievable at higher power levels opens the door to effectively processing greater (e.g., commercial level) through-put rates of coal and coal having greater particle sizes.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

DETAILED DESCRIPTION

I. The Coal

A. General

Figure 1:
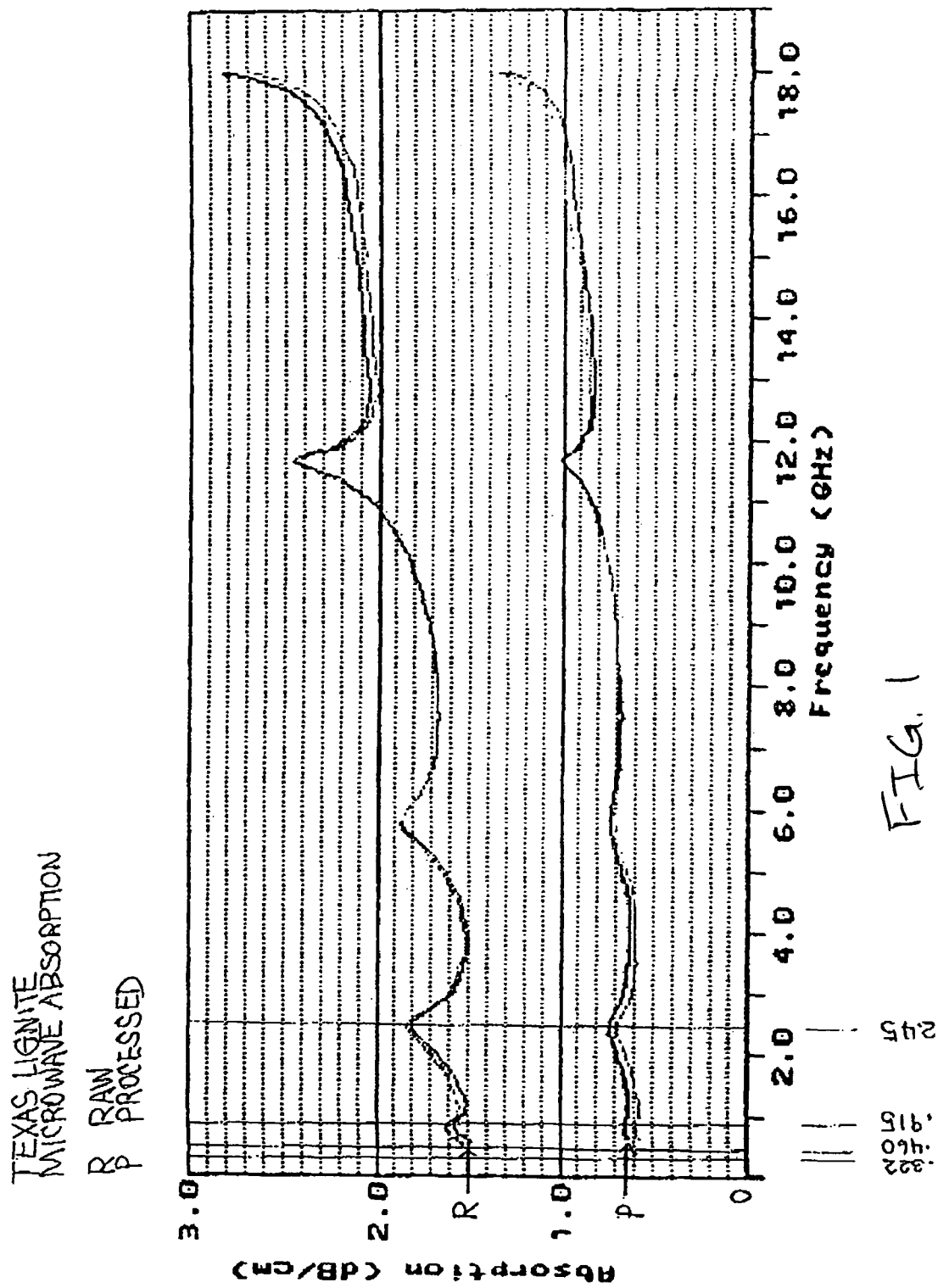
FIG. 1 is a plot showing electromagnetic-radiation absorption in a particular lignite as a function of frequency.

Coal is a combustible fuel formed from fossilized plants; coal comprises amorphous carbon combined with various organic and some inorganic compounds. As described by Harold H. Schobert in "Coal, the Energy Source of the Past and Future" (American Chemical Society, 1987), the entire teachings of which are incorporated herein by reference, "[c]oal ranges from a soft, moist, brownish material to a very hard, glossy, black solid," and its physical and chemical properties can vary considerably depending on how, when and where the materials were deposited, the types of organic material present initially, and its alteration over time. Therefore, it has been necessary to classify and standardize coal types and properties in order to mine, trade, and use coal in commercial practice. Coal has been divided into the following major "ranks" from poorest quality to best quality, respectively:

1) brown coal;
2) lignite;
3) subbituminous coal;
4) bituminous coal; and
5) anthracite.

Brown coal has a very high moisture content, with low BTU/lb values (around 3000 BTU/lb) as mined. Lignite is a class of brownish-black coal having a moisture content ranging from 20% to over 50% and BTU/lb ranging from the high 4000's to approximately 7000. Subbituminous coal is a black coal without the woody texture found in lignites; subbituminous coal has high moisture (typically 30% to 35%) and BTU/lb bridging the gap between lignites and bituminous coals. Bituminous coal is a soft coal having the widest variation in chemical composition; bituminous coal can vary from 5% to 20% moisture and has levels of BTU/lb anywhere from 10000 to more than 14000. In the United States, bituminous coal is found primarily in eastern fields. Anthracite coals are very hard and have relatively low moisture content (typically <5%) and BTU/lb in the 14000 region, as mined. Each of these ranks has been still further divided into sub-categories (ref. ASTM, 1981, D-2796, and the U.S. Geological Survey). In all cases, coal is found to vary from mine to mine, from seam to seam, and within each seam, often varying significantly.

The maximum ranges of variability for coals of all ranks, generally speaking, are:

| | |
|---|---|
| BTU/lb | <4,900 to >15,400; |
| moisture | <3.0% to >50%; |
| ash | <3.0% to >35%; and |
| total sulfur | <0.25% to >6.0%. |

Within an individual mine: BTU/lb can vary by as much as 2,500; moisture can vary by as much as 13%; ash can vary by as much as 13%; and total sulfur can vary by as much as 3%.

Because coals are highly variable in appearance, composition, and properties (from brown coals to lignites to sub bituminous to bituminous to anthracites and within each rank and within each mine or seam or handful), generalizing as to how to enhance a particular coal's properties as a fuel is difficult and usually unreliable. Here, coals are uniquely evaluated on a case-by-case basis.

B. Coal Database

A database has been assembled of measurements on a wide variety of raw and processed coals including, but not limited to, low-sulfur coals from Australia, the People's Republic of China, and South Korea, a variety of coals from India, and coals from Canada and the United States (including Alabama, Florida, Illinois, Ohio, Oklahoma, Pennsylvania, Texas, and Wyoming).

All mine-run coal batches were first tested to determine their average properties. To best approximate commercial practice, additional but separate mine-run samples were selected from each batch for processing; i.e., samples were selected that had not first been altered in any way. With such a procedure, enough samples were selected to insure that their properties were representative of mine-run coals on average.

A self-consistent, statistical sampling method has been used to study hundreds of raw and processed samples as to their visual appearance, color, hardness, uniformity, sizes, and weights and, for processed samples, their surface and internal temperatures. A portion of this database comprises test results from Standard Laboratories of South Charleston, W. Va., USA, on some 450 raw and processed samples, wherein the sample measurements included percent moisture, percent ash, percentage of volatiles, fixed-carbon percentage, BTU/lb (as received, dry basis, moisture and ash free; defined below), forms of sulfur (percent each of total sulfur, pyrite, sulfate, organic sulfur, as received and dry basis), Hardgrove grindability index (HGI), total mercury, ash fusion temperatures and ash mineral analysis.

C. Test Procedures and Definitions for Evaluating Coal

The first step was to pulverize the sample and use a small part to determine the percent moisture. Then another part of the same sample was used to determine the percent ash ("as received" means that nothing was done to the sample before it was tested). "Dry basis" is a calculated value that takes the as-received measurement and adjusts it to what it would be if there was no moisture in the sample. BTU/lb is calculated in the same manner; i.e., the value is determined for part of the as-received sample and then calculated on the basis of there being no moisture (dry basis). Then a similar calculation, "M-A free," is performed for what the value would be if there was no moisture (M) and no ash (A). "Forms of sulfur" is similarly determined for the as-received samples and then also calculated on a dry basis.

Random sampling was carried out and comparisons were made between visual characteristics and measured properties in both batch and continuous processing modes, to give further confidence that the results are representative of that which would be obtained from processing commercial scale amounts (tens to hundreds of tons per hour and more).

As part of assembling the database, laboratory measurements were made on a variety of raw and processed coals and on their separate constituents such as ash, pyrite and organic sulfur. Measurements included absorption and reflection over a broad range of electromagnetic frequencies. A dielectric-properties monitoring system was used to measure changes in dielectric properties of coals, such as the changes that occur as a result of process effects on chemical composition. The dielectric properties influence how the material will respond to the electromagnetic radiation.

Small quantities of various coals were first tested in a specially designed, free-space microwave configuration, wherein a waveguide was used to take microwave radiation out of a microwave chamber onto an open surface, where small samples can be irradiated at varying low-power levels and times and can be observed, monitored and weighed. Next, larger samples were tested in various microwave oven chambers. These oven systems were of different chamber sizes with the capability to vary the power and time applied. When it was observed that most of the fuel properties for small and intermediate coal sample sizes (up to 5 pounds) were improved, a larger chamber system was designed to vary the range of power able to be applied and to provide the capability to process the samples up to approximately 40 pounds in batch mode (see the apparatus illustrated in FIGS. 13-15). When these tests provided the same enhancements in fuel properties that were sought and obtained with smaller process systems and smaller samples, further scale-up steps were undertaken by designing a continuous, flow-through process system able to process approximately 1000 pounds per hour (see FIGS. 5-12). Process tests with the flow-through process system demonstrated that fuel properties could be altered as in smaller sample size batch-mode process tests; i.e., the subject process methodology can be readily adapted to a wide range of coal types and flow rates required, while obtaining the desired fuel enhancement properties.

II. Process Methodology

A. Outline of Overall Process

The sequence of steps in the overall process can be outlined as follows.

1) Measurement of Electromagnetic Absorption by Coals and by Their Constituents Over a Wide Range of Electromagnetic Frequencies Having selected electromagnetic radiation as the core active agent for processing solid fuels/coal, it is necessary to understand its effect on coals and on their separate constituents. This information can be obtained from measurements of electromagnetic absorption and reflection and, especially, permittivity of the materials. Permittivity is an intrinsic property of a material and it can be used to predict the response of a material to microwave or any other electromagnetic radiation. The terms "electromagnetic" and "microwave" radiation are used somewhat interchangeably throughout this discussion. In all cases, the available range of electromagnetic radiation includes frequencies recited elsewhere herein, which may by some standards be considered to be in the lower "radio" frequency rather than the higher "microwave" frequency, as those terms are sometimes used.

Measurements of absorption and reflection have been made for several different coals, raw and processed; and measurements can also be made of several constituents of coal, such as ash, pyrite, and organic sulfur. Measurements of the absorption of electromagnetic radiation over the range of frequencies from 0.5 GHz to 18 GHz (500 MHz to 18,000 MHz) are reported in FIG. 1 for two samples each of the same raw (top curves) and processed east Texas lignite. The following features are evident in these measurements and in all of our absorption measurements:

The overall downward trend in absorption from right to left quantifies the fact that this coal (and all coals) is less efficient in absorbing electromagnetic radiation as one moves to lower frequencies; hence, penetration of the radiation through the coal is greater at lower frequencies.

The peaks seen near 0.8, 2.45, 5.75, and 11.6 and apparently starting near 18 GHz appear to be related to one another; e.g., the absorption-peak frequency near 11.6 GHz is almost exactly twice the frequency of the preceding absorption peak at 5.75 GHz. These features are present in every tested coal's electromagnetic absorption measurements. We believe that these features reflect responses specific to one or more major constituents of the coal or perhaps to the rotational energy of a large molecule (hydrocarbon or sulfur) or both. Of particular interest are the facts, seen in all of our absorption measurements, (a) that these features are still apparent in the processed coal but significantly reduced compared to the background and (b) that the levels of absorption versus frequency for the background (bound water) and for the peaks are significantly less for the processed coals.

The range of frequencies chosen for these measurements covers most microwave frequencies, with the lower frequencies possibly merging into the realm of radio frequencies, depending on how these terms are defined. The marked frequencies at 0.322, 0.460, 0.915, and 2.45 GHz correspond to the principal electromagnetic frequencies within this range that are approved for domestic and some for international use. 2.45 GHz is the most common, being the frequency in widespread use worldwide in kitchen microwave ovens. 0.915 GHz is the frequency of choice worldwide for microwave drying applications, such as curing ceramics, drying pastas, pet food, peanuts, and non-wovens, etc. Note their proximity to two of the aforementioned peaks. The peaks at approximately 5.75, approximately 11.6 and approximately 18 GHz suggest these frequencies as additional options for the microwaves in this process.

The data provides sufficient input to proceed with defining the next step required in the design of a core electromagnetic-radiation system. Use of this information is illustrated below (item 7).

2) Calculation of Penetration Depths of Electromagnetic Radiation Into Wet and Dry Coals at Electromagnetic Frequencies Available and Approved for Domestic and International Use in Microwave Applications In further support of the effort to understand the interaction of electromagnetic radiation with coals, wide-ranging theoretical calculations were carried out based on our studies of the interaction of electromagnetic radiation and materials in several laboratories dedicated to such studies over the entire period dating back to the late 1960's. These calculations include the effects of absorption and reflection of electromagnetic radiation using different physical parameters with wet and dry coals, with layers of coals, in contact and with air gaps, and temperature effects and depths of penetration for a large variety of input parameters. Supporting laboratory electromagnetic-radiation measurements included studies of the effects of particle size, shape, surface roughness, and electromagnetic properties.

Figure 2:
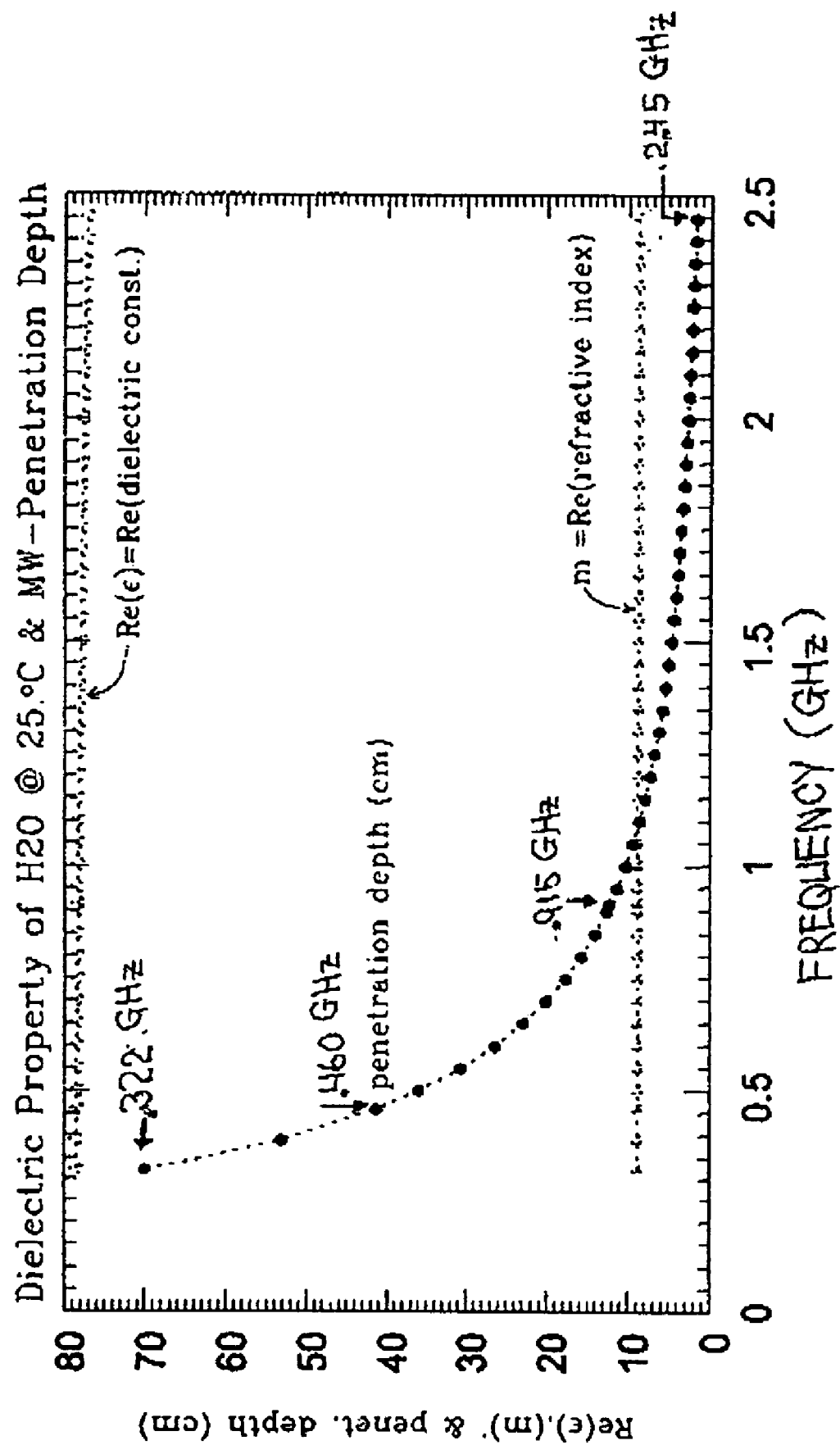
FIG. 2 is a plot of electromagnetic-radiation penetration depth in 25 degree C. water as a function of frequency.

Calculations of the penetration depths at each of the aforementioned four frequencies are provided in FIG. 2. Although the calculations are for unbound or free water at 25° C. (properties vary with temperature), the differences in penetration depths at different frequencies also apply to coal, especially high-moisture coal, to a first approximation. Said differently, penetration increases very significantly as one moves to lower frequencies; for the example shown, the penetration of electromagnetic radiation into water at 0.322 GHz is more than 30 times its penetration at 2.45 GHz. Significantly, in our laboratory processing, we were able to penetrate various coals 3 to 4 times deeper at 2.45 GHz than predicted. We ascribe this difference in major part to the fact that water is distributed randomly throughout coal and not in single or multiple layers; i.e., there are pathways through coal in which electromagnetic radiation will encounter little or no water and thereby penetrate more readily or in some cases pass directly through the coal in those regions. Further, penetration increases very significantly as the coal and its trapped moisture increase in temperature. An additional, but smaller, factor derives from differences in the properties of free and bound water. It is important to note here that surface temperatures of coal during processing are most often found to be 70° C. and above, the latter when reductions are also sought of sulfur and ash. Since interior temperatures can be even higher than surface temperatures, deep penetration can be ensured by proper selection of electromagnetic operating frequency and by paying careful attention to the temperatures measured during processing.

The importance of such measurements, especially for de-moisturization, derives from the fact that the increase in penetration depth as one goes to lower frequencies more than compensates for the relatively small decrease in water-absorption efficiency (FIG. 1). This relationship plays directly into the need for increasing the depth of the coal to be processed if large, commercially viable throughputs are to be realized.

3) Determination of Raw-Coal Properties

Coals range from a soft, moist brownish material to a very hard, glossy black solid, and its physical and chemical properties can vary considerably depending upon how, when, and where the materials were deposited, the types of organic material present initially, and its alteration over time. The sizes and shapes, hardness, volatility, carbon content, trace minerals, combustion and other properties vary widely within each rank of coal, from mine to mine, and within each mine or seam.

The following properties of the raw coals selected for processing are determined: moisture, BTU/lb, ash, forms of sulfur (e.g., pyrite, sulfate, organic), sizes, structure, and hardness (grindability). The first step in determining the properties of any raw or mine-run coal that is being considered for processing is to sample the coal by accepted standards. These standards include ASTM Standards D 388 (Classification of Coals by Rank), D 2013 (Method of Preparing Coal Samples for Analysis), D 3180 (Standard Practice for Calculating Coal and Coke Analyses from As-Determined to Different Bases), and US Geological Survey Bulletin 1823 (Methods for Sampling and Inorganic Analysis of Coal). For some coals and lignites there are large observable differences as to structure (e.g., smooth or rough or plate-like), coloring (e.g., brown as in some dust-like Asian lignites, black and hard east Texas lignites, lines or streaks or patchiness) and composition (e.g., heavy or light with obvious pieces of ash or pyrite or even woody-textured pieces of vegetable matter or wood seen in some lignites), wet or dry, the distribution of sample sizes, etc. Some raw samples are also selected for testing based solely on such observable characteristics, and some samples that have these features randomly mixed are also selected to fully examine each of the many differences observed in coals. Since there is no single sampling standard that provides for such diversity, a comprehensive and consistent sampling method was developed, whereby no such differences go unexamined.

Pursuing the objective of the subject coal-process technology to enhance all of the combustion properties of coal, the next step is to select an experienced and widely accepted testing laboratory (such as Standard Laboratories, Inc.) that is certified to test the widest possible variety of physical and chemical properties of coal. Each of the following properties can be measured: percent moisture, percent ash, percent volatiles, percent fixed carbon, BTU/lb (as received, dry basis, and moisture- and ash-free), forms of sulfur (percent of each of total, pyrite, sulfate, and organic sulfur, as received and dry basis), Hardgrove Grindability Index (HGI), mercury (PPM dry), ash fusion temperatures, and ash mineral analysis. The terms used here are as defined by Standard Laboratories and are common to the coal-testing community and have been defined elsewhere.

It is important (a) to test enough samples to more than cover those samples selected due to their different appearances, (b) to send a larger amount of each sample than is required for testing, (c) to carefully document in every case the criteria used for sampling, and (d) to maintain a control sample from each batch of raws sent for testing. Following receipt of the test results and sample remnants not used by the testing laboratory, it is important to carefully log in the results, e.g., via a spreadsheet (e.g., using Excel™ software) that will permit various statistical samplings, averaging, etc. It is also important to carefully study the test results so as to uncover possible correlations between the test results and the various sampling criteria used, including observed differences in appearance. In this manner, it is possible to fully and properly characterize the distribution or range of properties that can be said to represent on average the coal batch sampled.

4) Definition of Processing Goals (e.g., Properties Sought and the Amounts to be Processed)

Next, the processing goals are typically, if not always, defined by the party seeking improved properties for their own coals or for outside coals brought in for their specific needs. These goals can include improvements to one or more of the combustion properties of the coals, with the same improvements being made to all of the coal or processing some of the coal to higher properties thresholds and blending it with unprocessed coal to obtain the desired overall properties on average. For example, power plants that burn low-grade, low-BTU/lb lignites often bring in higher-grade western coals to blend with the lower-grade coals in an effort to achieve lower emissions and increased operating efficiency.

Other important considerations relate to the throughput being sought. For small scale users that only consume 25,000 to 50,000 tons per year, a lower-cost option might be to process in batch mode or batch/continuous mode. The latter method makes use of boxes or drums that are loaded with coal, moved into position under an electromagnetic-radiation processing surround-system, processed, uncoupled from the processor and moved along the processing line to exit and dump while follow-on coal-loaded containers are moved into position for processing. For the very-high throughputs required in most coal handling and processing, the coal is processed in a continuous, on-the-fly manner. This places one of the most difficult demands on any process system and is one of the several reasons why teams of scientists and process engineers have worked tirelessly for decades in an effort to develop a useful and affordable means for processing coal prior to burning, but without success. The significance of throughput on the design and operation of a process system is shown by example in section 7, below.

5) Use of Small-Scale (10 to 40 Pounds) Laboratory Tests to Determine Each Coal's Actual Response to Key Process Parameters The coals are pre-process tested in a laboratory-controlled setting to determine first hand the response of the coals to the process system being designed for use in the field. The information from this testing ensures that a process system can indeed fulfill the goals for which it is being designed. The coal batch is systematically sampled and processed to ensure that the results will provide this significant input to the core process system design.

Figure 13:
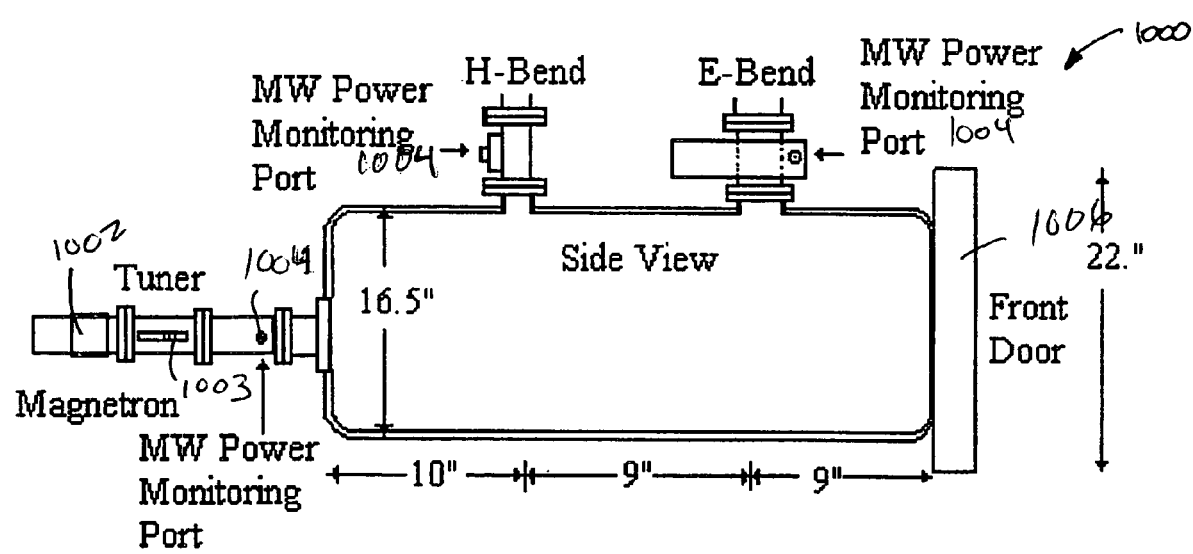
FIG. 13 illustrates a batch processing assembly in accordance with embodiments of the invention.

The tests utilize a versatile laboratory process system designed specifically for this purpose. The laboratory system has the following characteristics:

- The microwave frequency is 2.45 GHz. With information obtained from FIGS. 1 and 2, one can "pre-process" the coal at a frequency different from that in the process system designed for field use, and one can then relate the results at this frequency to what can be expected at the field-system frequency. This correlation has been further verified by the excellent agreement in properties obtained from processing coals from the same batch using two different frequencies in continuous mode and one of the same frequencies in batch mode.
- A hermetically-sealed microwave leak-proof chamber with easy front loading and capable of processing from 10 to 40 pounds is provided for irradiating the samples; processing of smaller amounts makes it more difficult to ensure that sufficient samples are processed to properly evaluate their responses to the multi-parameter system designed for field processing of the coals.
- The system offers the ability to vary applied electromagnetic power in any amount over the range from hundreds of watts to over 3,000 watts. This flexibility is due, in part, to our use of three magnetrons, whereby power is duty-cycled at such short intervals so as to be approximately equivalent to being able to instantaneously vary power levels.
- The aforementioned three magnetrons are positioned carefully to obtain "proper" field orientations. For example, each of three magnetron 1002 outputs can be individually guided through a rectangular waveguide into the processing cavity with a tuner 1003 and a power monitoring port 1004 in its path (see FIG. 13). The microwave polarization direction, along which the electric field vibrates, is perpendicular to the wider side of the waveguide mouth at the cavity entrance. Any two neighboring input polarizations have to be properly oriented, e.g., perpendicular to each other, in order to minimize coupling between the respective two magnetron sources. Similarly, the three entrances are properly located in the cavity so as to minimize unwanted magnetron interactions. The magnetrons can be used singly or together with power levels selectable on each. Adjustment (or setting) of the position and depth of a traveling probe in the afore-mentioned tuner provides an efficient flow of microwave power by the so-called "impedance matching" between the source and the load. Tuning is easily monitored by a detector connected to the power monitoring port 1004, as shown in FIG. 13. Extensive timing and temperature tests are conducted using water, wherein the magnitude of power flowing into the cavity is measured at each microwave power monitoring port 1004, and measurement of the temperature rise of a given amount of water at various locations in the cavity gives the actual power being absorbed. Mixing of modes [i.e., pattern(s) or wave form(s) of the electromagnetic wave in the chamber] is tested and verified. Calibrations are performed. Extensive air handling is used with the chamber and separately with the power supplies to provide for their stability.
- The system also provides the ability to control the amount of airflow, with or without inert gas. An entry port is provided for forced airflow in and exit ports/capture cells are provided for airflow-carried liquids and gases emanating from the process chamber. It is helpful to have one port available for in-chamber, remote-sensing measurements of coal surface temperatures while processing.

This system does not require real-time measurements of moisture content, ash content, sulfur content or trace-minerals content or feedback systems coupled to process controls. Any system with similar capabilities will serve the purpose outlined here.

The first step in coal testing by Standard Laboratories and other coal-testing laboratories is to pulverize the samples and then determine the properties being sought. Processing of the returned pulverized samples would conflict with how the coals would be processed in commercial practice, making it necessary to show that processing mine-run coal would give the same results as that obtained by processing the same coal but pulverizing it prior to processing. This would add the further unacceptable time and cost required to pulverize the coal at the mine or power plant prior to processing.

Based on the above concerns, we chose to always process mine-run coal and not pulverized coal returned from Standard Laboratories following their testing. To provide results that are more representative than before and after processing tests of the same coals, two different sets of mine-run raws are selected for each coal batch to be processed. This approach requires that sufficient samples are tested in each set of raws and in the processed set to ensure that the methodology is indeed statistically significant and that it properly characterizes the raw and processed coal properties on average. The remarkable reproducibility of these measurements strongly supports this approach; e.g., different samples with the exact same starting weight almost always lose precisely the same amount of weight when processed in the same manner. Further, we were unable to achieve the same process system efficiency or consistency in results when processing pulverized samples of the same coals.

Note that this step in the process is intended to further define and refine the core process system design for its intended coals and not to substitute for full-scale tests of the final process system.

6) Collection of Baseline Information for Each Coal

Baseline information, such as location of each coal considered for processing (coal mine or utility), their amounts and how they are moved (conveyor belts or trucks or barge and/or coal train, etc.), system footprint space available, available electrical power and cost, and how best to move the coal to and from the processor, is collected. Site factors, process system size, configuration, and design are directly affected by considerations such as the availability of adequate power and water at the mine or power plant site, system footprint space available (typically limited at power plants), and the means and speeds by which the coal is transported on site. Conveyor belts are used to transport coal at most mines and power plants, their having a variety of sizes, speeds, and belt materials. Since it is expected that existing conveyors will transport coal up to and from the process system and, in some instances, even transit the process chamber, the process system input and exit feeds are designed and sized for the conveyor systems in question. If the conveyor belts transit the process chamber, their materials become especially important and must be taken into account in both the design and operation of the process system; e.g., metallic (electromagnetic reflecting) or nonmetallic (electromagnetic absorbing) belt materials introduce very different electromagnetic effects, and screens lose fines and smalls which can result in mechanical problems in the transport system.

The conveyor belt load capacity and speed also directly determine process system throughput capacity and operation, whether or not the belt feeds through the process chamber or couples into a coal feed system for the process system.

7) Use of the Information Obtained from 1 Through 6, Above, to Develop a Core Process System Design for Each Coal Batch Selected for Processing The following is intended as a walk-through of an example of a design of an electromagnetic-radiation-based process system for obtaining a specific post-processing combustion property or properties for a given solid fuel or coal type.
Initial Assumptions, Requirements, and Choices:

Raw lignite with 36% moisture and 7300 BTU/lb (matching the coal from Table 3 in the Experimental Results section, infra) is processed with the goal of obtaining 23% moisture and 8000 BTU/lb. Whereas Table 3 lists results from processing a very small sample (several pounds) at moderate power (5 to 20 kW) for short times (10 to 120 seconds), the intent of this example is to provide a guide as to how one can process the same coal but with much larger quantities and therefore much higher power but comparable dwell times.

The throughput is set at 10 tons per hour (TPH) or 66,000 tons per year (based on 20 hours per day for 330 days), and the lignite is processed on a continuous or on-the-fly basis. The rate (10 TPH here) is generally chosen by the user based on current mine output or that portion of the output to be processed and the existing coal handling systems or modifications thereto required to handle the amount of coal to be processed.

Since the largest-sized chunks of lignite upon exit from typical first mine grinding stations are approximately eight inches in largest dimension, the process chamber entry slot and other coal passage clearances are 9 to 10 inches in height. Otherwise, a pre-processing step is utilized to screen out larger chunks or break them into smaller pieces. Chamber dimensions are a significant and often limiting electromagnetic-radiation system design parameter (refer below).

For choice of electromagnetic-radiation frequency, refer to FIGS. 1 and 2.

Magnetrons (the basic element that generates microwaves) at 2.45 GHz are primarily used for relatively low-power laboratory, commercial, and kitchen oven applications and are not manufactured with the high powers (e.g., 75 kW or greater) required for effectively processing coal according to methods described herein. Further, 2.45 GHz does not provide the penetration required for the amount of coal and the coal carrier depth. The waveguide and chamber dimensions for optimally designed electromagnetic-radiation systems (high efficiency, uniformity, and safety) at this frequency are too small to accommodate coal sizes larger than 1 to 2 inches.

0.915 GHz is the frequency of choice for many electromagnetic-radiation drying applications, and 75 kW and 100 kW magnetrons are proven and widely available, and can be ganged together to achieve the power levels required for large scale coal processing (see below). Limited penetration depth and small electromagnetic-radiation system dimensions restrict this frequency's use to low-throughput processing of relatively small-sized coals.

Magnetrons that generate 0.460 GHz electromagnetic radiation are not manufactured in the United States, and there have been difficulties in their performance and servicing and meeting promised delivery schedules.

Relatively new to the commercial marketplace, magnetrons that generate 0.322 GHz are manufactured in the United States with a variety of powers.

Where, e.g., 10 tons (20,000 pounds) of coal is processed per hour, a reduction of 13% moisture corresponds to removing 260 lbs of water per ton or, in this case, 2600 lbs of water per hour.

Measurements of sample weights before and immediately after processing provide information that can be related directly to percent moisture reduction. Additional weight measurements 30 minutes after the end of processing and 24 hours later always find still further weight reductions, adding up to a total post-processing weight reduction of 3 to 5%. We very-conservatively estimate that use of a pre-heating phase (e.g., using thermal or infrared radiation, which is at a different frequency from that of the later applied electromagnetic-radiation in a separate chamber or in a separate part of the chamber) prior to active electromagnetic-radiation processing can further reduce the weight by 2 to 3%. Taken together for the example used here, the targeted 13% moisture reduction can be lowered conservatively to approximately 8% that would need to be targeted by the electromagnetic-radiation segment of the process. This reduction resulting from pre-heating results in the need to remove 160 pounds of water per ton by electromagnetic-radiation processing instead of the 260 pounds needed in the embodiment.

At 100% efficiency, 1 kW of electromagnetic energy can evaporate 3.05 lbs of water per hour at ambient temperature. For well-designed electromagnetic-radiation systems, 98% of that energy is absorbed and converted to heat. For reference, 1 kW of applied electromagnetic energy requires approximately 1.15 kW of electricity and evaporates 2.989 lbs of water. Therefore, 61.6 kW of electricity is required per 160 pounds of moisture removed [i.e., 160 pounds times 1.15 kW per 100 kW of applied electromagnetic power divided by 2.989 pounds]. From the above, we obtain a power requirement of 533 kW per hour (20,000 pounds divided by 300 lbs of water times 8% per 100 kW). Therefore, three separate 200-kW systems can be employed. Process systems are used in parallel or in line, depending upon the available footprint space for the systems and the material handling systems that fit the location.

Other Process Parameters and Observations:
Processing Time or Dwell Time in a Conveyor Processing System:
The processing time (over the course of which a sample is subject to the radiation) is typically 5 seconds to 45 minutes, depending on the size and configuration of the process chamber, the electromagnetic power available, and the sample size. Small samples require shorter processing times, etc. (see Table 3). Dwell times for high-throughput processing can be scaled appropriately, but current power limitations require that high throughput (hundreds of tons per hour) can only be obtained by coupling several separate process systems.

Chamber Atmosphere:
Significant airflow is provided to carry away liquids and gases resulting from processing. Insufficient airflow will result in moisture condensing on chamber surface walls, resulting in loss of electromagnetic efficiency and arcing and possibly combustion, which must be avoided. The amount of airflow required depends on the size of the processing chamber, the sample size being processed, the amount of by-products being released into the chamber, air temperature, etc. The simplest way to check for sufficient airflow is to periodically stop processing to observe chamber surfaces to see if they are wet. At the same time it is helpful to observe fracturing and any possible graying or reddening of coals that could result from hot spots. Finally, if by-products are seen exiting the chamber via tubing or capture coils, the airflow is probably adequate.

Coal Temperature:

For moisture reduction only, coal surface temperatures should be kept at or below 100° C. This is readily monitored with hand-held (infrared) temperature sensors or remotely with thermal probes positioned inside the process chamber.

Use of Inert Gas:

If coal temperatures are maintained at their recommended levels for moisture reduction, there should be no flaring and combustion, and inert gas will not be required. In embodiments where inert gas is used, it can be flowed through the chamber at a rate of at least 15 cubic feet per hour.

Hydrogen:

Hydrogen gas is not necessary for moisture reduction. Though, hydrogen gas can be supplied during the sulfur-reduction phase of the process.

On-Line Measurement Systems for Moisture, Ash, Sulfur, Trace Minerals and Temperatures:

In practice, measurement and feedback systems are coupled to process parameters, such as electrical power, applied electromagnetic power (and the ability to change both the power level and its on/off duty cycle), and processing time to ensure that targeted levels of properties are achieved and not under- or over-processed.

For the example given here, and if all else is as recommended above, only applied electromagnetic power and exposure time require change, and only surface temperatures need be monitored.

In-House and Coal-Certified Testing Laboratory Testing of Combustion Properties:

Since there is a direct correlation between weight loss and reduction in percent moisture, taking weight measurements before and after processing and even during processing should be part of the processing regimen. Finally, coal-testing laboratories can provide quick and accurate measurements of percent moisture and BTU/lb to further verify that targeted levels were achieved.

8) Study of Local, State, and Federal Permitting and Regulatory Requirements and Their Impacts on Process System Design and Operation, Including the Collection and Handling of By-Products Is it possible to design a dry and single-stage process system that can meet all of the aforementioned requirements? In a word, yes. But before finalizing the design of an intelligent process system able to provide the specific properties sought for a particular coal, it is necessary to first carefully study all local, state, and federal permitting and regulatory requirements for the location at which the process system will be used; those requirements can and often do affect both the design and operation of a coal processing system. After taking those requirements into account, the aforementioned core process system can be modified as needed.

Figure 4:
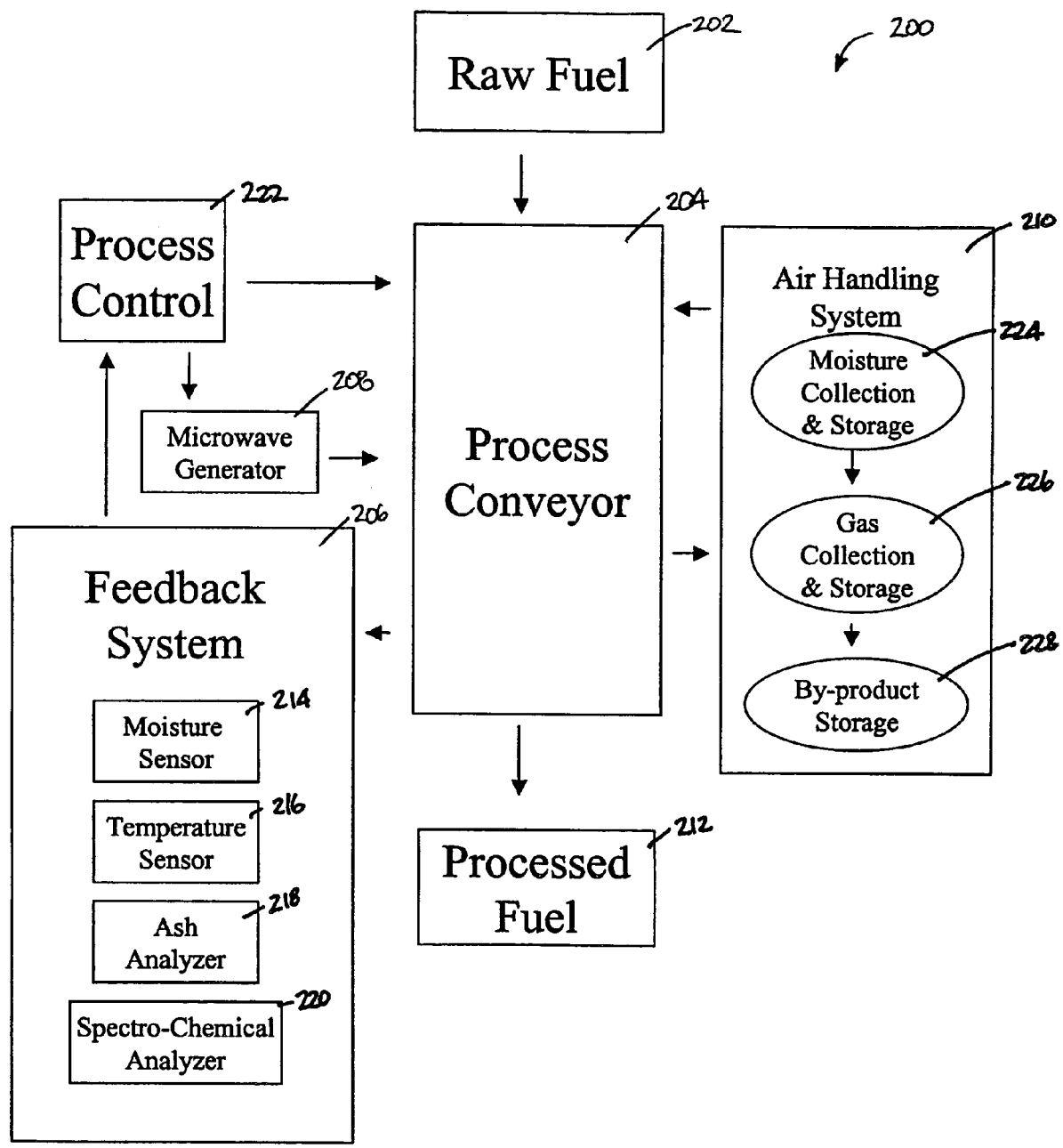
FIG. 4 is a flow diagram of the process system elements in accordance with embodiments of the invention.

Mines and coal-fired utility plants have different sets of requirements, often resulting in differences in the design and operation of a system for the two classes of operating locations and even within a given class. For example, many utilities have to seek advance approval to handle and burn any coal with properties different from the coals currently approved for use, even if the "new" coals are documented to be cleaner and more environmentally friendly. This can even require that process systems be designed so as to meet certain combustion requirements, individually or collectively, such as restricted emissions of $SO_2$ or $NO_x$ or $CO_2$. Some of the requirements are analogous to the oft-used term "environmental impact statement." Examples of such requirements include:

Liquids, Solids, and Gaseous Emissions from the Process:

Liquid, solids and gaseous emissions can be managed by the elements outlined in FIG. 4. Even a system that contains all by-products of its processing must be certified to meet mandatory handling and collection requirements.

Odors Emanating from the Process:

Containment of process by-products does not, in itself, eliminate odors; but the odors should be minimized by the by-products airflow system. If there are substantial residual odors, it may be necessary to add materials via the air carrier to absorb or otherwise minimize odors.

Fire and Explosion Control:

Standard procedures and systems are available to meet these requirements, such as temperature sensors, infrared detectors and imaging systems.

Dust Control:

While always a concern in any coal-handling environment, the generation of dust is primarily associated with the coal's entry into and exit from the chamber. Since it is anticipated that this coal transport will be accomplished in part via use of existing on-site conveyors, external dust should be minimal. Dust generated in the system will be controlled by the by-products handling system.

Air Pollution (Including Haze or Fog), Chemicals and Hazardous Materials:

Pre-shipment qualification tests will be conducted to verify that the system is air pollution-free or substantially free of pollution. No chemicals or hazardous materials are used or introduced into the system other than the possible use of inert gas, which is not considered hazardous.

Safety and Containment of Electromagnetic Radiation:

Safety levels for exposure to microwave radiation are strict and regulated, requiring that each and every process system that uses microwave radiation be certified to meet these levels and guidelines. Many manufacturers of large scale microwave drying systems meet these regulations by configuring their systems in a manner that makes them impractical and unsuited for use with the large throughputs required for coal processing.

One solution is to make use of one of the microwave-systems manufacturers that focus on minimizing or completely containing microwaves; i.e., that have no detectable leakage. It is important to note that materials exiting from a microwave chamber after processing still emit some level of microwave radiation for a short period of time even after exit from being microwaved, including food exiting from kitchen microwave ovens, although those levels are very low. In addition to interior systems designs that deny exit of the microwave, one can shield the systems externally with properly placed metal screens and metal duct tape. In any case, regular and systematic surveys are conducted in search of microwave leakage to ensure that safety systems have not been compromised. Microwave-leakage detectors can be purchased or designed and built for a specific application.

9) Modification of the Core Process System

The core process system is modified in design, as needed, based on information from 8, above.

10) Design, Fabrication and Testing of Each of the Four Major Process Subsystems Each of the four major process subsystems (i.e., pre-heating system, electromagnetic-radiation system, multi-parameter measurement and feedback system, and by-products handling system) is designed, built, and separately tested.

11) Integration and Functional Testing of the Four Sub-Systems When Operated Together The next step is to integrate and functionally test the four sub-systems when operated together, followed by full end-to-end process system qualification and verification tests, the end-to-end tests conducted using samples of the coal batch for which the process was designed.

Steps 10 and 11, above, offer a proven, effective, and standardized methodology for use when developing a major system that consists of several sub-systems and is used in laboratory and commercial settings and even in ocean, atmosphere, and space environments, where equipment must often be operated remotely.

12) On-Site Installation

Following successful completion of full-process-system-performance testing, the custom-designed and fully tested intelligent process system is shipped to its intended operating location. Upon arrival, the system is further tested to ensure that there are no changes due to handling and shipping. Then, the process system is moved into its intended position and integrated with the existing on-site coal handling system or appropriate changes thereto, electrical hookups, water, and air or inert gas generating systems, as required, and is further tested prior to being put into service.

B. Control, Monitoring and Management

If not controlled so as to alter the sequence by choice of frequency or other process parameters, the process results in fracturing of the coal matrix followed by liberation of moisture and then ash and then sulfur. For some coals, the stages are separate and distinct, while for others there is overlap in the stages; e.g., for some, ash and sulfur emissions begin while moisture is still being liberated.

To provide some measure and monitoring of the overall uniformity of processing, surface temperatures of the coal are measured at several positions in the process chamber as the coal is being processed. Because the coals are not uniform in size, shape, or properties and are not uniformly distributed on the conveyor, such temperature measurements can be considered to provide representative data on average. Further, because the coals are undergoing fracturing, some of the measured temperatures may approach internal temperatures, which are generally somewhat higher. The intent is to have the capability to avoid large variations in temperature by adjusting microwave power as needed in such regions.

Moisture liberated from the coal can be collected by any of several methods, such as, but not limited to:

moisture can be condensed on the walls of the chamber and forced downward by dry air into a collection and storage system underlying the process chamber;

moisture-laden air can be driven out of the chamber by forced dry air (positive pressure) along the axis of the process chamber, and the moisture in the air can then be collected by condensation; and moisture-laden air can be pulled out of the chamber by forced dry air (negative pressure), and the moisture in the air can then be collected by condensation; small particulates (not fines) and gases are air-driven to a capture cell where they are collected, separated, and stored.

If de-moisturization and increased BTU/lb are the primary or only changes in properties being sought, then an on-line moisture analyzer and feedback system can be included. This system can determine when processing has reached the levels of moisture that will provide the desired BTU/lb, and the system can then change or shut down the processing, as needed.

If specific reductions in ash and sulfur are the primary changes being sought, then an on-line chemical (sulfur and ash) signature level analyzer can be included. As before, a feedback system optionally can be used to change or shut down the processing. Optionally, an off-line sampling, weighing, and testing station is also available for use, as needed.

In practice and for most coals, minimal sampling and testing is required, on- or off-line, and the process operator is able to use prior experience to judge when the desired coal property levels have been reached. Coals exit the process chamber into a discharge chute that is designed to fit the system location and process flow rate (tons per hour); e.g., the chute can be designed to feed a loading station, couple to another conveyor, etc.

The overall result is that this process methodology, with its ability to custom-design systems, can produce designer coals; i.e., any rank or form of coal can be processed so as to become a new and different coal with any of a wide variety of properties available per customer selection. Said differently, these methodologies can be used to create new coals with a wide variety of enhanced fuel properties not found in raw, unprocessed coals.

C. Embodiment of the Method

Figure 3:
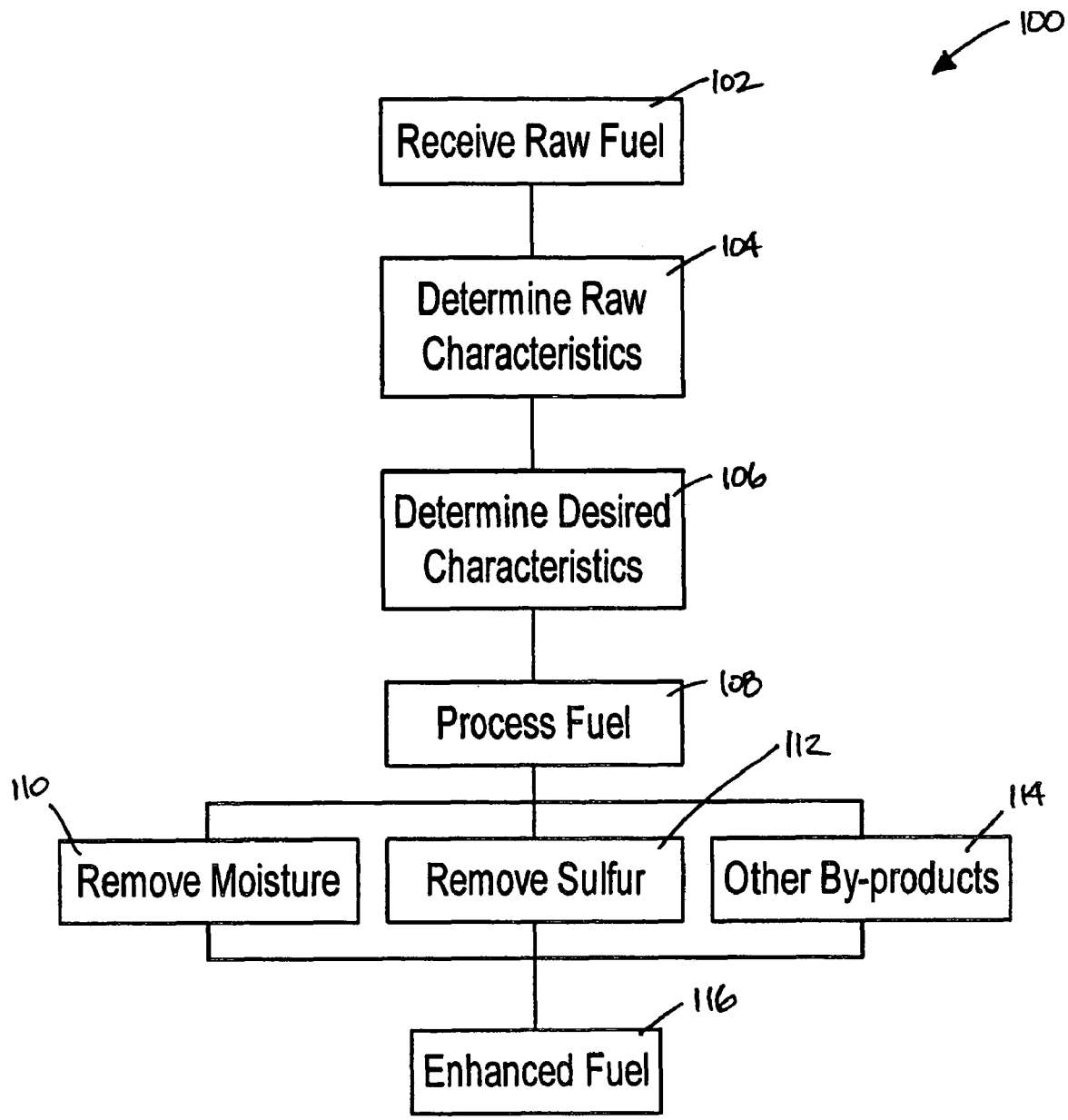
FIG. 3 is a flow diagram generally describing a process methodology in accordance with embodiments of the invention.

FIG. 3 illustrates a flow diagram of an exemplary method 100. The method 100 illustrates handling and processing steps to improve the combustion characteristics of a fuel such as coal or another carbon-based fuel. The method 100 can be executed or otherwise performed by any of various systems and apparatuses. The method 100 is described, below, as carried out by a system 200, shown schematically in FIG. 4, by way of example; and various elements of the system 200 are referenced in explaining the example method of FIG. 3. The invention may implement, and be embodied in, other systems and processes as well. Reference will now be made in detail to exemplary embodiments of the invention as illustrated in the accompanying drawings. The same reference numbers are used throughout the drawings and in the following description to refer to the same or like parts.

Each block shown in FIG. 3 represents one or more steps carried out in the exemplary method 100. In block 102, the example method 100 begins in block 102, where raw fuel is received for processing. For example, raw coal can be received for processing by method 100 in the raw fuel section 202, shown in FIG. 4 and described below.

In some instances, the raw fuel is sized. Raw fuel is sized to a predetermined size by a crushing device. For example, raw coal can be sized by the raw fuel section 202 as shown in FIG. 4 and described below.

Block 102 is followed by block 104, in which a composition characteristic of the fuel is determined. The fuel is analyzed to determine a composition characteristic such as the moisture content of the fuel. For example, a moisture analyzer can be used with the process conveyor section 204 and/or feedback system 206 (shown in FIG. 4) to determine the moisture content of the fuel.

Block 104 is followed by block 106, in which the characteristics of the coal desired by the consumer are determined. The desired fuel properties and raw coal composition are used to establish the "design" parameters of the process system chosen. The power and duration of applied energy can be based on the desired combustion characteristic, such as moisture content, and can also be based on the relative speed or throughput of the fuel relative to an electromagnetic-radiation generator 208 (shown in FIG. 4). The "duration" of applied energy can be in the form of a duty cycle, whereby the power is cycled on and off to provide a reduced average power level. In the example above, the moisture content of the raw coal and the desired properties are used to determine the amount of wave energy and other process parameters needed to create the "designer" coals. Utilizing a moisture analyzer, the feedback system 206 can monitor the fuel and selectively adjust the power and duration of electromagnetic energy to obtain the desired moisture level.

In the system embodiment described below, a series of electromagnetic-radiation generators (similar to 208) can be activated to provide a selected amount of electromagnetic energy to a bed of coal on a conveyor bed or the process conveyor 204 passing adjacent to the electromagnetic-radiation generators so that the bed of coal is sufficiently penetrated to remove a particular amount of moisture, ash and sulfur from the bed of coal.

Block 106 is followed by block 108, in which the electromagnetic frequency, amount of wave energy and inert gases are applied to the fuel. As described in the system embodiment, below, the series of electromagnetic-radiation generators can be activated to apply a specific amount of wave energy to the fuel.

Block 108 is followed by blocks 110, 112, and 114, where by-products are removed or otherwise collected from the fuel. As a result of the electromagnetic energy applied to the fuel by an electromagnetic-radiation generator 208, one or more by-products such as excess moisture, ash or sulfur may be generated from the fuel. These by-products are collected in one of the blocks 110, 112, 114, as is further described below. For example, in block 110, an amount of moisture is removed or otherwise collected from the fuel. In block 112, an amount of sulfur is removed or otherwise collected from the fuel. In block 114, other by-products are removed or otherwise collected from the fuel. As a direct result of the electromagnetic energy applied to the fuel, combustion characteristics of the fuel are improved. The improved fuel is collected by or otherwise received in the enhanced fuel section 116.

D. Fuel-Processing Parameters

The sizes and shapes, hardness, volatility, carbon content, trace minerals, combustion and other properties of coals vary widely. Therefore, the coal process parameters chosen will also vary widely, varying according to the following factors: the amount of coal to be processed, the time and place available for processing, whether the coal is processed in batch mode or continuously or some combination thereof, the purposes for which the processing is being performed, and the intended use(s) for the coal. Said differently, generalizations cannot readily be made as to process parameters, though ranges suitable for use with the process can be identified, as is outlined below.

1) Electromagnetic Wave Energy

Suitable frequencies of electromagnetic generators can be used in the process range from below 100 MHz to above 20,000 MHz. A single frequency or multiple frequencies can be used, simultaneously or alternated, or in stages. The frequency or frequencies can be continuous or pulsed or duty-cycled (i.e., timed so as to power-on and power-off in much the same way that kitchen microwave ovens function).

2) Power

The power of the electromagnetic generators can be 100 watts to 100,000 watts, extending to megawatts 3) Processing Times Suitable electromagnetic radiation on-times range from 5 seconds to 45 minutes, depending on processing goals.

4) Capacity

When the system is designed to operate in batch mode, the capacity of the system can range from ounces to tons. In continuous processing systems, tens of pounds to hundreds of tons per hour can be processed. The chamber atmosphere can be dry oxygen to provide more uniformity in the wave energy and in the process results. An inert gas atmosphere prevents production of oxides such as $SO_2$, $CO_2$, and $NO_x$ during processing and reduces or eliminates the risk of flaring and/or combustion.

5) Temperature of Coal and Air

The temperature of the coal at its surface and at its interior can range from ambient to approximately 250° C. during processing.

Related process parameters are surface temperatures of the coals being processed and temperature of the air inside the process chamber. Electromagnetic-radiation processing in a laboratory test setting is better evaluated and better understood if periodic measurements are made of the surface temperatures of the coals; these measurements can be easily made with hand-held infra-red sensors or temperature probes positioned inside the chamber. For large-scale, continuous processing of coal, such temperature measurement and monitoring is even more important. Temperature thresholds are pre-determined separately for every different set of coals to be processed and are dependent on the goals of the processing (e.g., moisture reduction alone or combined with additional reductions). High-moisture coals will absorb electromagnetic radiation more readily than low-moisture coals and will, therefore, reach any given temperature more quickly. Reaching or exceeding ignition-threshold temperatures can result in loss of BTU/lb of the coals even if combustion is avoided by the use of inert gas. Therefore, processing systems are provided with coupled temperature measurement and feedback systems to ensure that, if temperatures reach these thresholds, process parameters, such as applied microwave power or dwell time or airflow, are triggered to be modified immediately. Such temperature thresholds can be laboratory pre-determined for each set of significantly different coal batch properties; alternatively, the temperature threshold can be determined from processing experience.

Another type of temperature threshold is that associated with changes in materials, with sulfur being of particular interest here. The predominant form in sulfur vapor melts at 119° C. and is a yellow, transparent liquid at temperatures up to 160° C., where sulfur undergoes a molecular transformation whereby sulfur atoms produce a dark viscous liquid. Said differently, temperatures below 119° or above 160° C. result in very different physical and chemical properties of free sulfur or sulfur bound in coal and must be taken into account if one is to be able to reduce sulfur content in any predictable manner. We have observed sulfur in each of those different forms during process testing. As still another example, one coal batch of the many coals sampled emitted thick clouds of yellow fumes within seconds of the start of processing, even before moisture was released. No other coal tested responded in this manner. Similar pre-processing testing considerations apply to ash, which typically precedes sulfur in being liberated by this processing methodology. A maximum temperature limit can be set at about 200° C. for convenience and because higher temperatures may introduce other, undesired changes to the coal or can cause the coal's properties to change too quickly to readily control.

Finally, detection of a higher-than-expected chamber temperature could be an indicator of combustion and possibly pose a safety concern as well as a processing concern (i.e., providing more reason to include temperature-monitoring and feedback systems as an integral part of all processing systems). Systems for visual monitoring and remote imaging can also be used to ensure that there is redundancy in meeting both safety and processing concerns.

6) Airflow

Airflow is an important and multi-purpose process parameter. Dry, particulate-filtered air is particularly suitable, with the amount of airflow dependent upon the configuration and size of the process chamber and how coal enters and exits the chamber. Controlled airflow helps to mix the air in the process chamber, insuring a more-uniform distribution of heating in the chamber. Air is the carrier for process by-products such as moisture, fine particulate matter and any gases that result from the processing. Sufficient airflow negates any possibility of electrical arcing or sparking during processing in cases where the batch being processed (i.e., the load) is sufficiently large for the chamber size, shape, and power levels used.

Without airflow, moisture condenses on chamber walls, with several negative effects. The wet surfaces absorb some of the electromagnetic radiation and thereby reduce the overall efficiency of the system, requiring longer processing. Further, moisture drops onto the coal and results in uneven heating and uneven penetration of electromagnetic radiation throughout the coals, making it more difficult to obtain results that are consistent or representative of the entire coal batch being processed. The result is that some of the coals toward the bottom of the batch being processed would not be completely penetrated by the microwave radiation and would not be fractured to the same extent as coals closer to the top of the batch, and, therefore, would not have the same amounts of constituents released. Finally, the aforementioned uneven heating would result in so-called hot spots, which are a precursor to flaring, ignition, and combustion, all of which must be avoided during processing.

With airflow on and without using a by-products collection and storage system, vapor can be seen exiting the process. For short-term processing only, colorless water vapor can be seen exiting the chamber during processing. When processing is continued and/or makes use of other process parameters to remove other constituents, the vapor will change color, the vapor first having a yellowish tint and a smell that is characteristic of the presence of sulfur and sulfur compounds. Continued processing will result in darker-colored gases and liquids carrying other forms of sulfur and ash being released. Sulfur can be released, e.g., at a temperature in the range from 130° to 240° C. If processed long enough, hydrocarbons and tars will also eventually be released, the last two being undesirable since they would evidence the loss of heat content of the coals.

7) Inert Gas

Use of inert gas in the chamber is optional. Where inert gas is used in the chamber, the amount of inert gas depends on processing goals.

Inert gas (preferably dry nitrogen or argon) serves several purposes. Any of several factors can result in overheating part of a coal batch or sample or part of a chunk of coal to a level where there could be ignition and combustion. Use of a nitrogen or argon atmosphere in the chamber will prevent any burning of coal during processing. Nitrogen is readily available in dry, gaseous form, tanked and metered for laboratory use, and 20 to 25 CFH (cubic feet per hour) provides sufficient flow to carry away liquid and gaseous by-products during processing in small, kitchen-sized microwave chambers while preventing combustion. Larger chambers require appropriately-scaled larger volumes of nitrogen flow. Commercially available pressure-swing systems are available and in common practice in other applications; these systems take nitrogen directly out of the air when large amounts are required such as that for processing coal at a mine or coal-fired utility. Nitrogen is the inert gas of choice due to its widespread availability and lower cost compared with that for argon, but only if one assures that coal processing is stopped before reaching the undesirable hydrocarbon and, especially, tar phases, where hazardous compounds can be formed from chemical compounds resulting from exceeding temperature thresholds or from processing for too long. Use of an inert gas atmosphere in the chamber also prevents the production of oxides such as $SO_2$, $CO_2$, and $NO_x$ during processing.

8) Hydrogen

Use of hydrogen (e.g., introduced via a hydrogen generator) in the chamber is optional. Hydrogen can be introduced to further control changes occurring in the coal during processing.

9) Atmospheric Pressure in the Process Chamber

The pressure in the process chamber is typically one atmosphere, but process parameters can be altered as/if needed when processing at elevation (above sea level). Vacuum can also be applied in some cases.

10) On-Line Measurement Systems

On-line measurement systems can be provided for measuring moisture, ash, sulfur, trace minerals and temperatures in the chamber. All are designed to provide feedback to adjust process parameters, as needed, to ensure that targeted levels are achieved and not exceeded and, thereby, that the coal is not under- or over-processed.

III. Apparatus—Embodiment A

A. Raw-Fuel Section

The system 200, shown in FIG. 4, includes a raw-fuel section 202. Raw-fuel section 102 can be a storage bin to collect raw coal or to otherwise receive raw coal to be processed by the apparatus. Typically, raw fuel is received from a remote location, such as a coal mine and collected in raw-fuel section 202, until called upon for further processing. Raw fuel, such as lignite, anthracite, bituminous, sub-bituminous, low-sulfur, high-sulfur and blended coals can be stored in raw-fuel storage until needed. Selected amounts of raw fuel are sized by the raw-fuel section 202 for processing by other parts of the system 200. The raw-fuel section 202 can also include a series of one or more coal-crusher devices that break relatively large chunks of coal into smaller pieces of coal. Raw-fuel section 202 can include equipment such as, but not limited to, a pulverizer, a coal crusher, a ball mill, or a grinder. By way of example, a coal crusher can be used to size raw coal to approximately a four-inch (10-cm) diameter. Larger or smaller sizes of coal or other fuel can be utilized in accordance with various embodiments of the invention.

B. Additional Interacting Systems

Raw-fuel section 202 is followed by process-conveyor section 204. The process-conveyor section interacts with the raw-fuel section 202 to receive a predetermined amount of fuel to be processed.

Process-conveyor section 204 is also interconnected with feedback-system section 206, electromagnetic-radiation-generator section 208, air-handling-system section 210, and processed-fuel section 212.

C. Feedback System

The feedback-system section 206 interacts with the process conveyer to determine a characteristic of the fuel, such as the percentage of moisture or the percentage of ash in the fuel. The feedback-system section 206 includes a moisture sensor 214, a temperature sensor 216, an ash analyzer 218, and a spectro-chemical analyzer 220. For example, using some or all of these components, one can determine the approximate amount and duration of microwave energy needed to remove a particular amount of moisture from the fuel. Other composition characteristics that can be determined are specific amounts of ash, sulfur, hydrogen, carbon, nitrogen, and other compounds or elements in a fuel.

Note that other devices or methods are suitable for determining one or more combustion characteristics of a fuel. Such devices and methods can be used on-line or off-line Such devices and methods include, but are not limited to, moisture analyzers, ash analyzers, temperature sensors, and spectrochemical analyzers.

The feedback-system section 206 and process-conveyor section 204 also interact with a process-control section 222. The process-control section 222 interacts with the electromagnetic-radiation-generator section 208 to provide feedback control or other instructions from the feedback-system section 206 to control the electromagnetic-radiation-generator section 208.

D. Electromagnetic-Radiation Generator

The electromagnetic-radiation-generator section 208 applies microwave energy to the fuel at the process-conveyor section 204. The electromagnetic-radiation generator 208 includes a series of magnetrons positioned relative to the fuel at the process-conveyor section 204; the magnetrons direct electromagnetic-radiation energy into the fuel based upon the pre-determined characteristic, such as the moisture percentage that is sought.

For example, each of the magnetrons of the electromagnetic-radiation-generator section 208 can be controlled in terms of adjusting the power, duration, and other parameters to provide a sufficient amount or quality of wave energy to penetrate a fuel and to remove a targeted amount of moisture. The electromagnetic-radiation generators provide a specific, predetermined amount of wave energy to a fuel in accordance with the invention. Using information collected by the feedback-system section 206, such as moisture-content measurements, the process-control section 222 can selectively adjust each of the generators to provide a particular amount of energy to the bed of coal at the process-conveyor section 204 until a specific amount of moisture is removed from the coal.

Note that other devices or methods can be used as wave energy means for applying a predefined amount of wave energy to a fuel. Such devices and methods include, but are not limited to, magnetrons, klystrons and gyrotrons.

Note that lower frequencies of electromagnetic energy penetrate deeper into a fuel material such as coal, than do higher frequencies. A suitable electromagnetic-radiation generator for the system 200 generates a frequency output between 100 MHz and 20 GHz. Other frequencies of wave energy can be used in accordance with other embodiments of the invention.

The power of the wave energy can be pulsed or continuous. In the example provided above, the generators can provide wave energy at continuous power. To regulate the wave energy applied to a fuel, the wave energy output can also be pulsed at a regular time interval at a constant frequency. The power per source in particular embodiments is at least 15 kW at a frequency of 928 MHz or lower and in other embodiments is at least 75 kW at a frequency of 902 MHz or more.

In addition, each of the generators can be controlled based on a "throughput" rate of a particular fuel being transported within the range of wave energy output by a series of generators. Throughput rate can be defined as the speed of a particular amount of fuel through the wave reactor for a particular period of time. For example, the throughput of a fuel, such as coal, can be 200 to 400 pounds (90-180 kg) per minute.

Note that each type of fuel can be treated with varying amounts and qualities of electromagnetic energy depending upon the type of fuel, the condition of the fuel, and other characteristics of the fuel environment or of the fuel itself.

E. Air-Handling System

The air-handling-system section 210 provides by-product collection for the process-conveyor section 210. The air-handling system 210 includes a moisture-collection/storage section 224, a gas-collection/storage section 226, and a by-product collection/storage section 228. The air-handling-system section 210 collects and stores by-products from the processed fuel. For example, application of electromagnetic energy to raw coal creates water vapor and condensed water at the process-conveyor section 204. The moisture-collection/storage section 224 collects the condensed water for storage and subsequent use. Water vapor and gases can be collected by the gas-collection/storage section 226 for subsequent use. Other by-products from the process-conveyor section 204 are collected by the by-product-collection-storage section 228 for subsequent use.

F. Post-Processing Apparatus

The remainder of the processed fuel from the process-conveyor section 204 is transferred or otherwise collected in the processed-fuel section 212. Such devices may be but are not limited to a bin, rail car, storage pile, or conveyor that transports directly to a combustion process (not shown).

Fuel from the processed-fuel section 212 can then be utilized in a combustion process in, e.g., a combustion burner and steam boiler combination. The processed fuel from the invention can also be used in other conventional combustion processes.

G. Feeder and Conveyor System

Figure 5:
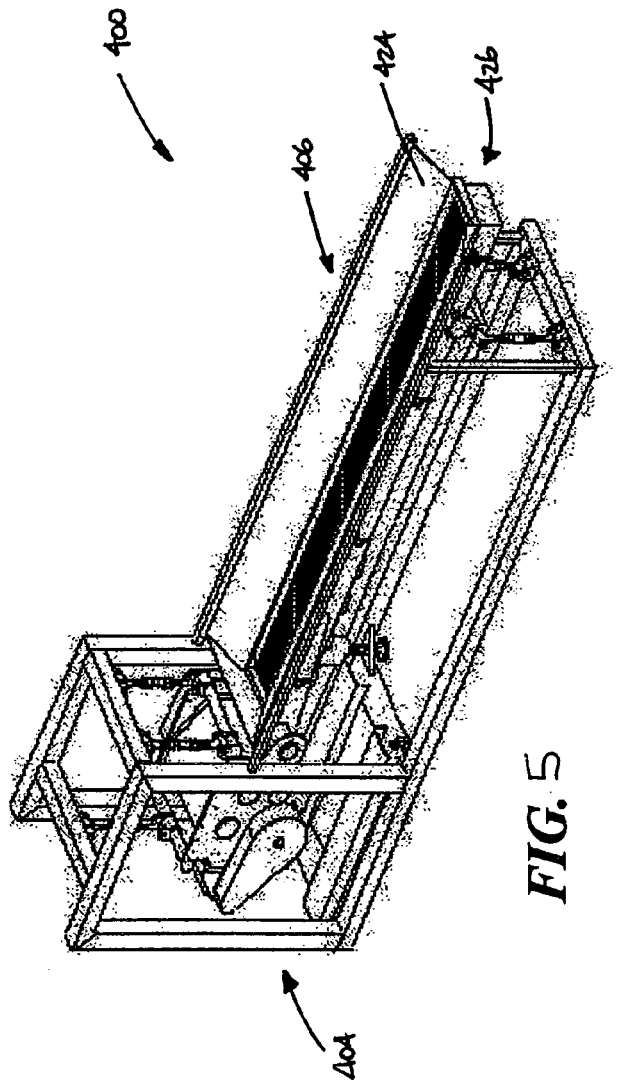
FIG. 5 illustrates a conveyor system.

FIG. 5 is a perspective view of an existing conveyor system 300 that can be modified in accordance with the invention. The conveyor system 300 shown is a Slipstick™ conveyor designed and built by Triple/S Dynamics, Inc. The conveyor system 300 shown can be utilized or otherwise included with the process conveyor section 204 shown in FIG. 4. Various apparatuses in accordance with the invention may be constructed using the conveyor system shown in FIG. 5. Other conveyor systems can also be used in accordance with embodiments of the invention.

FIGS. 5-10 illustrate an exemplary apparatus 400 in accordance with the invention. The apparatus 400 can be integrated into any of various systems and performs various methods in accordance with embodiments of the invention. By way of example, the apparatus 400 can be incorporated into or otherwise utilized with the system 200 described above. Various elements of the system 200 are referenced in explaining the exemplary apparatus of FIGS. 5-12. Furthermore, by way of example, the method 200 described above can be carried out by the apparatus 400 shown in FIGS. 5-12. The apparatus 400, as shown in FIGS. 5-12, includes a feeder assembly 402, a drive component 404, a conveyor assembly 406, and a reactor component 408. The feeder assembly 402 is adapted to receive a fuel, such as pre-sized coal, and is further adapted to direct the fuel towards the reactor component 406. The drive component 404 is adapted to transport the fuel through the reactor component 406. The reactor component 406 is adapted to apply a specific amount of electromagnetic energy to the fuel. The various parts 402, 404, 406, 408 and functions of the apparatus 400 are described in further detail below.

Figure 6:
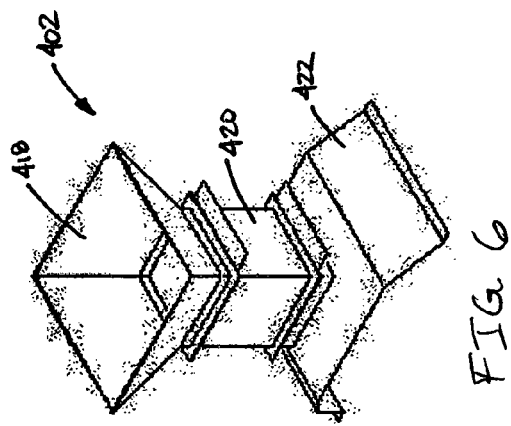
FIG. 6 illustrates a feeder assembly for use with the conveyor system of FIG. 5.
Figure 7:
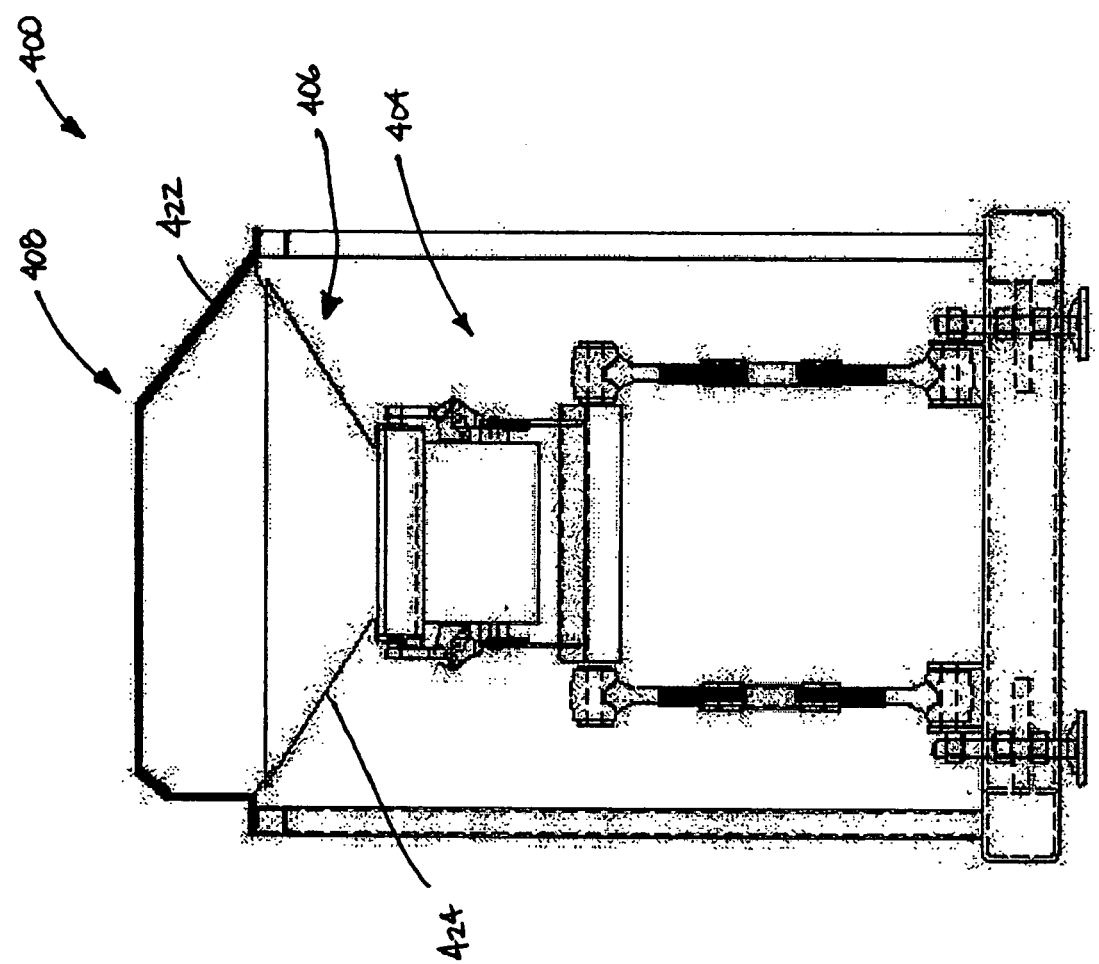
FIG. 7 provides a conveyor end view of the apparatus of FIGS. 5 and 6.
Figure 8:
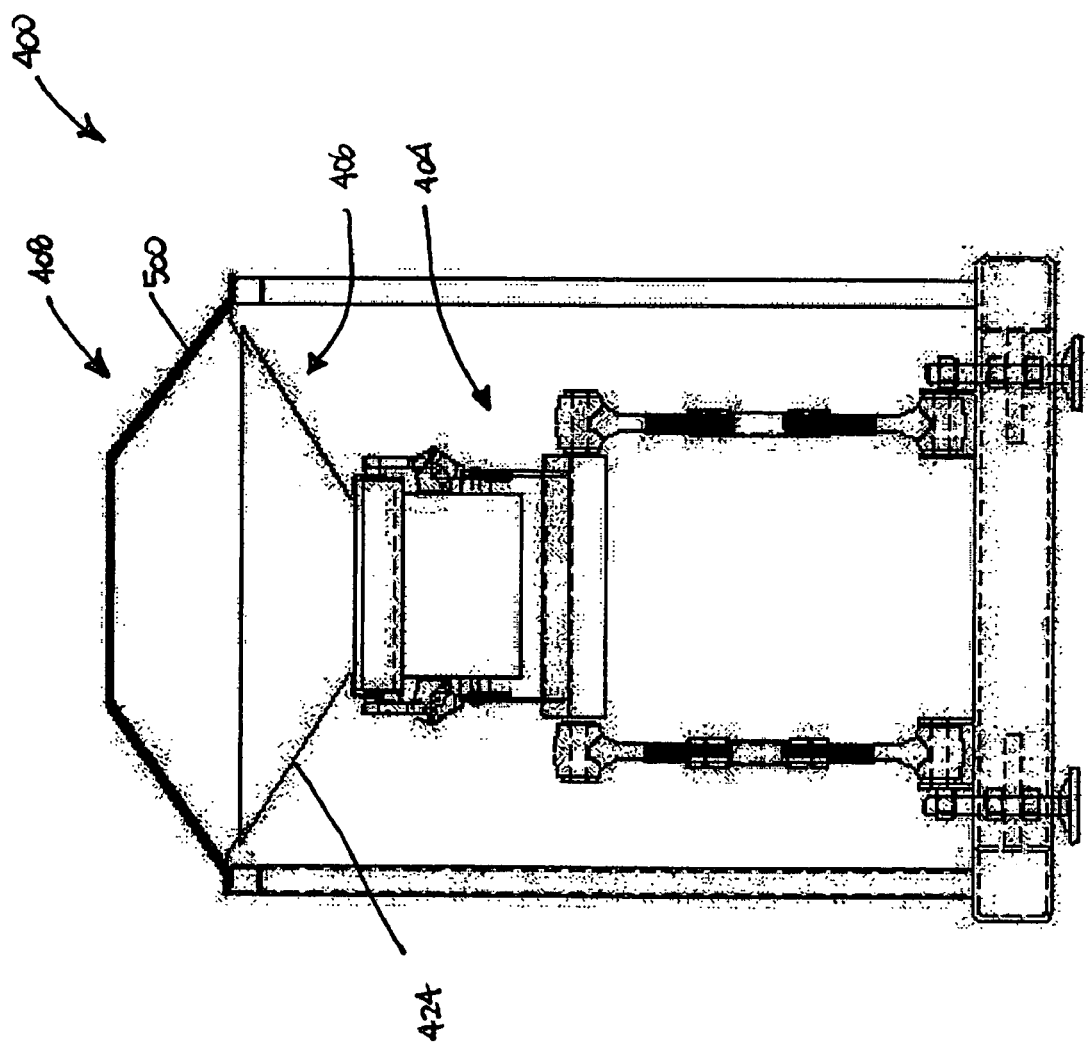
FIG. 8 provides a conveyor end view of the apparatus of FIGS. 5 and 6.
Figure 9:
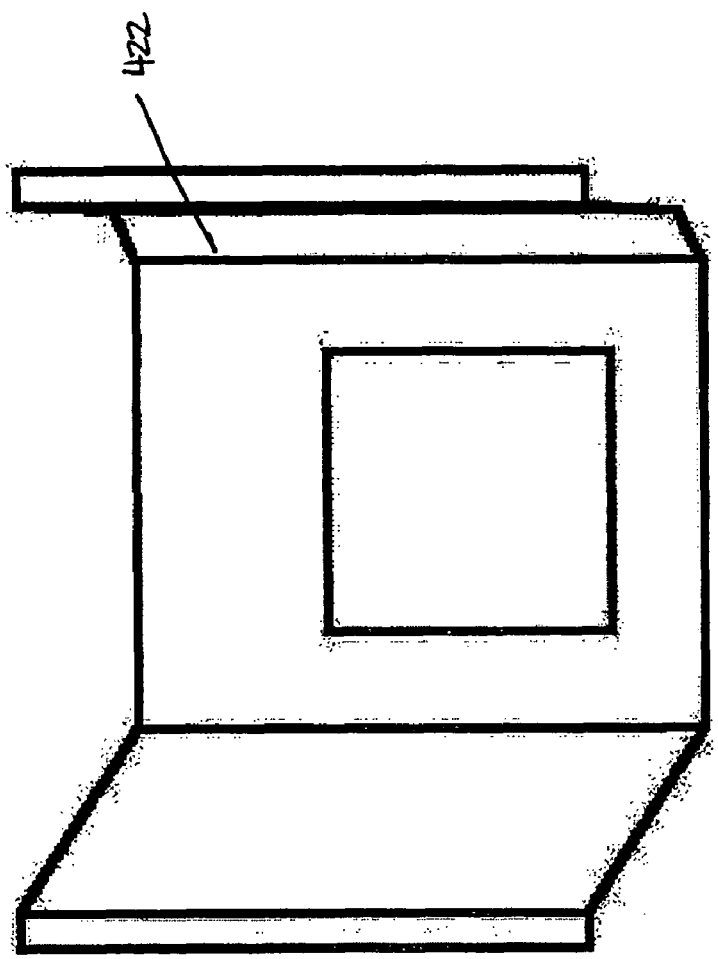
FIGS. 9 and 10 show perspectives of a transfer bed hood for the apparatus shown in FIG. 5.
Figure 10:
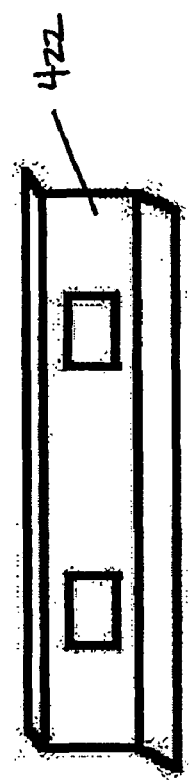
Figure 11:
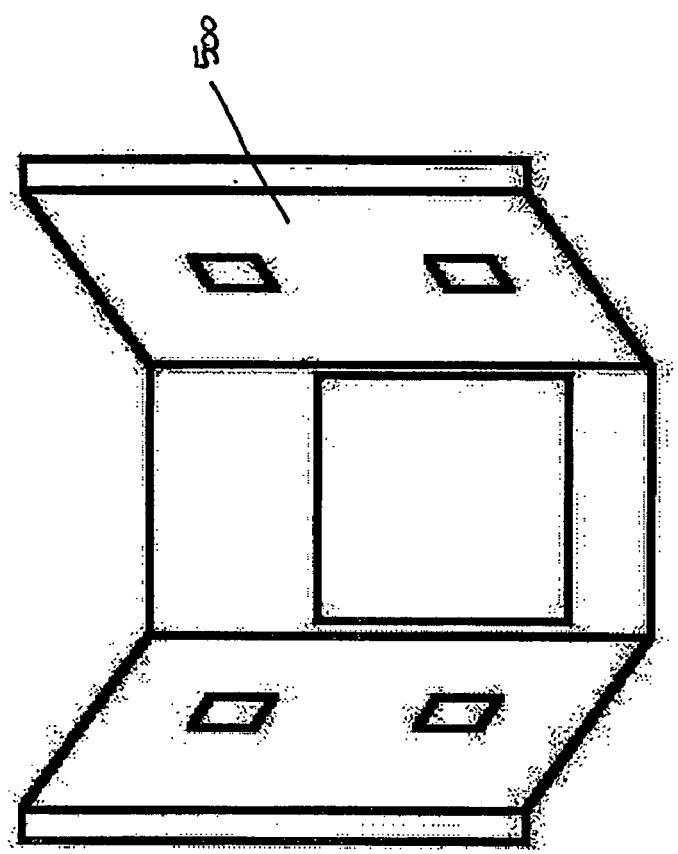
FIGS. 11 and 12 show perspectives of a transfer bed hood for the apparatus shown in FIG. 5.
Figure 12:

FIG. 6 illustrates a feeder assembly 402 for the apparatus 400. The feeder assembly 402 sits just above the entry end of the conveyor chamber forward of the slipstick drive mechanism. The feeder assembly 402 includes an input section 418, a transition section 420, and an adapter section 422. The feeder assembly 402 and its respective sections 418, 420, 422 are typically fabricated from approximately 0.13-inch (3.2 mm) thick aluminum plate. Alternative arrangements for a feeder assembly can be designed in accordance with the invention, depending upon the processing capacity of the system 200. The input section 418 is sized to receive fuel from the raw fuel section 202 of FIG. 4. In the example shown, the input section 418 is a funnel having a square-shaped cross-section that narrows from a fuel measurement end towards a transition section end. Note that the input section 418 can have alternative configurations, shapes, and sizes depending upon the raw fuel section 202, the processing capacity of the system 200, and/or the shape of the transition section 420.

The transition section 420 is sized to receive pre-sized fuel from the input section 418, described above. In the example shown, the transition section 420 is a duct with a consistent square-shaped cross-section from an input section end towards an adapter section end. A set of slide gates 416 can be installed at or near the input section end and adapter section end to provide control of fuel flow from the raw fuel section 202. Note that the transition section 420 can have alternative configurations, shapes, and sizes depending upon the processing capacity of the system 200, the shape of the input section 418 and/or the shape of the adapter section 422. Other types of gates or valves can be used in conjunction with the feeder assembly 402.

The adapter section 422 is sized to receive fuel from the transition section 420 described above. In the example shown, the adapter section 422 is a concave-shaped piece that is adapted to fit with a corresponding opening of the drive component 404. Note that the adapter section 422 can have alternative configurations, shapes, and sizes depending upon the processing capacity of the system 200, the shape of the transition section 420, and the drive section 404.

In some embodiments, expansion joints (not shown) can be installed with or used in conjunction with various components 418, 420, 422 of the feeder assembly 402 to accommodate for any thermal expansion of the feeder assembly 402 or components operating adjacent to the feeder assembly 402.

The conveyor assembly 406 includes a transfer bed 424. The transfer bed 424 is adapted to receive a fuel from the feeder assembly 402 and is further adapted to transfer fuel along a portion of the length of the transfer bed 424 towards a collection area 426 at an opposing end of the transfer bed 424. The transfer bed 424 shown is a horizontally-oriented, open-sided trough. The transfer bed 424 can have other configurations, shapes, and sizes depending upon the capacity of the system 200.

FIGS. 7-12 illustrate aspects of a transfer bed hood for the apparatus shown in FIG. 5. As shown in FIGS. 7-12, the reactor component 408 includes a transfer bed hood 500 and a series of magnetrons (described in FIG. 4 as the electromagnetic-radiation generator section 208). The transfer bed hood 500 is adapted to cover the open-end portion of the transfer bed 424. The series of magnetrons is installed along the length of the transfer bed hood 500 and is positioned to provide electromagnetic energy towards fuel located within the transfer bed 424. As discussed before, the feedback system section 206, the process-control section 222, and the electromagnetic-radiation generator 208 interact with the process conveyor section 204 to control, monitor and adjust the amount of electromagnetic energy provided by the series of magnetrons aligned along the transfer bed hood 500 and transfer bed 424. Other configurations of a reactor component 408 in accordance with the invention can be implemented with the system 200 or similar systems.

When activated, the conveyor assembly 406 applies a repetitive, actuation force to the transfer bed 424, and a solid fuel, such as coal, is fed to a proximate end of the transfer bed 424 from the feeder assembly 402. As each actuation force is applied to the transfer bed 424, the force causes the fuel to move toward a distal end of the transfer bed 424 (toward collection point 426). While the fuel is moving along the length of the transfer bed 424, the magnetrons are activated to provide a specific amount of electromagnetic energy to the fuel in the transfer bed 342. The amount of electromagnetic energy is based in part on the amount of fuel in the transfer bed and the rate of movement of the fuel along the transfer bed 424, as determined by the feedback system section 206 and/or process control section 222.

H. Batch-Processing Apparatus

Figure 14:
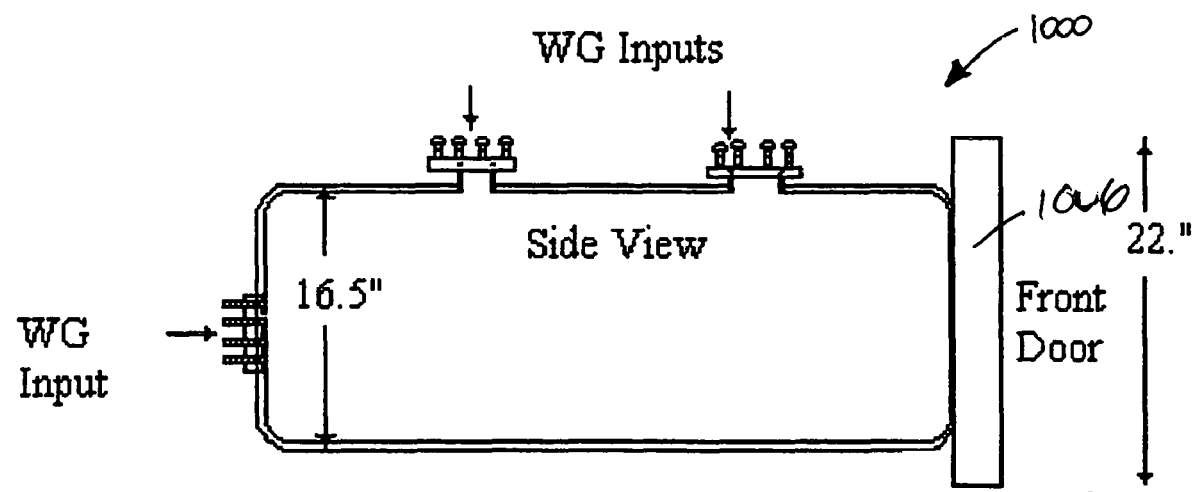
FIGS. 14 and 15 illustrate a top and side view of the batch processing assembly shown in FIG. 13.
Figure 15:
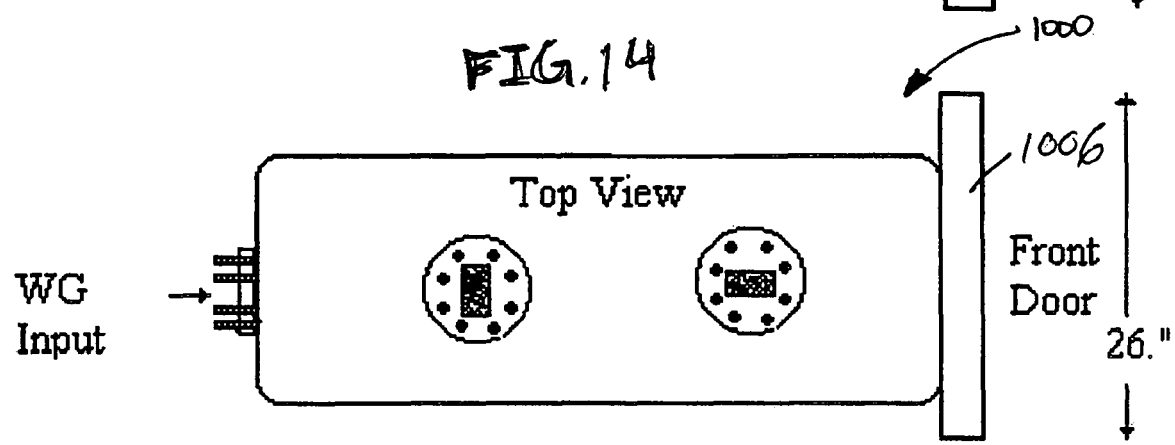

FIGS. 13-15 illustrate an apparatus 1000 for batch processing of coals or other solid fuels. This apparatus 1000 can be used in conjunction with or separately from the apparatus shown in FIGS. 5-12. The process methodology described by FIG. 3, specifically block 108, can also be implemented by the apparatus 1000. In the example shown, magnetrons 1002 are utilized to apply a specific amount of electromagnetic energy to fuel such as coal placed within the apparatus. The wave energy is directed through a waveguide to the WG (waveguide) input on the apparatus. The apparatus 1000 includes electromagnetic-radiation monitoring ports 1004 and a front door 1006 for loading coal into the chamber. Other configurations of a batch-process apparatus can exist in accordance with the invention.

IV. Apparatus—Embodiment B

Figure 16:
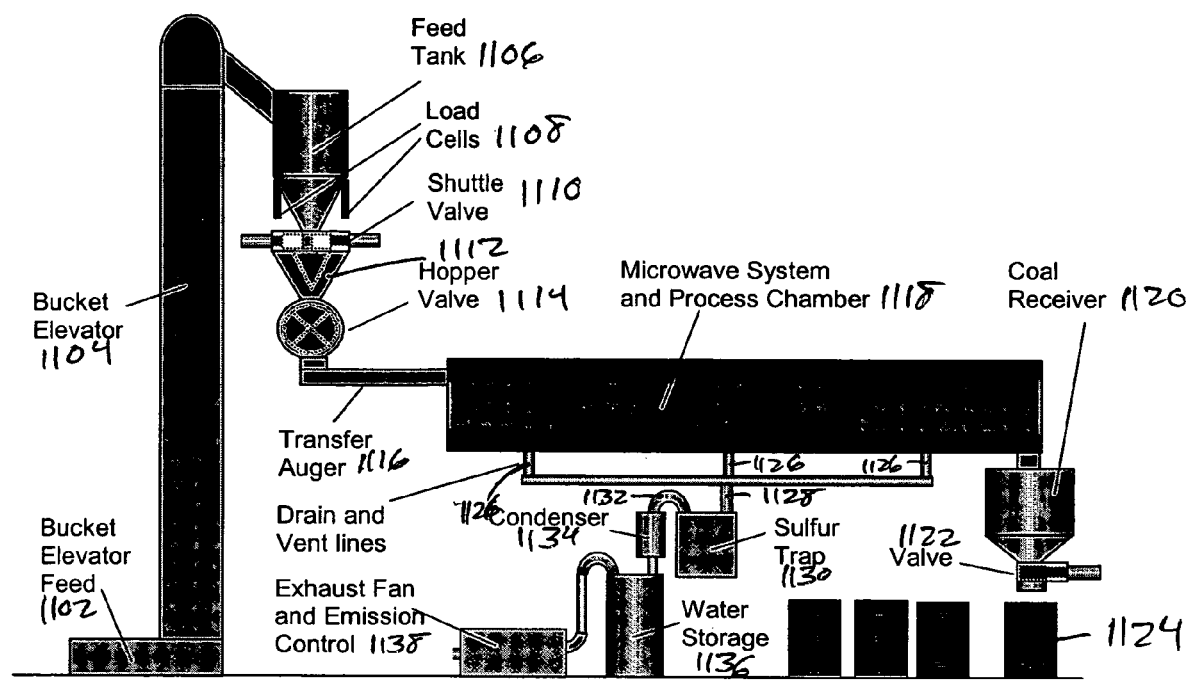
FIG. 16 illustrates a pilot plant.
Figure 1:
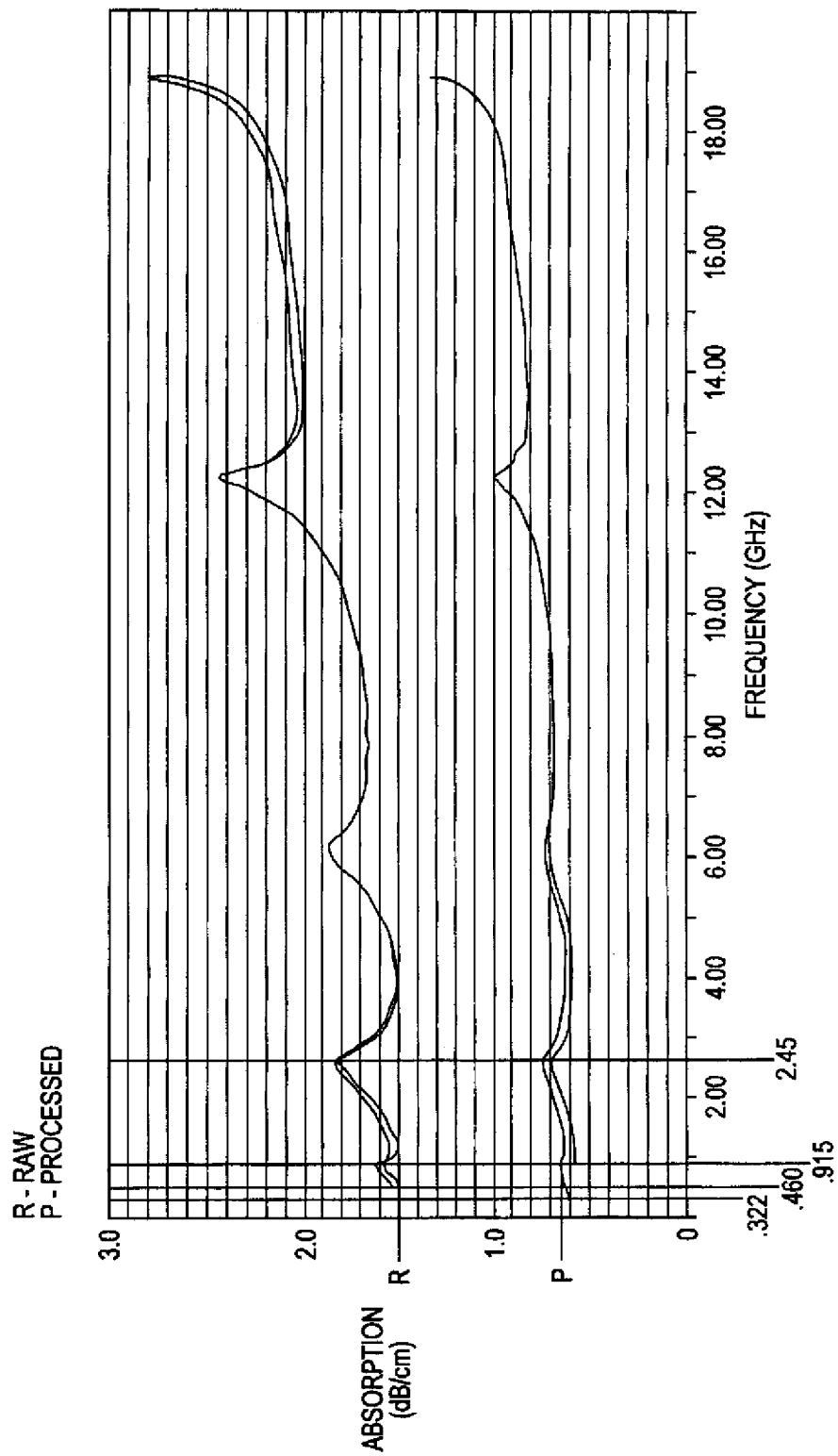
Figure 2:
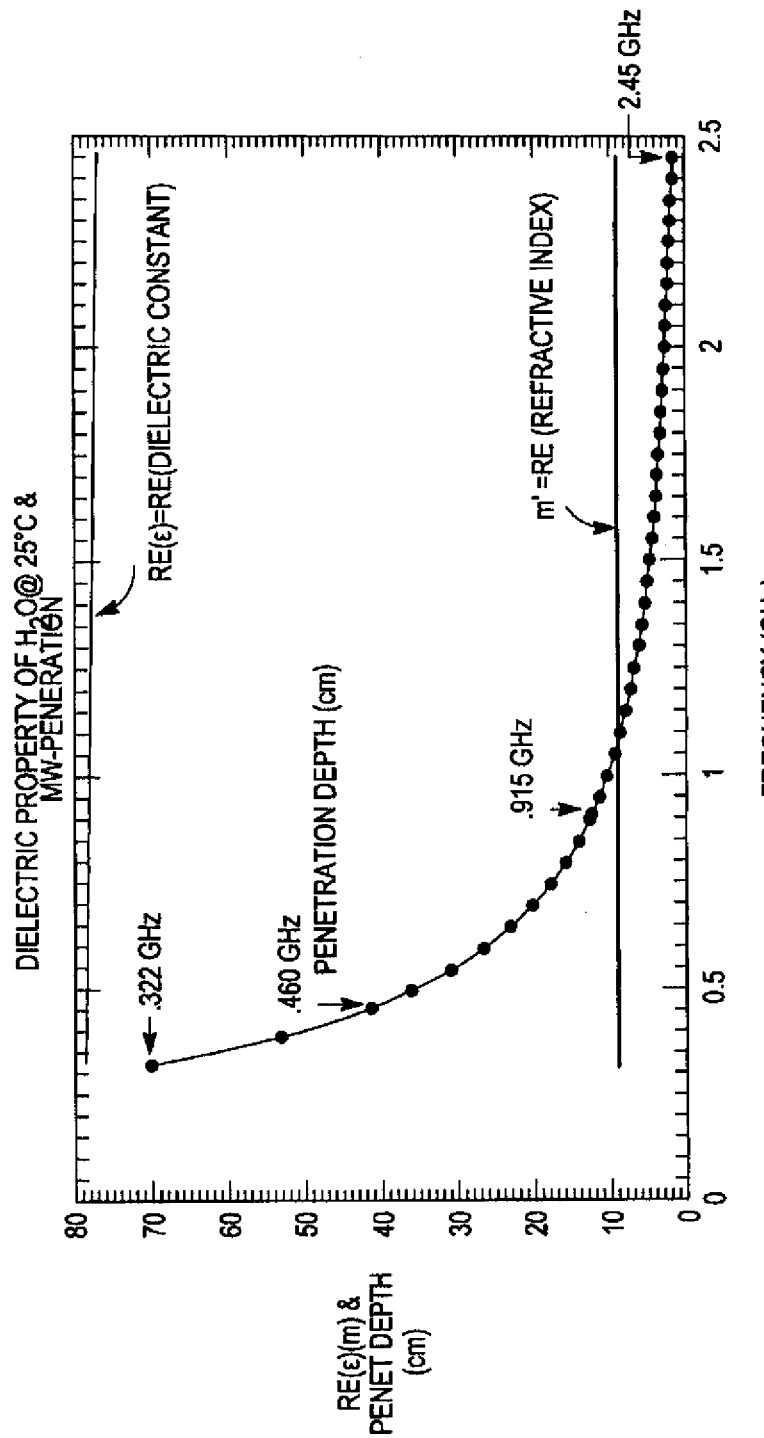
Figure 3:
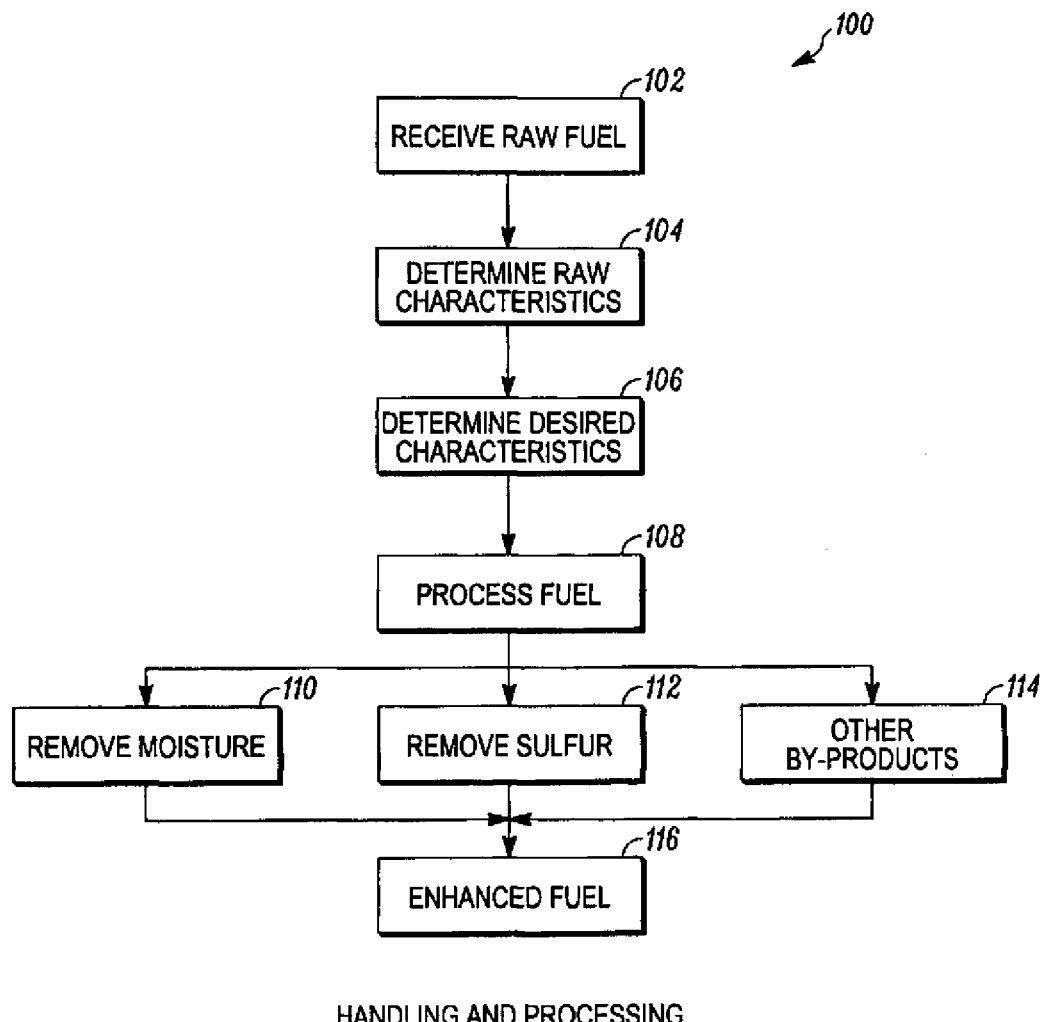
Figure 4:
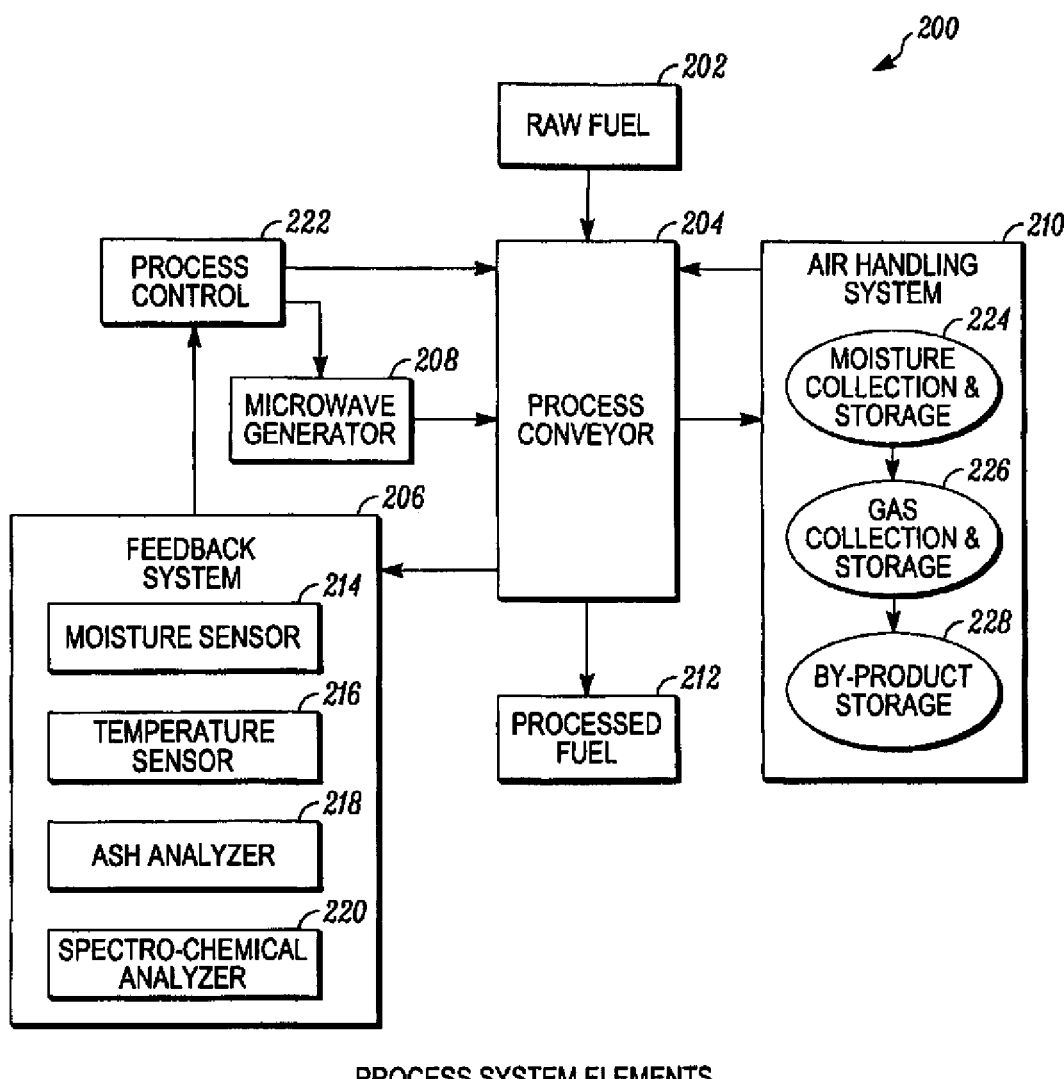
Figure 5:
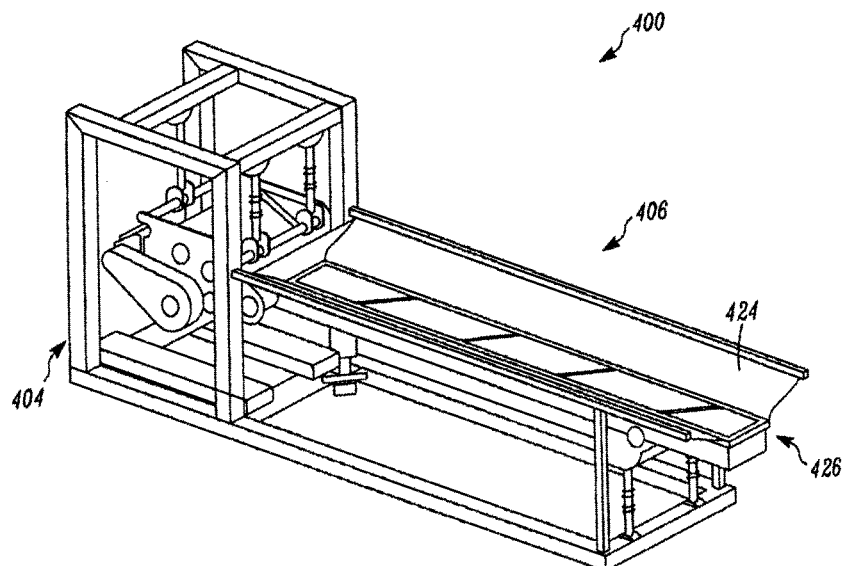
Figure 6:
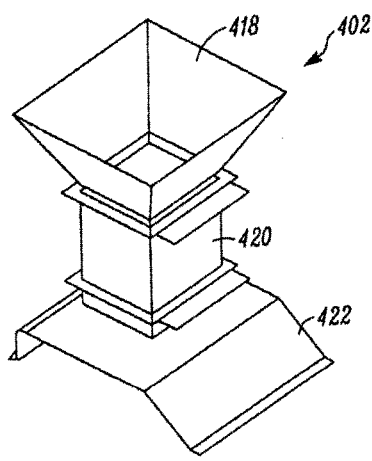
Figure 7:
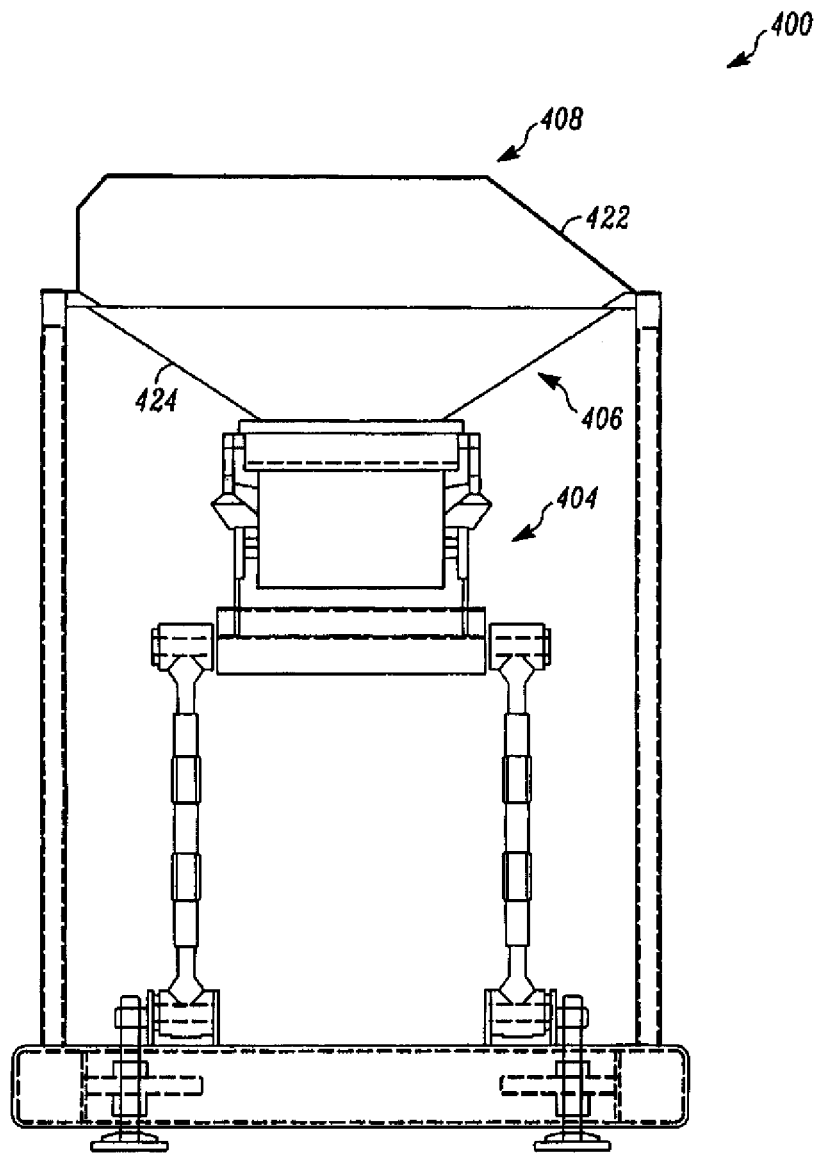
Figure 8:
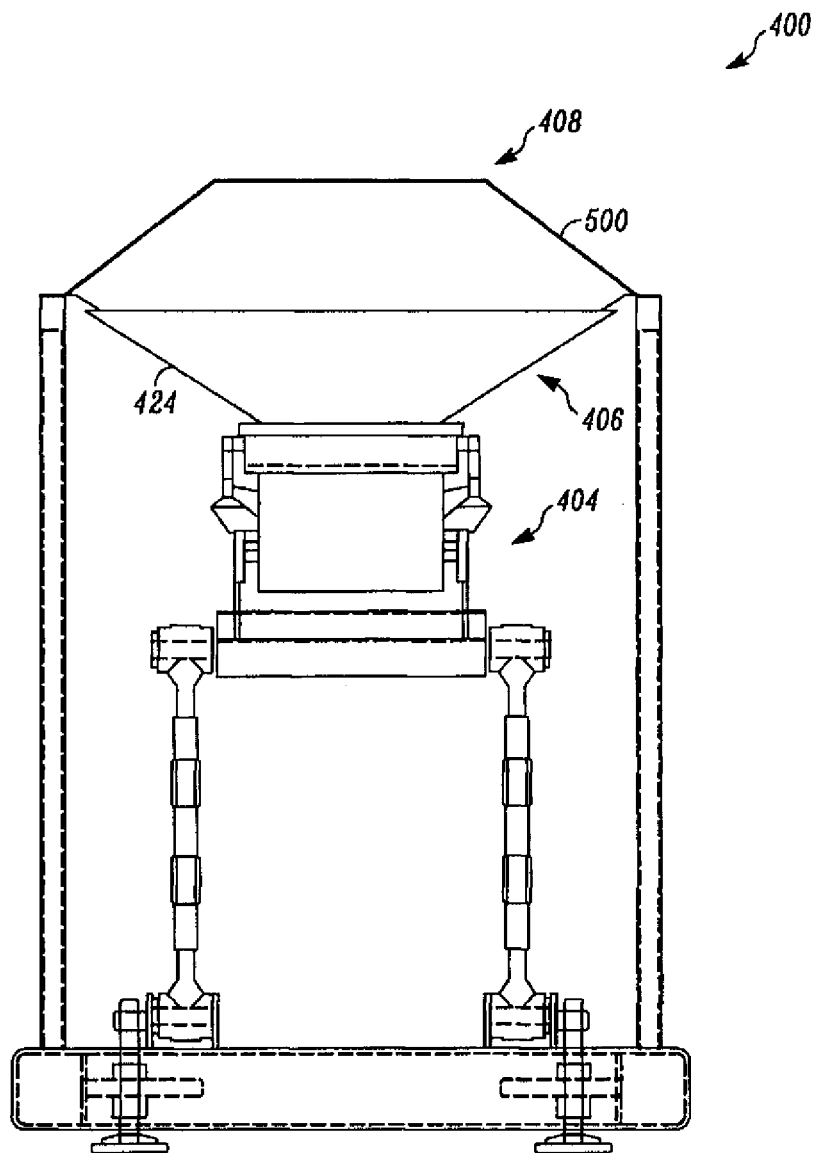
Figure 9:
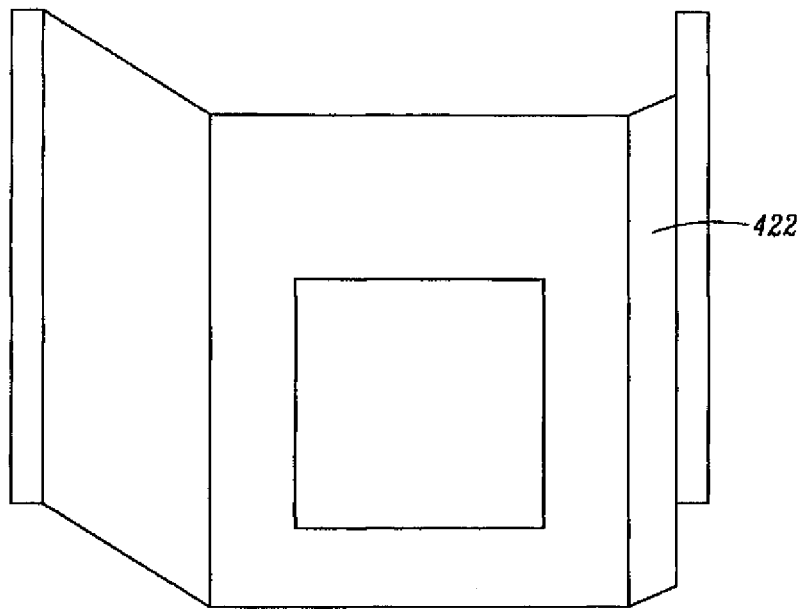
Figure 10:
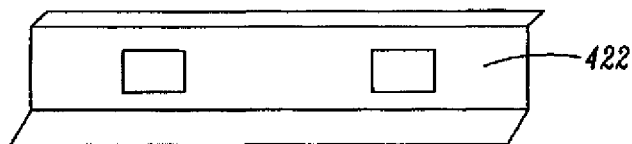
Figure 11:
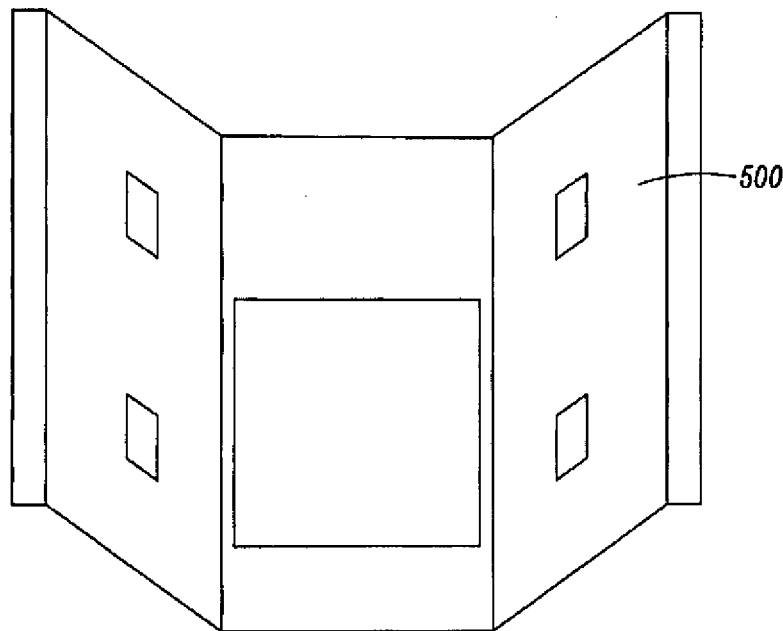
Figure 12:
Figure 13:
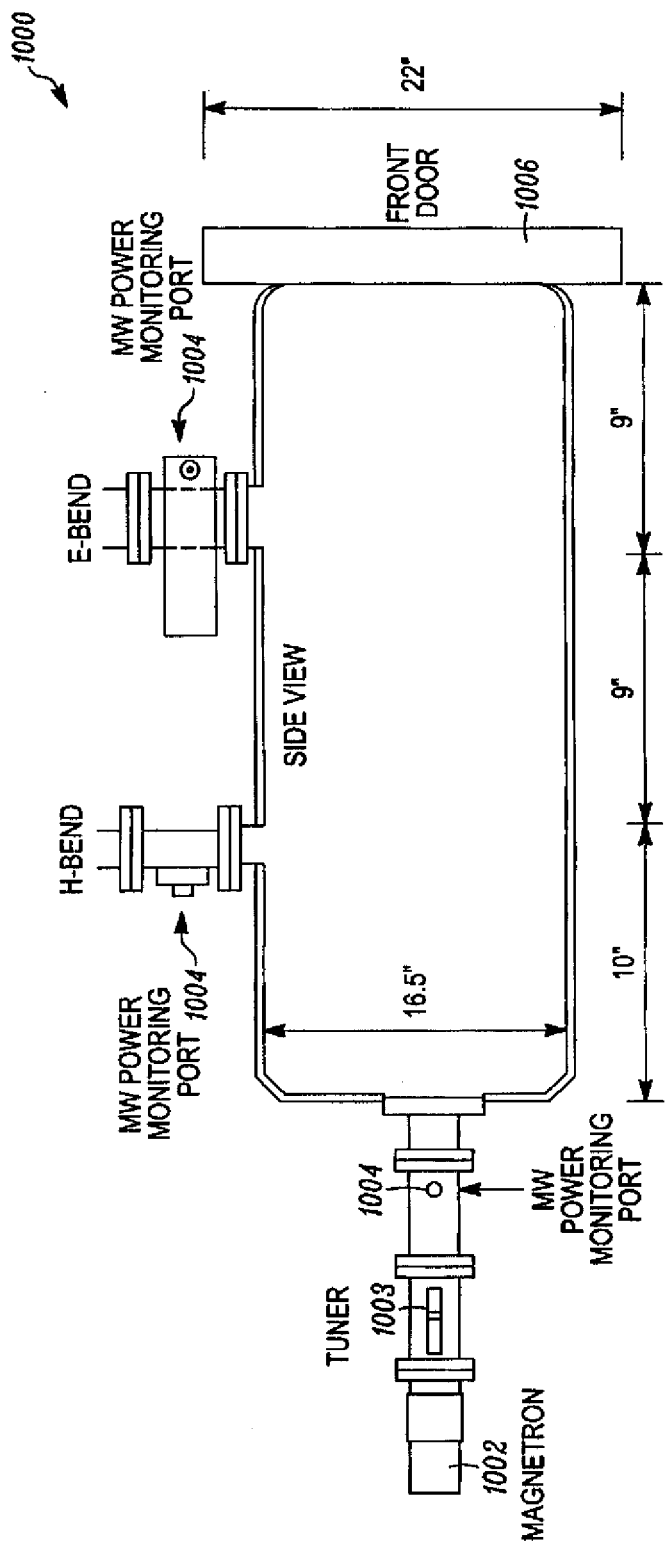
Figure 14:
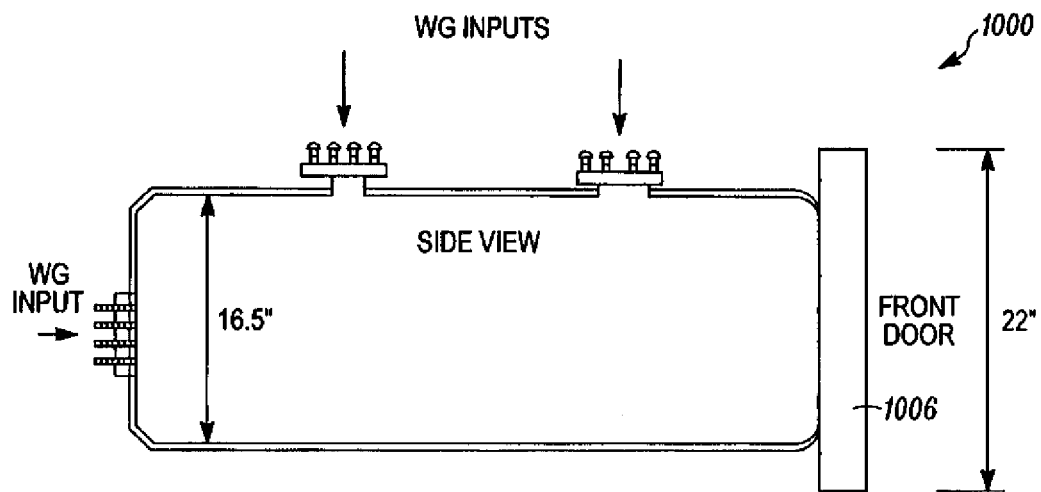
Figure 15:
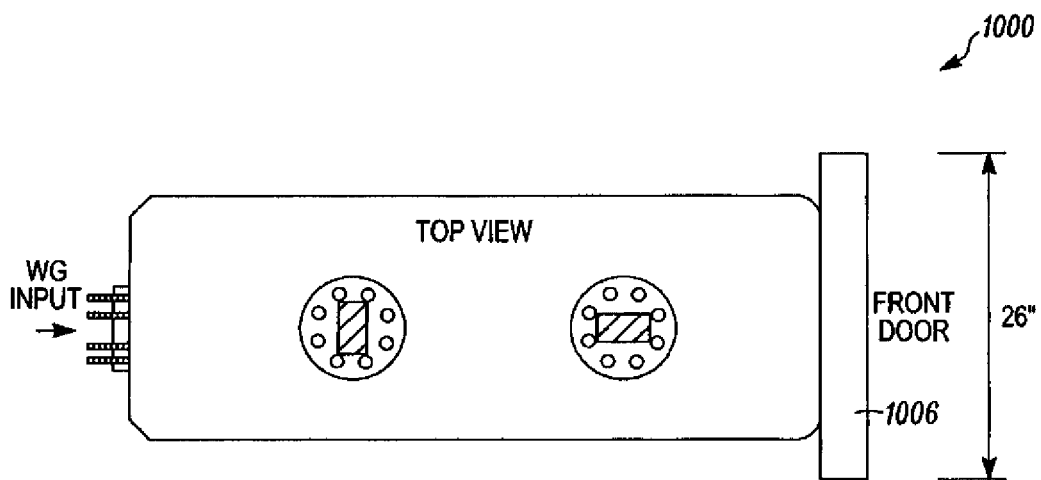
Figure 16:
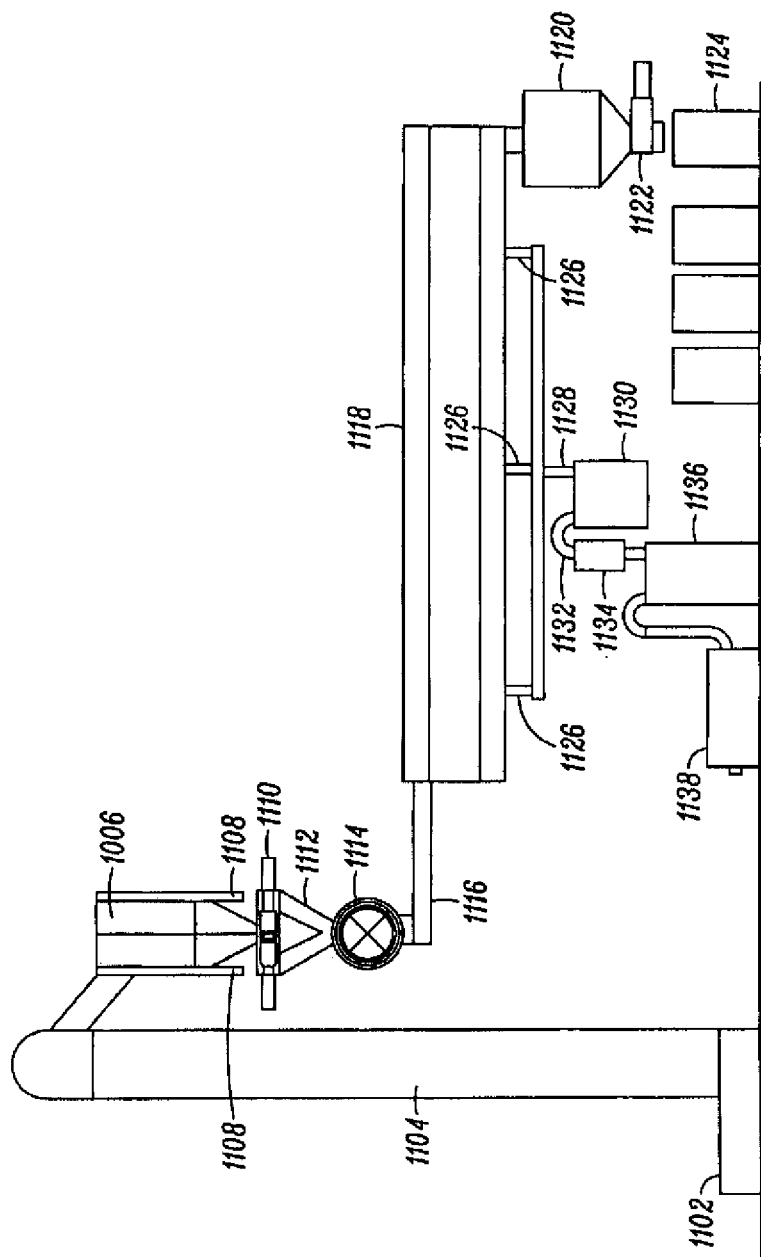
Figure 1:
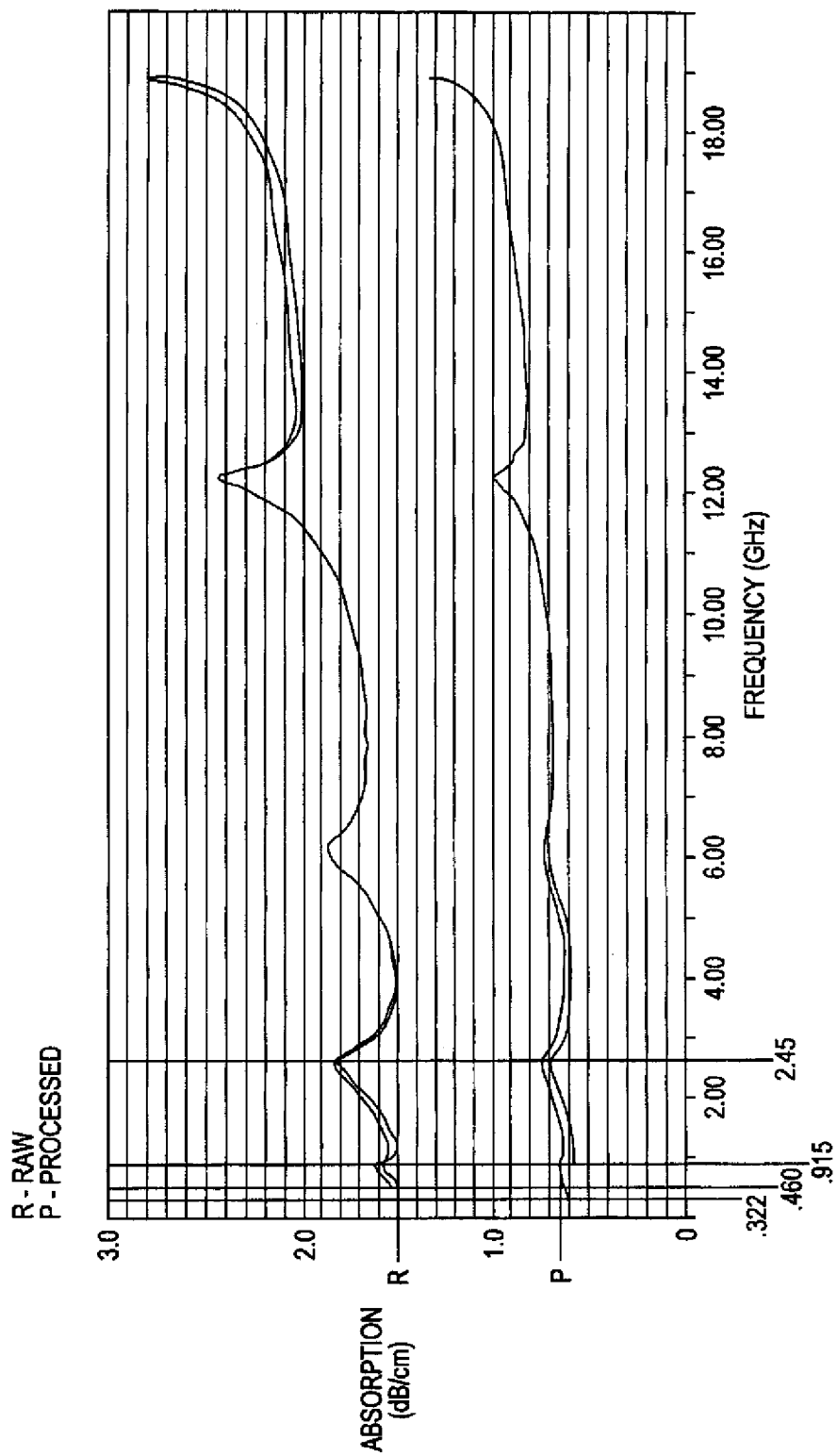
Figure 2:
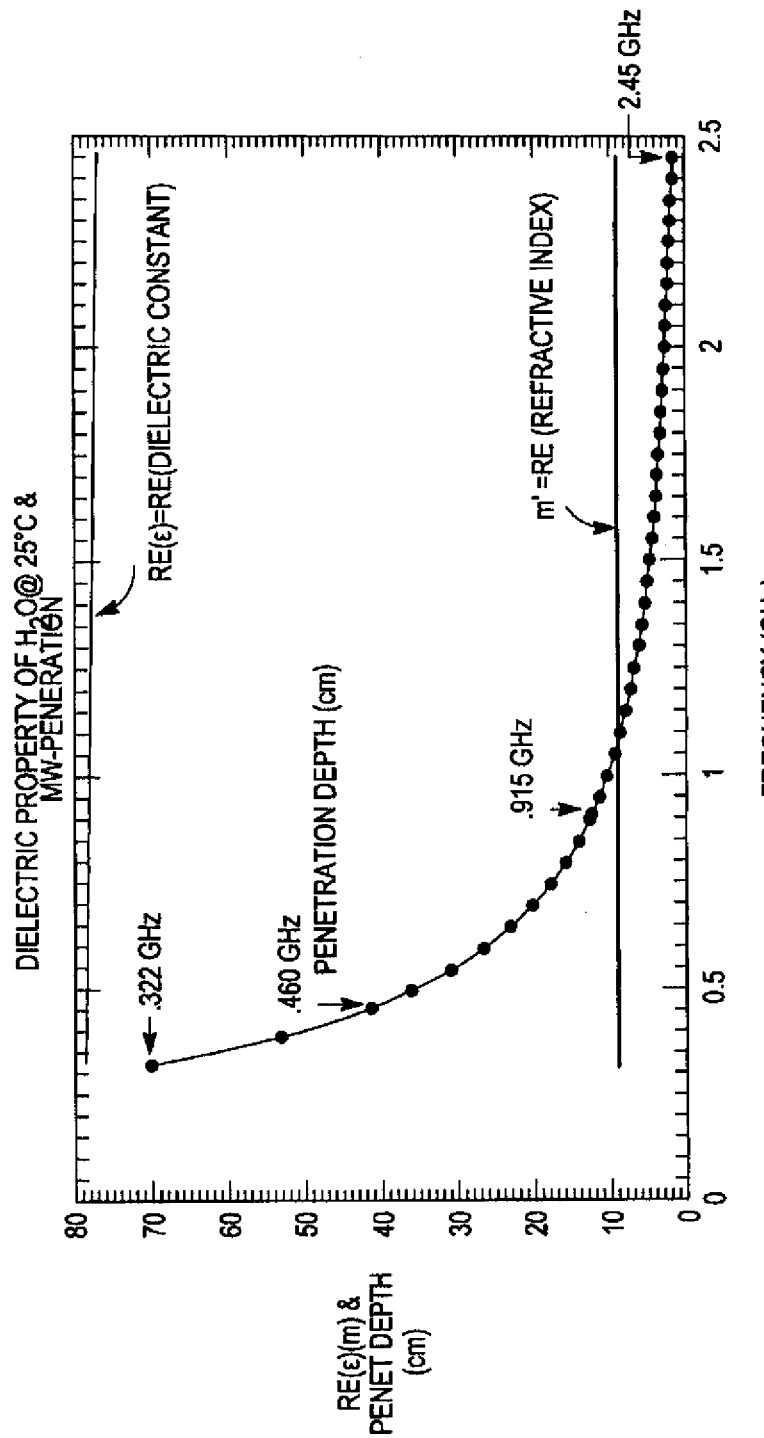
Figure 3:
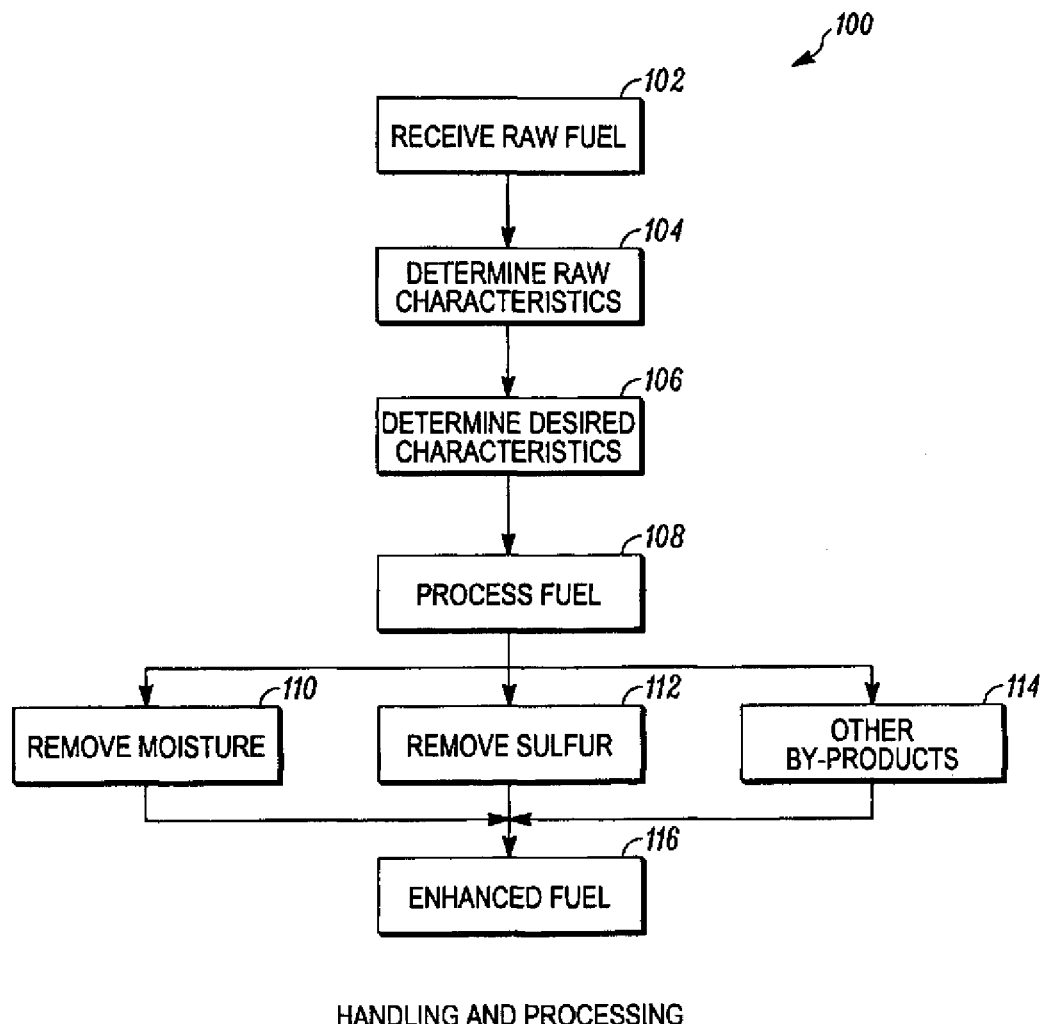
Figure 4:
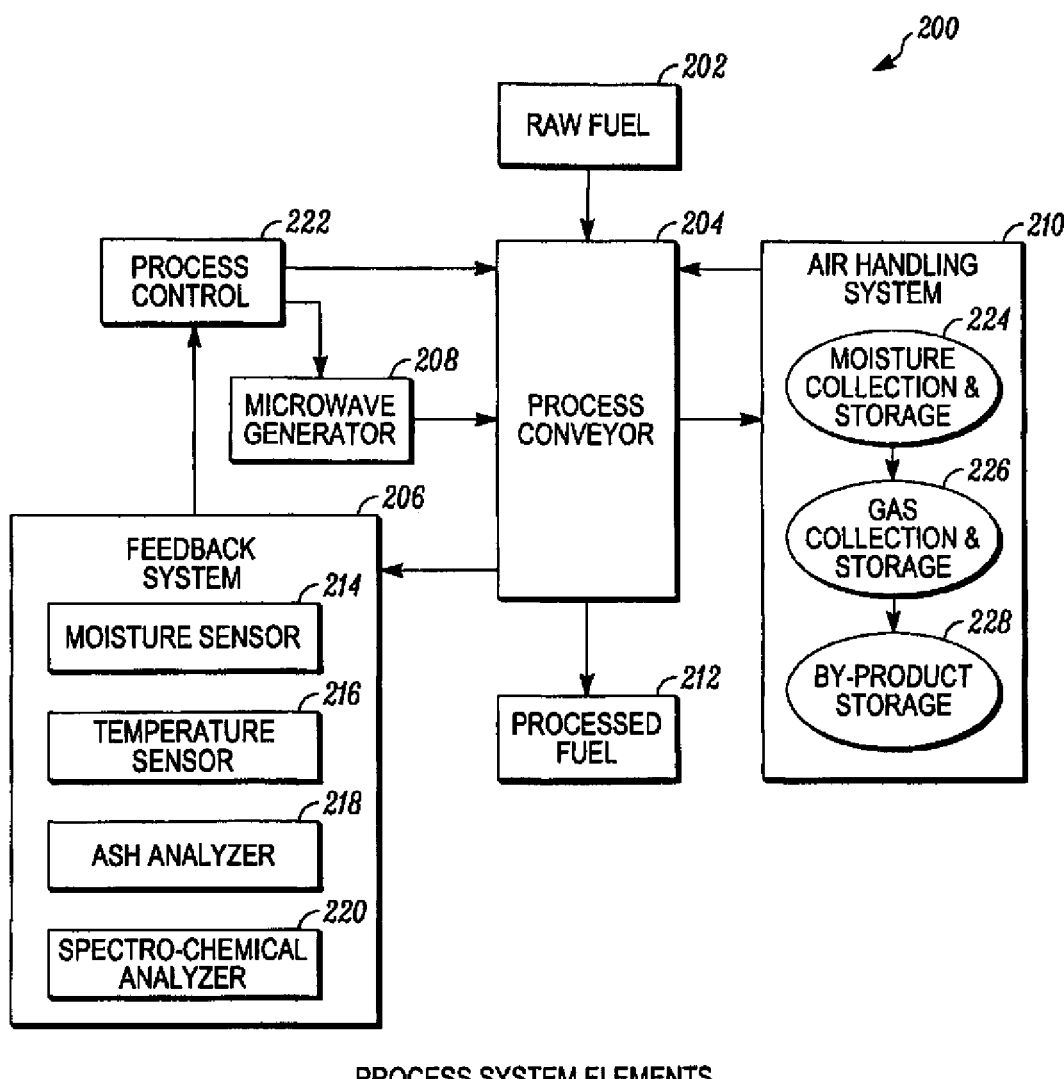
Figure 5:
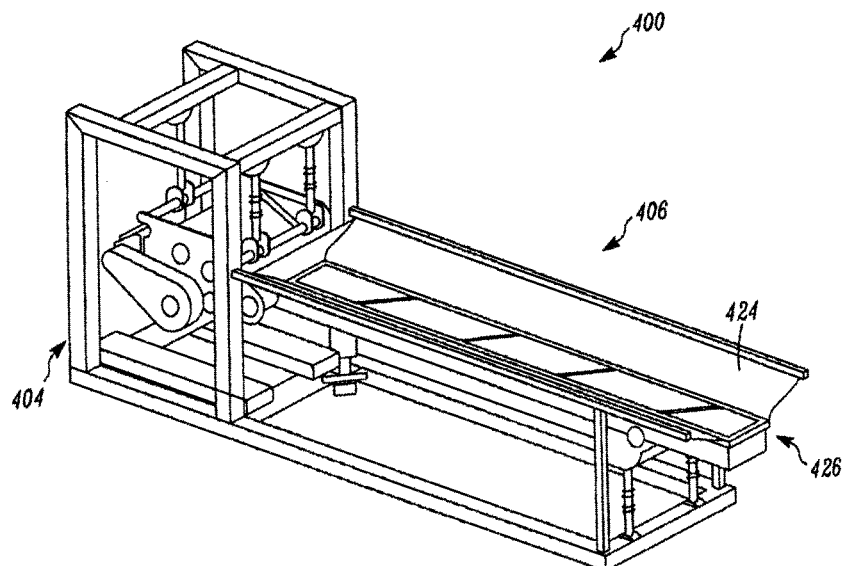
Figure 6:
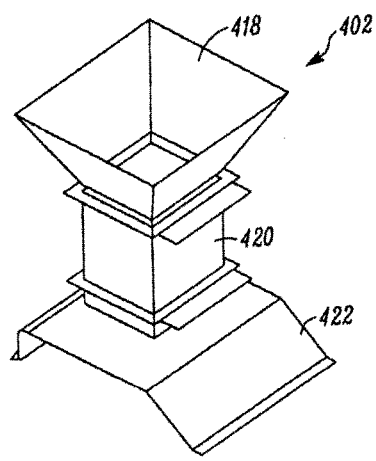
Figure 7:
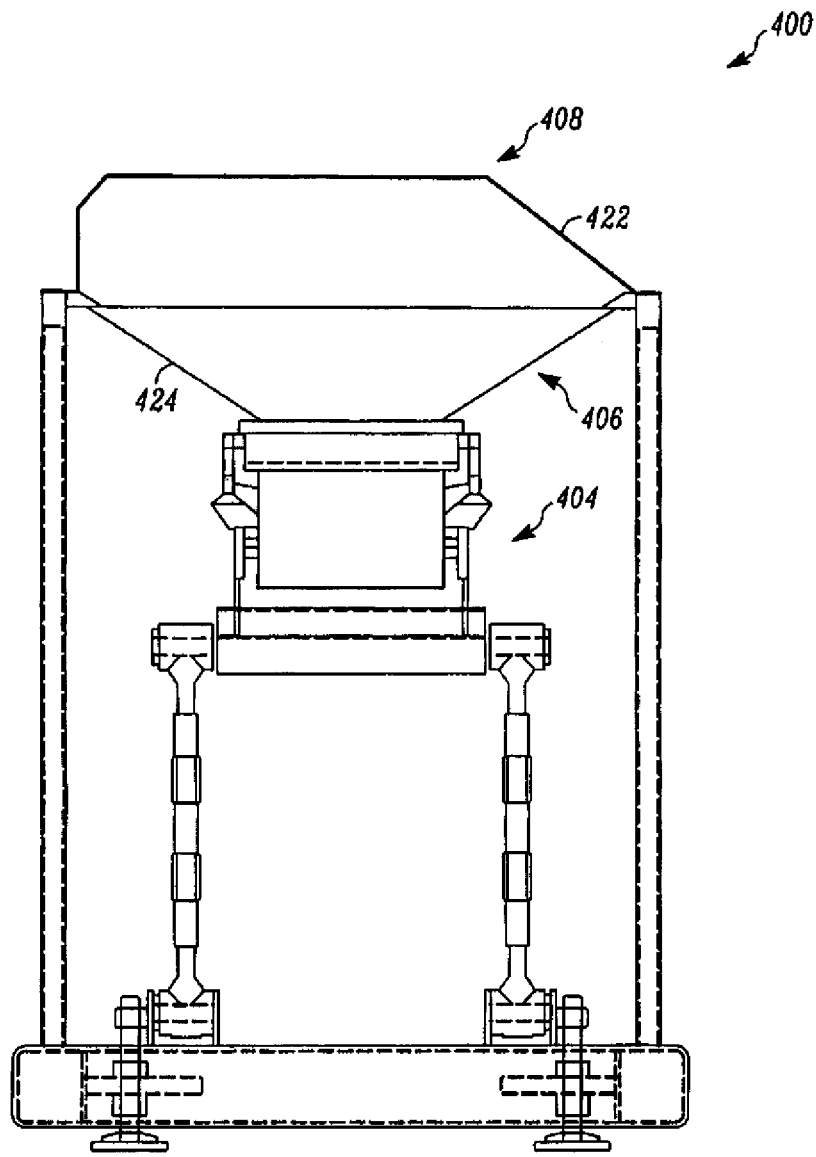
Figure 8:
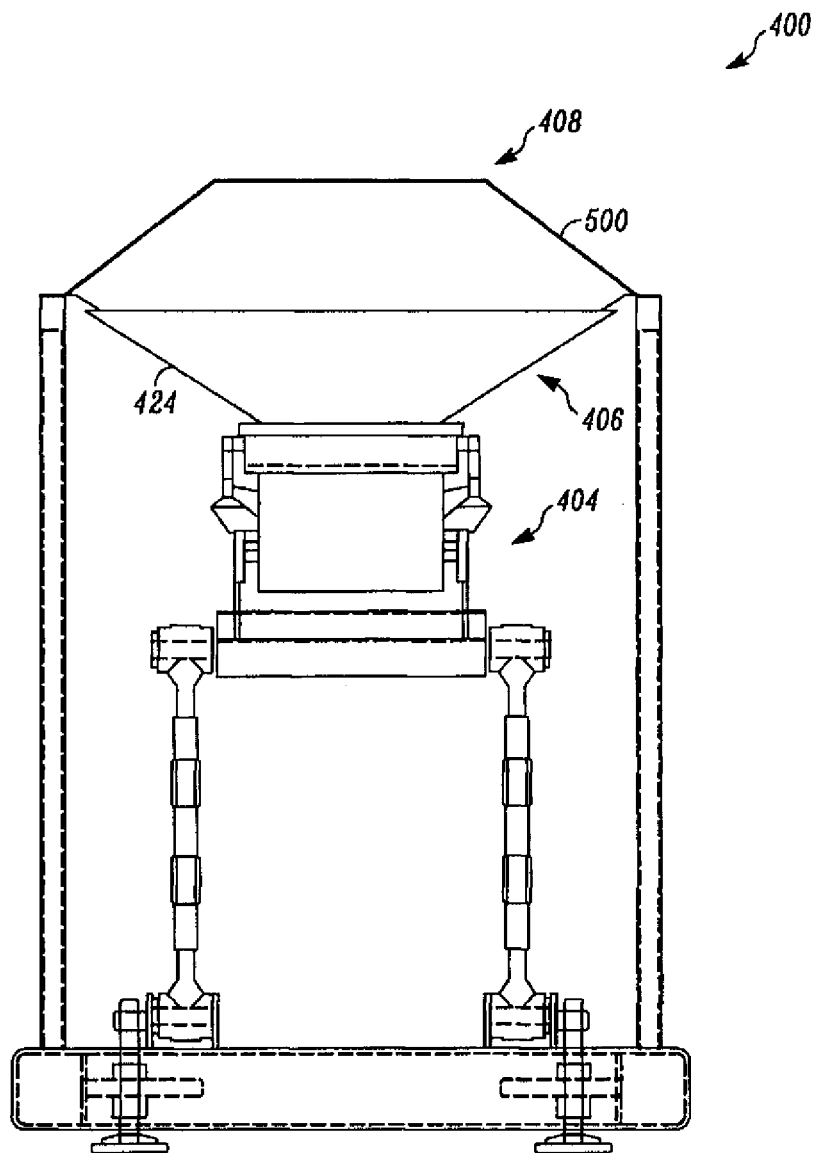
Figure 9:
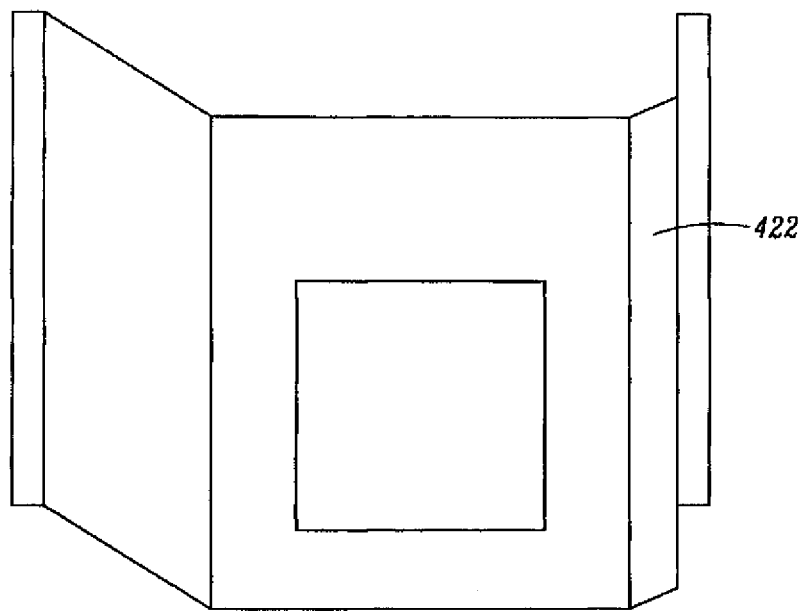
Figure 10:
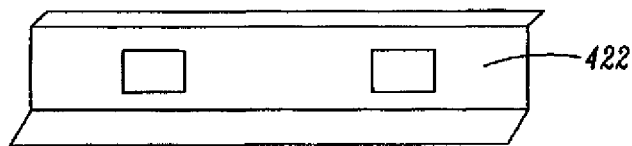
Figure 11:
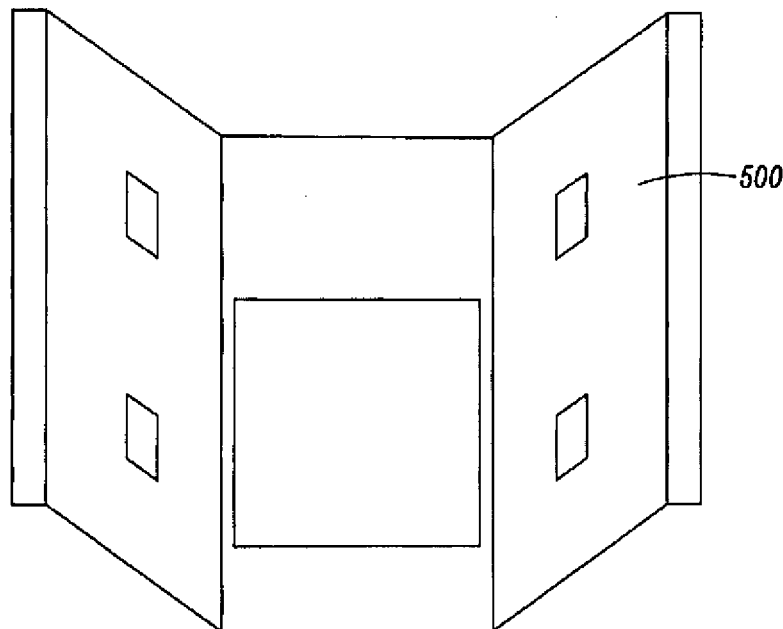
Figure 12:
Figure 13:
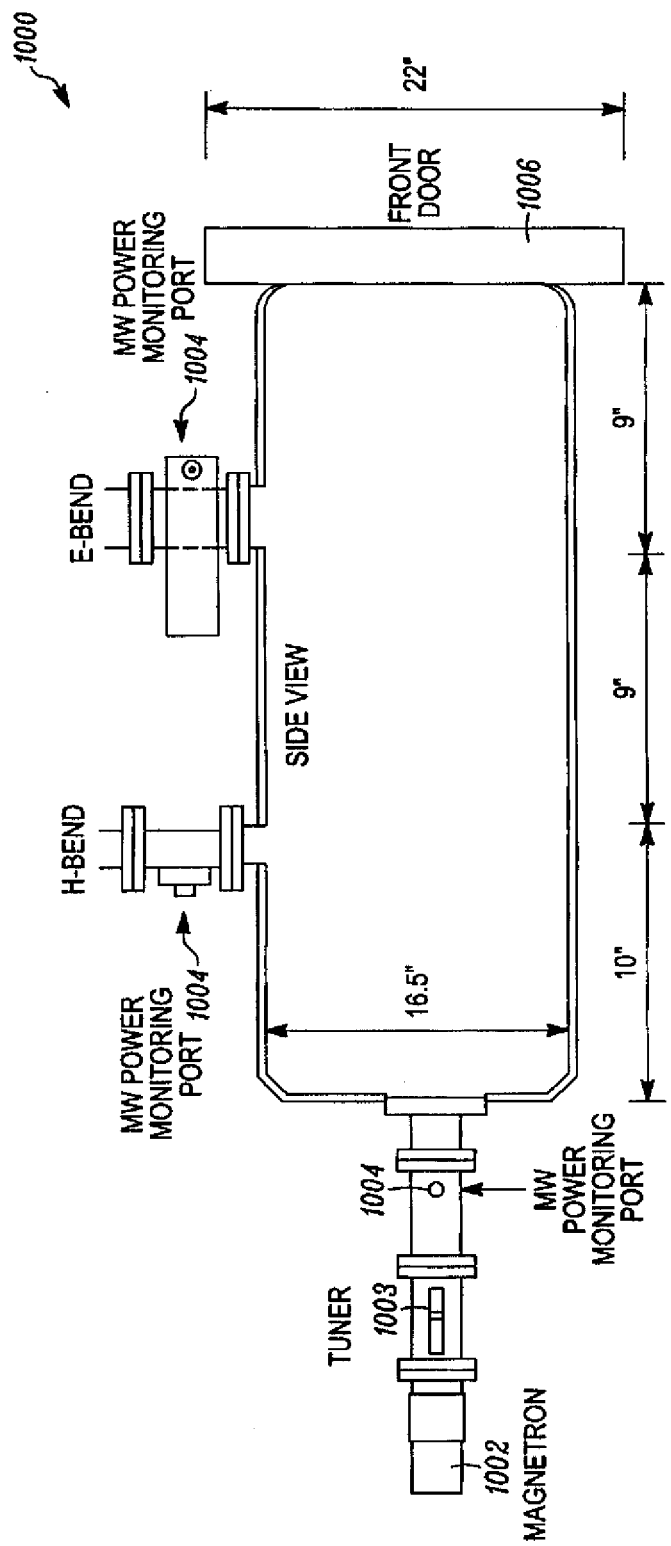
Figure 14:
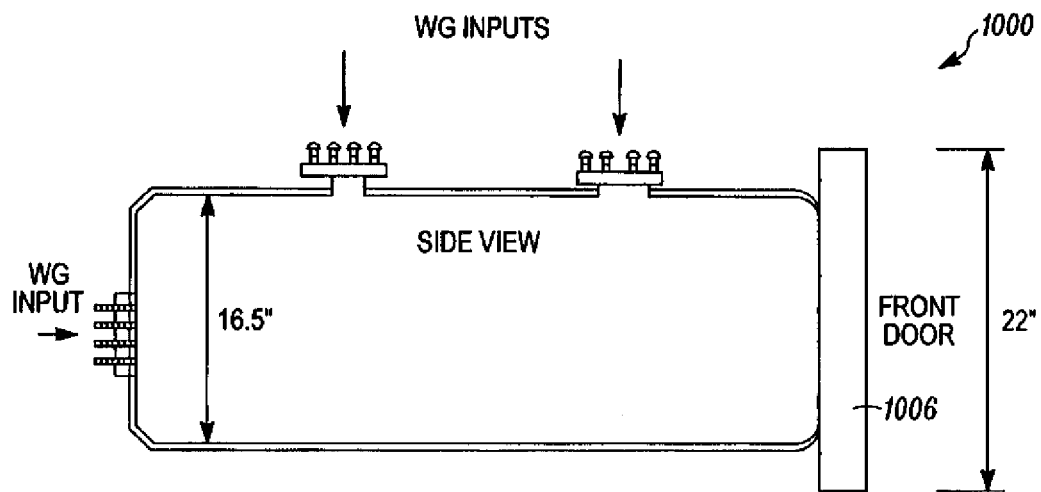
Figure 15:
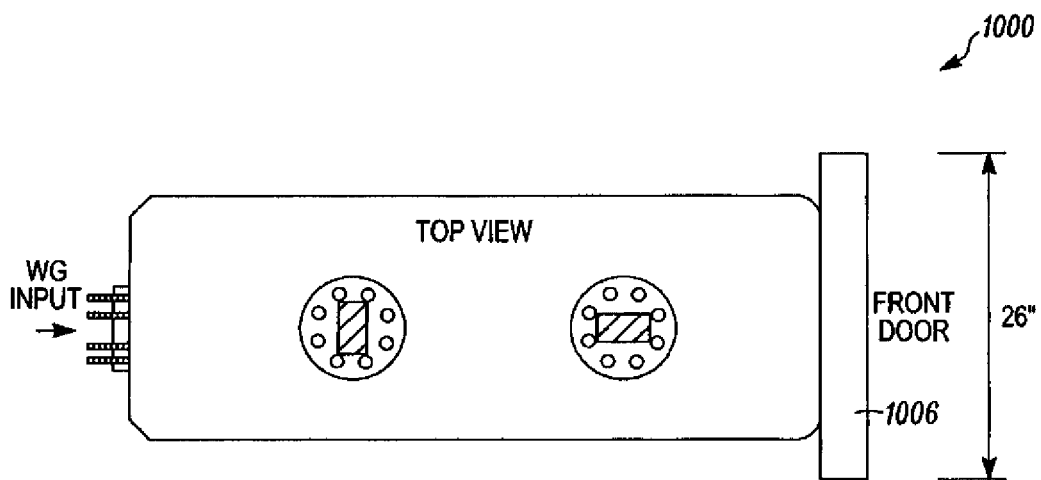
Figure 16:
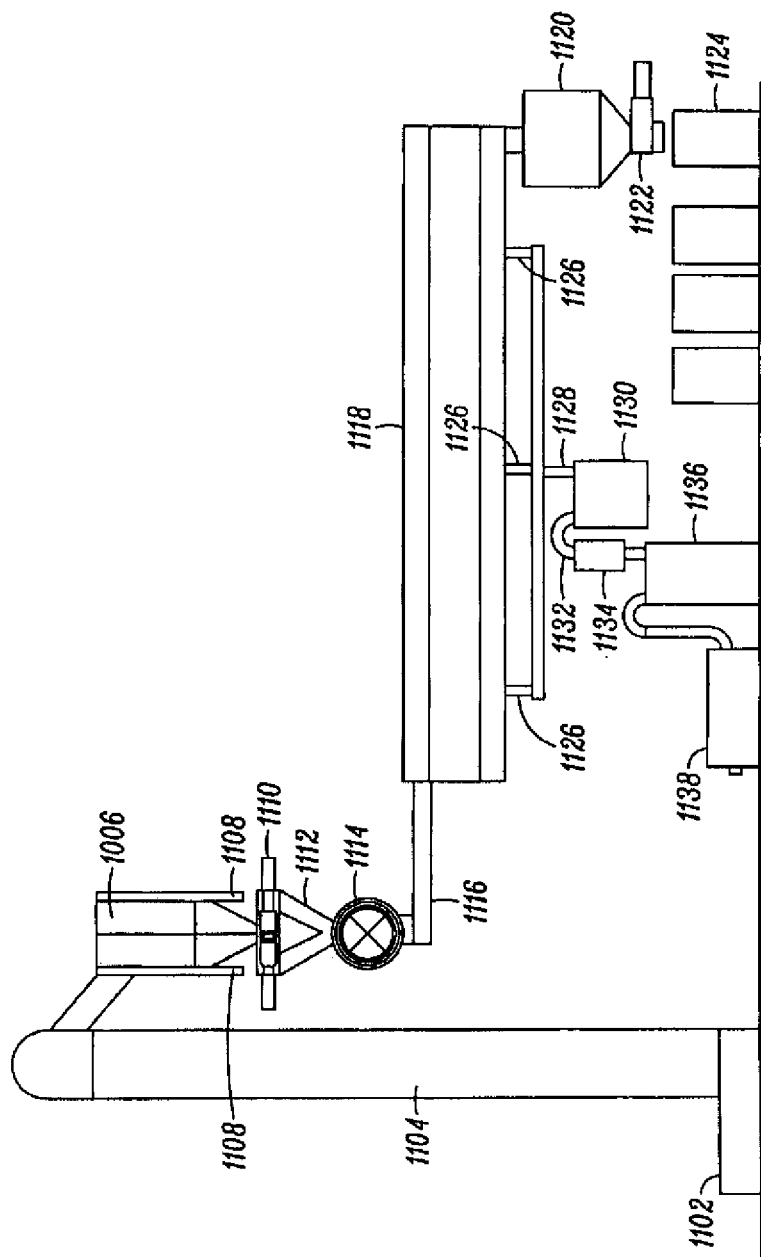

An embodiment of a pilot plant is illustrated in FIG. 16. The plant features a bucket elevator feed 1102 coupled with a bucket elevator 1104 for transporting raw coal to the feed tank 1106. The feed tank 1106 is mounted over a shuttle valve 1110, hopper 1112 and hopper valve 1114. When coal flows from the feed tank 1106 down through the hopper valve 1114, the coal is dumped into a transfer auger 1116, which transports the coal through the microwave processing chamber 1118. Upon exiting the microwave processing chamber 1118, the coal flows through a coal receiver 1120 and valve 1122 into storage receptacles 1124.

The process chamber 1118 is also fitted with drains 1126, which feed into a vent line 1128. The vent line 1128 leads to a sulfur trap 1130. Another line 1132 directs the flow from the sulfur trap 1130 to the condenser 1134, then to a water storage tank 1136 and finally to an exhaust fan and emission-control system 1138.

The process flow through this plant is briefly described, below.

First, the exhaust fan 1138 is started to control dust that would be generated by the dumping operation. The exhaust fan 1138 pulls air from the bucket elevator 1104 through the system and discharges the resulting clean air.

Coal is supplied in drums and is dumped using a skid-steer loader or fork truck equipped with a drum-handler/dumper into the bucket elevator feed hopper 1102. The bucket elevator 1104 transfers coal samples to the feed tank 1106 for the batch to be processed. Depending on the size of the test run, several 55-gallon drums of coal can be dump-loaded into the system.

Once the coal batch is loaded into the feed tank 1106, a nitrogen purge is started, and the feed tank 1106 is closed to isolate the processing system. The exhaust fan 1138 continues to operate through the process, including cool-down of the process system.

The amount of coal transferred to the feed tank 1106 is monitored with the load cells 1108, which also supply feed-rate information. The shuttle valve 1110 is used to control the flow from the feed tank 1106 to the raw material transfer system. To maintain coal flow at a constant rate, this valve 1110 is shuttled back-and-forth to move small amounts of coal to the rotating hopper valve 1114. The hydraulic cylinders of the shuttle valve 1110 provide enough power to move the shuttle through the coal and crush larger lumps as required.

Since the sizes of the shuttle valve 1110 and hopper valves 1114 are designed to prevent overfilling the hopper 1112, the hopper 1112 could rotate continuously and thereby provide a constant supply of coal to the transfer auger 1116. The transfer auger 1116 acts to level the rate that coal is supplied to the microwave processing chamber 1118.

The process control and feedback systems and conveyor are designed to ensure that the coals receive the required irradiation dose on average for their dwell times in the processing chamber. The rates of movement for each of the supply units (shuttle valve 1110, hopper valve 1114, and transfer auger 1116) are independently controlled to provide a constant feed rate of coal to the material transfer system in the microwave processing chamber 1118.

Before it reaches the exit end of the chamber 1118, the processed coal enters an area (not shown) where it is allowed to further emit and cool before it is removed, so as to help control odors and collect other emissions from the processed coal. After the product has cooled, the nitrogen purge is stopped, but operation of the exhaust fan 1138 is continued to capture dust produced during transfer of the processed coal to drums. A hydraulic valve 1122 is used to aid transfer of the processed coal into drums 1124. After all of the coal has been processed, cooled, and transferred to drums 1124, the exhaust fan 1138 is stopped.

During the processing operation, any volatile materials (water, sulfur, hydrocarbons, mercury, and other volatiles) are removed from the microwave processing chamber 1118. Water and other fluids drain from the chamber's "overarched" walls are captured in the sulfur trap 1130. The volatile materials (water and hydrocarbons) are then pulled from the sulfur trap 1130 through the condenser 1134 and fall into the water storage tank 1136. Checks for mercury will be made before the material is released.

Residual volatiles are pulled into a filter to remove particulates and a carbon bed to remove organics, mercury, and odors before the nitrogen is vented. The filter and carbon bed are located in the exhaust fan and emission control 1138. The carbon beds will be recycled or disposed of as hazardous waste.

V. Processed-Coal Properties

The variability in raw-coal properties is countered by constant monitoring and appropriate feedback adjustments germane to the process systems described herein to ensure the production of a solid fuel with uniform properties. Some coal-fired boilers are limited as to their maximum temperatures. In such cases, moisture and ash reduction are targeted and controlled so as to obtain the optimum BTU/lb without exceeding the maximum BTU/lb and associated maximum temperatures for the boiler(s) in question.

A new family of solid-fuel designer coals not found in nature can be produced via these methods and apparatus. These processed coals can be characterized by one or more of the following:

- moisture content reduced to any desired level in any rank of coal down to 1% or less;
- BTU/lb increased in any rank of coal to any level up to at least the level it would have if free of moisture (the ash content and total-sulfur content are also reduced, these reductions contributing to a further increase in BTU/lb);
- ash content reduced in any rank of coal, reductions ranging from approximately 10% to more than 65% (see the example shown in Tables 1 and 2, below); and
- each and every form of sulfur reduced, with total sulfur reduced by 50% to 75% and, for some coals, even more.

A "new fuel" includes any of these processed coals having a property or properties contained in any of the seven property ranges for each coal type given below.

Bituminous Coals:
U.S. Coal:

|  | typical raw to best |
| --- | --- |
| BTU/lb | 12537 to 14301 |
| % Moisture | 3.39 down to 0.44 |
| % Ash | 10.94 down to 2.65 |
| % Total S | 3.73 down to 1.21 |
| % Pyrite | 1.88 down to 0.32 |
| % Sulfate | 0.14 down to 0.01 |
| % Organic S | 1.73 down to 0.62 |

International Coal (Ref. Tables 1 and 2, Below):

|  | typical raw to best |
| --- | --- |
| BTU/lb | 12737 to 14537 |
| % Moisture | 2.00 down to 0.83 |
| % Ash | 10.29 down to 2.24 |
| % Total S | 3.94 down to 1.84 |
| % Pyrite | 0.88 down to 0.11 |
| % Sulfate | 0.13 down to 0.01 |
| % Organic S | 2.94 down to 1.65 |

Lignites:
U.S. Lignite:

|  | typical raw to best |
| --- | --- |
| BTU/lb | 7266 to 11550 |
| % Moisture | 38.27 down to 3.73 |
| % Ash | 7.29 down to 5.22 |
| % Total S | 2.18 down to 1.13 |
| % Pyrite | 0.68 down to 0.01 |
| % Sulfate | 0.02 down to 0.01 |
| % Organic S | 1.48 down to 1.12 |

International Lignite:

|  | typical raw to best |
| --- | --- |
| BTU/lb | 8195 to 11729 |
| % Moisture | 25.58 down to 5.67 |
| % Ash | 10.68 down to 6.76 |
| % Total S | 5.86 down to 1.78 |
| % Pyrite | 2.60 down to 0.23 |
| % Sulfate | 0.45 down to 0.07 |
| % Organic S | 2.81 down to 1.31 |

Similar claims can be made for other coals and coal classes processed by the methods and apparatus of this disclosure, and additional process test results will make it possible to identify and create such new fuels for any rank or class of coal. The end result will be a matrix of all coal ranks and classes and all "new fuels" able to be obtained from processing by the invention.

VI. Experimental Results

Coals with the above-outlined properties have been produced via the experiments described below. By comparing the properties of raw and processed coals of the same rank and class and from the same sample batch, we are able to determine the amount of enhancement in each of the seven fuel properties due to processing by these methods and apparatus. More specifically, and by example, presented below are third-party (i.e., Standard Laboratories) test results on each of several raw and processed coal sample groups of bituminous coals and lignites. For raw coals, use is made of average or "typical" properties. Since the processed coal results given here were obtained as part of our program to test the effects of varying the process parameters, they do not demonstrate the full scope of the invention. Said differently, one can expect that controlled processing so as to obtain targeted or optimum properties will result in properties that are better than those obtained during evaluative processing. For this reason, use is made of the "best" processed values shown here for each processed fuel property; and, for demonstration purposes, those values are compared with the "typical" values for the raw, unprocessed coal.

Three different sets of coals, raw and processed, have been processed to illustrate how the process methodology can reduce moisture, can increase the BTU/lb, and can decrease ash and all forms of sulfur. All of these samples were chosen at random from large sample batches, and all of these results are from tests conducted at Standard Laboratories of South Charleston, W. Va.

In Tables 1 and 2 below, respectively, the properties of raw international coal are juxtaposed with those of coal from the same location processed via electromagnetic-radiation methods, described above.

Properties in this raw sample international-coal batch were consistent in every category, except for sample #20731110. The larger reduction in ash for the processed international coals results in a higher BTU/lb than that for the processed U.S. coals. As in the raws, one sample (i.e., sample #20925107) had significantly different properties and, in this case, the highest sulfur for each form of sulfur. Note, however, that the higher sulfur contents had no effect whatsoever on BTU/lb, which is determined primarily by moisture content and ash content. The samples generally had a small variance in properties. These coals were also processed by similar but not identical means (parameters and times).

TABLE 1

International Coal, Raw:

| SL # | BTU/lb As Rec. | BTU/lb Dry Basis | BTU/lb M-A Free | Moisture (%) | Ash (%) | Sulfur Content, Dry Basis (%) | | | |
|---|---|---|---|---|---|---|---|---|---|
| | | | | | | Total | Pyrite | Sulfate | Organic |
| 20221113 | 12565 | 12846 | 14482 | 2.19 | 11.30 | 4.23 | 0.85 | 0.15 | 3.23 |
| 20221114 | 12556 | 12810 | 14417 | 1.99 | 11.15 | 4.16 | 0.78 | 0.14 | 3.24 |
| 20221115 | 12818 | 13080 | 14553 | 2.00 | 10.12 | 4.22 | 0.95 | 0.12 | 3.15 |
| 20221116 | 12182 | 12428 | 14415 | 1.98 | 13.78 | 4.31 | 1.02 | 0.14 | 3.15 |
| 20221117 | 12711 | 12970 | 14475 | 2.00 | 10.40 | 4.12 | 0.81 | 0.12 | 3.19 |
| 20221118 | 12627 | 12886 | 14562 | 2.01 | 11.51 | 4.32 | 0.92 | 0.13 | 3.27 |
| 20731110 | 14074 | 14334 | 14895 | 1.82 | 3.77 | 2.19 | 0.41 | 0.08 | 1.70 |
| 20731111 | 12361 | 13120 | 14624 | 1.97 | 10.29 | 3.97 | 1.29 | 0.13 | 2.55 |
| Average | 12736.75 | 13059 | 14553 | 2.00 | 10.29 | 3.94 | 0.88 | 0.13 | 2.94 |

TABLE 2

International Coal, Processed:

| SL # | BTU/lb As Rec. | BTU/lb Dry Basis | BTU/lb M-A Free | Moisture (%) | Ash (%) | Sulfur Content, Dry Basis (%) | | | |
|---|---|---|---|---|---|---|---|---|---|
| | | | | | | Total | Pyrite | Sulfate | Organic |
| 20731112 | 14537 | 14659 | 14995 | 0.83 | 2.24 | 1.86 | 0.21 | <0.01 | 1.65 |
| 20731113 | 14104 | 14303 | 14673 | 1.40 | 2.52 | 1.84 | 0.11 | 0.01 | 1.72 |
| 20731114 | 13981 | 14267 | 14927 | 2.01 | 4.42 | 2.20 | 0.39 | 0.07 | 1.74 |
| 20731115 | 14064 | 14185 | 14790 | 0.85 | 4.09 | 2.11 | 0.33 | 0.05 | 1.73 |
| 20925107 | 13888 | 14090 | 14738 | 1.44 | 4.39 | 3.10 | 0.84 | 0.27 | 1.99 |
| 20925108 | 13805 | 14132 | 14766 | 2.31 | 4.29 | 1.93 | 0.21 | 0.02 | 1.70 |
| 20925109 | 14309 | 14479 | 14926 | 1.17 | 3.00 | 1.93 | 0.25 | 0.03 | 1.65 |
| Average | 14098 | 14302 | 14831 | 1.43 | 3.56 | 2.14 | 0.33 | 0.08 | 1.74 |
| Difference | 1362 | 1243 | 278 | (0.57) | (6.73) | (1.80) | (0.54) | (0.05) | (1.20) |

International Coal Processing Detail

Table 2 lists Standard Laboratories (SL) test results for processed coals. These initial process tests were used to determine characteristic responses of these coals to process parameters. A small kitchen-sized electromagnetic-radiation chamber was used with low electomegnetic power (1000 watts and below) and relatively small samples (two to five pounds). Every one of our laboratory first process tests on a "new" coal was conducted in this manner.

In the initial processing, generally, coals of different sizes, coloring, etc., were selected to examine their separate responses and effects, if any, on their post-processing properties. In the tests delineated here, each sample batch was also divided into sections, some piled high and some in a flat layer, and the sections were placed on or in different holding vessels, made, e.g., of Pyrex™; alternatively, the vessels can be high-temperature ceramic plates, aluminized pans, or formed of other high-temperature materials. The locations of the vessels were varied in the chamber; also varied was the applied electromagnetic power and duty cycles (power on and off times). Seperate testing was performed on fines, mediumto-large chunks, and some well-mixed samples, ect., to examine each of their separate and combined effects. In the following, each and every step in the process sequence for the first four Table 2 samples is listed together with comments and observations.

Samples 731112 and 20731113 (Reference Table 2)

These samples consisted entirely of small to medium chunks prior to processing. Transparent tubing was connected to a chamber exit port to carry away liquids and gases, but no forced below was used in processing these samples, only chamber atmosphere temperature/pressure buildup, which forced by-products out of the chamber.

The process sequence for the original sample is outlined as follows:

TABLE 3

| Power Level | Time (minutes) | Notes |
|---|---|---|
| 5 | 1 | Unless otherwise noted, the power is turned off for 10 seconds after each time listed, except for chamber-open periods. |
| 8 | 2 | Yellow vapor seen in chamber at 1 min but no moisture in chamber or in tubing. Thick vapor cloud seen at 1 min 40 sec. Too much heat; shut down to reset power to lower level. |
| 5 | 1 | Yellow-tinted vapor seen at 30 sec; no moisture evident. |
| 5 | 2 | Tubing filling with yellow-tinted fumes. |
| 5 | 2 | Heavy fume flow. |
| 6 | 1 | |
| 6 | 1 | |
| 6 | 2 | Some condensation forming in tubing. |
| 6 | 2 | Very heavy fuming, with strong yellow color and sulfur smell. |
| 6 | 2 | Brown tint to the residue collecting on the under side of the exit tubing. |
| 6 | 2 | |
| 6 | 2 | Cracking sound heard in chamber and darker yellow fumes seen flowing in the tubing. |
| 6 | 2 | Open chamber to observe. Coals hot and chamber full of fumes. |
| 6 | 2 | Fumes pouring out of the chamber. Stop at 1 min 20 sec. No moisture in chamber but dark brown colored residue throughout chamber, probably the start of hydrocarbon release. End processing tests. |

(1) Power level (1) in the process chamber system ranges from 1 to 10, 10 corresponding to the highest power level available (approximately 1000 watts) but with levels not precisely linear, especially at the higher levels.

The above process sequence was applied to a single sample, which was divided into two equal-sized parts ('1112 and '1113) before being sent to Standard Laboratories for testing. SL test data are given in Table 2, which documents the fact that the percentages of ash and sulfur were both reduced by more than 50% in this test set. The differences in properties of the two processed sample portions are well within acceptable limits, especially since sample placement and other conditions were varied, as noted above, and this was a first and defining test of this coal batch. The total exposure time of 24 minutes relates to the sample size, power levels applied, and the observed amounts and coloring of the fumes during and following processing.

Samples 20731114 and 20731115 consisted entirely of tiny pieces to fine granules, which were placed on two ceramic plates from ½ to ¾ inches high, a flat plate near the wall closest to the magnetron and a rounded plate near the opposite wall.

TABLE 4

| Power Level | Time (minutes) | Notes |
|---|---|---|
| 2 | 1 | Power levels intentionally set lower than the above test set. |
| 2 | 1 | |
| 2 | 2 | |
| 2 | 2 | |
| 2 | 2 | |
| 3 | 1 | |
| 3 | 2 | Slight cloudiness observed in tubing. |
| 3 | 2 | |
| 4 | 2 | |
| 4 | 2 | |
| 4 | 2 | Some condensation now visible in tubing. Stopped to open chamber at 24 minutes accumulated exposure (to compare with the above tests using higher power levels). No moisture and no fumes present, chamber air temperature and coat surfaces warm but not hot. Observed appearance and fuming amount definitely depend on coal chunk sizes, placement and distribution, duty cycle and time. Fumes start to exit from the tubing. |
| 5 | 1 | |
| 5 | 1 | More fumes observed. |
| 5 | 1 | Top cover of chamber hot to the touch; reset to lower power. |
| 4 | 1 | |
| 4 | 2 | |
| 4 | 2 | Stop processing to observe. Chamber interior filled with fumes, but no moisture on chamber walls and no hydrocarbon coloring and coals only warm and not hot. |
| 4 | 2 | Fumes observed after 1 min 40 sec. |
| 4 | 2 | Fumes throughout chamber and tubing. |
| 4 | 2 | |
| 4 | 2 | |
| 4 | 2 | |
| 4 | 2 | |
| 4 | 2 | Still no browning on tubing. |
| 4 | 2 | Stop to open chamber. Some fuming but no browning. |
| 4 | 2 | |
| 4 | 2 | |
| 4 | 2 | |
| 4 | 2 | |
| 4 | 2 | Stop to open chamber. Removed a tiny piece that appeared to have overheated. |
| 4 | 2 | |
| 5 | 1 | Fuming resumed quickly. |
| 5 | 1 | |
| 5 | 1 | |
| 5 | 1 | |
| 5 | 1 | |
| 5 | 1 | Stop to open chamber. Full of yellow fumes. |
| 5 | 1 | No fumes. |
| 5 | 1 | Fuming resumes. |
| 5 | 9 | consecutive 1 minutes on, 10 sec off segments, with chamber opened after the 9th segment. |
| 5 | 2 | Heavy fuming. Stop to remove round plate contents after 79 minutes accumulated exposure (sample 1114) and continue with flat plate (sample 1115) alone. |
| 4 | 2 | Yellow fuming resumes. |
| 4 | 2 | Stop to open chamber. Small piece closest to magnetron fuming heavily. |
| 4 | 2 | Stop again and move plate toward center of chamber. |
| 4 | 2 | |
| 4 | 2 | Cracking noise from ceramic plate, which overheated and cracked. |
| 5 | 1 | |
| 5 | 2 | No fuming observed in or from the tubing. |
| 7 | 1 | |
| 7 | 1 | Fuming from the tubing. |
| 7 | 1 | Continued fuming. |

TABLE 4-continued

| Power Level | Time (minutes) | Notes |
|---|---|---|
| 7 | 1 | Heavy fuming in chamber and tubing. More cracking noises. Stopped to open chamber. Multiple cracks in ceramic plate. Stopped test run after 96 min accumulated exposure for sample 1115. |

Most often, fracturing occurs first in processing, followed by release of moisture, ash, and sulfur in that order. For this international coal, sulfur release appeared to precede that of moisture, but the low percentage of moisture in this coal could have masked small amounts of moisture that may have been released first.

Comparison of Properties:

Samples '1112 and '1113 evidence significantly larger reductions in percent ash and total sulfur than those obtained for samples '1114 and '1115. The improved reduction in ash and sulfur is directly attributable to the use of higher power levels (5 to 6, producing approximately 600 to 700 watts) and therefore shorter exposure times for '1112 and '1113. Reference the lower power used (mostly 4's and 5's) with '1114 and '1115 and the significantly longer exposure times that still did not achieve reductions close to those for the first two samples listed. All such test measurements have shown that every coal is highly sensitive to applied power; i.e., each has a power threshold at which significant and sometimes sudden changes are observed. After these thresholds are identified for coal, combinations of processing parameters can then be tested to identify parameter combinations that will achieve those thresholds. The process for that coal can then be governed to target those thresholds by utilizing the identified parameter combinations.

Variation of Power and Time Parameters:

The tests outlined below were performed on Texas lignites. The intent with these tests was to show that it is possible to fine-tune the amount of moisture reduction and resulting BTU/lb by using several combinations of applied electromagnetic power and processing dwell time in the chamber.

The processed value sought for BTU/lb was intentionally started above the high 7000's goal and was brought down to just below 8000 BTU/lb in controlled steps by small variations in power and time, starting with 8381 BTU/lb and 26.11% moisture and ending up with 7926 BTU/lb and 23.21% moisture. As seen in Table 5, below, the power/time parameters of 5/70 set the bar too high, with a BTU/lb decrease able to be obtained by using the same power but processing for an additional 50 seconds (recall that each line of data in the Table corresponds to a different sample from the same batch (A) lignite). Since time is always of the essence in processing, the next adjustment increased power and decreased time, with the expected result that an additional decrease was obtained in BTU/lb. The following two samples were processed with the same power/time settings, while decreasing the time still further and making the appropriate "balanced" increase in power applied. The differences in the results of these two samples (30728125 and 30728126) are well within acceptable ranges when processing different samples and further shows the internal consistency of the process methodology. Finally, the same forward power level, (see below) was used on the last sample, but processing was extended an additional five seconds, whereby the targeted BTU/lb was obtained.

TABLE 5

(lignite, E):

| SL # Representative E (Processed) | Btu/lb As Rec. | % Change | Moisture | % Change | Power (kW) | Time Processed (sec.) |
|---|---|---|---|---|---|---|
| Raws Avg | 7294 | | 36.35 | | | |
| 30728122.00 | 8381 | 14.9 | 26.11 | (28.17) | 5 | 70 |
| 30728123.00 | 8278 | 13.49 | 22.42 | (38.32) | 5 | 120 |
| 30728124.00 | 8151 | 11.75 | 22.86 | (37.11) | 10 | 45 |
| 30728125.00 | 8074 | 10.69 | 24.27 | (33.23) | 20 | 10 |
| 30728126.00 | 8016 | 9.9 | 25.9 | (28.75) | 20 | 10 |
| 30728127.00 | 7926 | 8.66 | 23.21 | (36.15) | 20 | 15 |

The Table 5 examples are given to show how two of the principal process parameters alone can be used to target specific properties for BTU/lb and percent moisture. It is important to note that we had measured and processed these same lignite batches in our laboratory systems earlier and therefore had prior knowledge of their properties and their responses to multi-parameter electromagnetic-radiation processing. With this information, we were able to pinpoint those changes that could be expected from changes due only to power and time. A similar methodology can be used in a lab or field setting for each of the designated properties being sought prior to any coal's being processed on a commercial scale.

An example wherein a methodology similar to that used in the tests reported in Table 5 is given in the time-power comparison provided in Table 6, below. Eleven separate samples from the same batch of lignite, labeled "A," were processed with all process parameters held constant except for applied electromagnetic power and time processed. The intent for the user of this lignite was to target a reduction in percent moisture of between 8% and 12% and a corresponding increase in BTU/lb to the high 7000's. For two of the 11 processed samples, 30728111 and '119, the BTU/lb value was significantly different (lower) than the other samples, with the first sample also having the highest percent moisture. The first test set combination of 5 kW and 30 seconds was clearly too small to achieve the desired moisture reduction for that sample, which was also evident in the relatively small amount of water vapor seen exiting the process chamber during its processing. The table presents the results of using various combinations of power and time with all other combinations except one of the 20/15's providing the levels sought. Three sets of samples, '113/'114 and '115/'1116 and '119/'120/'121, made use of exactly the same process parameters, including power and time. The differences in properties among the samples in each of these sets can be attributed to differences in the inherent properties of the samples themselves and not to differences due to the processing.

TABLE 6

(lignite, A):

| SL# Representative | Btu/lb As Rec. | Btu/lb % Change | Moisture % | Moisture % Change | Power (kW) | Time Processed (sec.) |
|---|---|---|---|---|---|---|
| Raws Avg. Processed: | 6356 | | 36.05 | | | |
| 30728111.00 | 6913 | 8.76 | 32.90 | (8.74) | 5 | 30 |
| 30728112.00 | 7662 | 20.55 | 22.47 | (27.76) | 5 | 120 |

TABLE 6-continued (lignite, A):

| SL# Representative | Btu/lb As Rec. | Btu/lb % Change | Moisture % | Moisture % Change | Power (kW) | Time Processed (sec.) |
|---|---|---|---|---|---|---|
| 30728113.00 | 8307 | 30.70 | 23.16 | (35.76) | 5 | 90 |
| 30728114.00 | 7977 | 25.50 | 27.13 | (24.74) | 5 | 90 |
| 30728115.00 | 8177 | 28.65 | 24.51 | (32.01) | 10 | 45 |
| 30728116.00 | 8034 | 26.40 | 24.42 | (32.26) | 10 | 45 |
| 30728117.00 | 8189 | 28.84 | 25.08 | (30.43) | 20 | 17 |
| 30728118.00 | 7948 | 25.05 | 25.26 | (29.93) | 20 | 9 |
| 30728119.00 | 7243 | 13.96 | 21.41 | (40.61) | 20 | 15 |
| 30728120.00 | 7905 | 24.37 | 23.90 | (33.70) | 20 | 15 |
| 30728121.00 | 8121 | 27.77 | 23.54 | (34.70) | 20 | 15 |
| Averages (all) | 7861 | 24.89 | | | | |
| Avgs. (less 111) | 7956 | 24.09 | | | | |

TABLE 7

(lignite, F):

| SL # | Btu/lb As Rec. | Btu/lb % Change | Moisture | Moisture % Change | Power (kW) | Time Processed (sec) |
|---|---|---|---|---|---|---|
| Raws Avg Processed: | 6849 | | 32.97 | | | |
| 30728128 | 8517 | 24.35 | 19.88 | (39.70) | 10 | 45 |
| 30728129 | 8545 | 24.76 | 20.76 | (37.03) | 20 | 15 |
| 30728130 | 8280 | 20.89 | 18.43 | (44.10) | 20 | 15 |
| 30728131 | 8838 | 29.04 | 12.97 | (60.66) | 20 | 30 |
| 30728132 | 9854 | 43.88 | 4.74 | (85.62) | 5 | 300 |
| 30728133 | 10318 | 50.65 | 6.28 | (80.95) | 5 | 300 |
| 30728134 | 10210 | 49.07 | 7.81 | (76.31) | 30 | 15 |

These results indicate clearly in still another way that the capacity in the process methodology to vary process parameters can effectively be used to target a specific reduction in moisture and a resulting relatively narrow range of BTU/lb even for a coal batch (every coal batch) with samples having a distribution of sizes and properties. Further, the results show that a relatively small test set can identify the variety of power/time combinations that can be used to obtain the desired properties. Finally, with straightforward preprocessing tests one can also assess the amount of ash and sulfur in the raw coals and how a particular coal will react to the process, the result being that the system can, if desired, improve the overall combustion properties of coal by more than just reducing moisture.

Any attempt to conduct meaningful laboratory tests requires consideration of sample size, chamber size and configuration, available electromagnetic power and its frequency or frequencies, the ability to vary power and duty cycle, stability and reproducibility of the laboratory system, and at least an estimate of the actual electromagnetic power incident on the coal surface. Laboratory tests, such as those shown here, can provide the basic pre-processing coal-response input data required to custom-design an overall process system capable of targeting and obtaining specific coal properties.

Table 8, below, provides a list of moisture, sulfur, ash, and Emissions Index reductions, as well as increases in BTU/lb for a wide variety of coals processed by methods of this disclosure.

TABLE 8

| Sample | Raws, % M | Proc, % M | % M Redn | % S Redn | % Ash Redn | Raws, BTU/lb | Proc, BTU/lb | % Incr BTU/lb | % Redn, E I |
|---|---|---|---|---|---|---|---|---|---|
| IL1 | 47.87 | 44.32 | 07 | ND | ND | 5851 | 6269 | 07 | ND |
| IL2 | 52.92 | 46.94 | 11 | ND | ND | 5363 | 5949 | 11 | ND |
| PRB1 | 26.10 | 22.46 | 14 | NA | 14 | 8960 | 9608 | 07 | 05 |
| TL1 | 36.05 | 29.22 | 19 | ND | ND | 6356 | 7788 | 22 | ND |
| WY1 | 21.65 | 17.05 | 21 | 05 | 06 | 10251 | 11345 | 11 | 10 |
| WY2 | 20.16 | 15.66 | 22 | 10 | 18 | 10232 | 11431 | 12 | 16 |
| I B1 | 2.00 | 1.43 | 29 | 46 | 67 | 12737 | 14096 | 11 | 51 |
| TL2 | 36.05 | 24.89 | 31 | ND | ND | 6356 | 7861 | 24 | ND |
| WY3 | 20.16 | 11.45 | 33 | 10 | 13 | 10232 | 11537 | 13 | 24 |
| I B2 | 2.15 | 1.10 | 48 | 37 | 61 | 12969 | 14326 | 09 | 05 |
| TL3 | 36.35 | 17.44 | 52 | NC | NA | 7294 | 7722 | 06 | 05 |
| PA | 3.36 | 1.35 | 60 | 21 | 08 | 13792 | 13991 | 01 | 21 |
| PRB2 | 26.10 | 8.69 | 67 | 12 | NA | 8960 | 11129 | 24 | 28 |
| IL3 | 25.58 | 8.16 | 68 | 68 | 25 | 8195 | 11282 | 38 | 76 |
| WY4 | 20.16 | 5.81 | 71 | 07 | 13 | 10232 | 12254 | 20 | 22 |
| OB | 3.40 | 0.89 | 74 | 47 | 26 | 12537 | 13442 | 07 | 51 |
| TL4 | 32.97 | 6.28 | 81 | 12 | NA | 6849 | 10127 | 48 | 42 |
| TL5 | 38.30 | 4.99 | 87 | 34 | 09 | 7266 | 11040 | 52 | 57 |
| PRB3 | 26.10 | 2.86 | 89 | 12 | 10 | 8960 | 11916 | 33 | 28 |
| ILPC | 6.49 | 0.69 | 89 | 02 | NC | 14365 | 15196 | 06 | 07 |
| OK | 3.96 | 0.42 | 89 | 04 | 04 | 13871 | 14377 | 14 | 07 |
| AL | 14.89 | 1.34 | 91 | NC | 20 | 12247 | 14112 | 15 | 14 |

Identification of Abbreviations in Table 8:

| | |
|---|---|
| M, S | Moisture, Sulfur |
| Proc | Processed |
| Redn | Reduction |
| Inc | Increased |
| E I | Emissions Index; LbSO$_2$/MMBTU |
| ND | No Data or Insufficient Data |
| NA | Not Applicable |
| NC | No Appreciable Change |
| IL1 | India Neyveli (SW) Lignite |
| IL2 | India Neyveli (SW) Lignite |
| IL3 | India Gujarat (NW) Lignite |
| IB | India Assam (NE) Bituminous |
| WY | Wyoming Sub-Bituminous |
| PA | Pennsylvania (NW) Bituminous |
| PRB | Wyoming Powder River Basin Sub-Bituminous |
| OB | Ohio (SE) Bituminous |
| TL | East Texas Lignite |
| ILPC | Illinois Green Pet Coke |
| OK | Oklahoma Bituminous |
| AL | Alabama Soft Bituminous |

In describing embodiments of the invention, specific terminology is used for the sake of clarity. For purposes of description, each specific term is intended to at least include all technical and functional equivalents that operate in a similar manner to accomplish a similar purpose. For example, references herein to microwaves should also be interpreted to include somewhat lower frequencies that may technically be characterized as radiowaves, provided those frequencies similarly affect the solid-fuel samples. Likewise, references are generally made to coal, though these methods also apply to other solid organic fuels. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various other changes in form and details may be made therein without departing from the scope of the invention.

What is claimed is:

1. A method comprising:
   receiving a raw solid fuel;
   receiving a desired end condition of the raw solid fuel;
   determining a duration and a power level of a microwave emission for each of a series of microwave generators based on the desired end condition; and
   sequentially irradiating the raw solid fuel with the microwave emissions from the series of microwave generators at the determined power levels for the determined durations, thereby processing the raw solid fuel to the desired end condition,
   wherein said determining of the duration and the power level of the microwave emission for each of a series of microwave generators is changed based on a measurement of one or more properties of the raw solid fuel during said processing.

2. The method of claim 1, wherein the raw solid fuel includes coal.

3. The method of claim 1, wherein the raw solid fuel is in a chamber during irradiation, the method further comprising flowing an inert gas through the chamber during irradiation.

4. The method of claim 3, wherein the inert gas is nitrogen.

5. The method of claim 3, wherein the inert gas is argon.

6. The method of claim 3, further comprising:
   during irradiation, identifying a temperature of the raw solid fuel; and
   based on the identified temperature, causing a change in at least one of the power levels, the durations, a dwell time of the raw solid fuel in the chamber, and the flow of the inert gas through the chamber, so that the temperature remains below an ignition-threshold temperature.

7. The method of claim 1, wherein the desired end condition includes a desired moisture content.

8. The method of claim 7, wherein the desired end condition further includes a desired ash content.

9. The method of claim 1, wherein the desired end condition includes at least one of a desired moisture content and a desired ash content.

* * * * *

UNITED STATES PATENT AND TRADEMARK OFFICE
CERTIFICATE OF CORRECTION

PATENT NO. : 7,901,473 B2  
APPLICATION NO. : 11/009301  
DATED : March 8, 2011  
INVENTOR(S) : Jerry L. Weinberg et al.

It is certified that error appears in the above-identified patent and that said Letters Patent is hereby corrected as shown below:

Please replace figures 1 – 16 with the figures attached hereto, on the pages marked "replacement sheets".

Signed and Sealed this  
Twenty-second Day of May, 2012

David J. Kappos  
*Director of the United States Patent and Trademark Office*

PROCESS SYSTEM ELEMENTS

UNITED STATES PATENT AND TRADEMARK OFFICE
CERTIFICATE OF CORRECTION

| | |
|---|---|
| PATENT NO. | : 7,901,473 B2 |
| APPLICATION NO. | : 11/009301 |
| DATED | : March 8, 2011 |
| INVENTOR(S) | : Jerry L. Weinberg et al. |

It is certified that error appears in the above-identified patent and that said Letters Patent is hereby corrected as shown below:

Delete the title page and substitute therefore the attached title page consisting of the corrected illustrative figure.

Please replace figures 1 – 16 with the figures attached hereto, on the pages marked "replacement sheets".

This certificate supersedes the Certificate of Correction issued May 22, 2012.

Signed and Sealed this
Nineteenth Day of June, 2012

David J. Kappos
*Director of the United States Patent and Trademark Office*

(12) United States Patent
Weinberg et al.

(10) Patent No.: US 7,901,473 B2
(45) Date of Patent: Mar. 8, 2011

(54) PRE-BURNING, DRY PROCESS METHODOLOGY AND SYSTEMS FOR ENHANCING SOLID FUEL PROPERTIES

(75) Inventors: Jerry L. Weinberg, Gainesville, FL (US); Neil E. Ginther, Jenks, OK (US); Jed A. Aten, Covington, GA (US); Ru T. Wang, Gainesville, FL (US)

(73) Assignee: CoalTek, Inc., Tucker, GA (US)

(*) Notice: Subject to any disclaimer, the term of this patent is extended or adjusted under 35 U.S.C. 154(b) by 1326 days.

(21) Appl. No.: 11/009,301

(22) Filed: Dec. 10, 2004

(65) Prior Publication Data
US 2005/0160667 A1    Jul. 28, 2005

Related U.S. Application Data

(60) Provisional application No. 60/529,204, filed on Dec. 12, 2003.

(51) Int. Cl.
*C10L 5/00* (2006.01)

(52) U.S. Cl. .......... 44/620; 44/626; 44/627; 44/903; 44/904

(58) Field of Classification Search .......... 44/620, 44/626, 903, 904
See application file for complete search history.

(56) References Cited

U.S. PATENT DOCUMENTS

| | | | |
|---|---|---|---|
| 3,954,674 A | 5/1976 | Reis | 252/502 |
| 4,076,607 A * | 2/1978 | Zavitsanos et al. | 204/157.43 |
| 4,123,230 A | 10/1978 | Kirkbride | 44/1 R |
| 4,148,614 A | 4/1979 | Kirkbride | 44/1 R |
| 4,152,120 A | 5/1979 | Zavitsanos et al. | 44/622 |
| 4,259,560 A | 3/1981 | Rhodes | 219/678 |
| 4,280,033 A | 7/1981 | Wagener et al. | 219/700 |
| 4,282,066 A | 8/1981 | Wagener et al. | 201/6 |
| 4,365,975 A | 12/1982 | Williams et al. | 48/197 R |
| 4,376,034 A | 3/1983 | Wall | |
| 4,408,999 A | 10/1983 | Nadkarni et al. | 44/627 |
| 4,678,478 A | 7/1987 | Kelland | 44/1 SR |
| 5,055,180 A | 10/1991 | Klaila | 208/402 |
| 5,393,311 A | 2/1995 | Marhanka | 44/622 |
| 5,873,982 A * | 2/1999 | Yoshimura et al. | 204/157.15 |

(Continued)

FOREIGN PATENT DOCUMENTS

| | | |
|---|---|---|
| DE | 29 07 886 A1 | 9/1980 |
| DE | 31 21 050 A1 | 12/1982 |
| DE | 32 34 315 A1 | 3/1984 |
| RU | 2096354 | 11/1997 |
| RU | 2156969 | 9/2000 |

(Continued)

OTHER PUBLICATIONS

International Preliminary Report on Patentability for PCT/US2004/041786, mailed Dec. 6, 2005.

(Continued)

*Primary Examiner* — Cephia D Toomer
(74) *Attorney, Agent, or Firm* — Strategic Patents, P.C.

(57) ABSTRACT

Measurements are taken of moisture, BTU/lb (British Thermal Units per pound), ash, forms of sulfur, volatile material, grindability, and absorption properties of any of a wide variety of mine-run solid fuels. Using that information, a dry electromagnetic process technology has been developed that can be controlled and monitored to selectively alter and enhance solid fuel properties for the application in question. Specific changes include altering the mechanical structure and chemical composition of solid fuels such as coal, coal coke or petroleum coke, increasing the BTU/lb to optimum levels, decreasing all forms of sulfur, and decreasing ash, while maintaining the BTU/lb of the fuels. A new family of solid fuel designer coals not found in nature can be produced via these methods and apparatus.

9 Claims, 12 Drawing Sheets

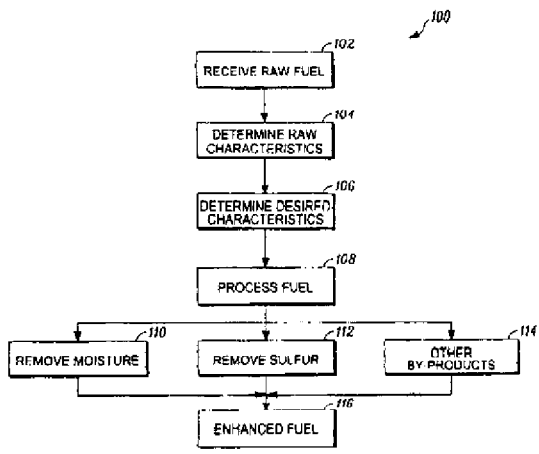

HANDLING AND PROCESSING

HANDLING AND PROCESSING

PROCESS SYSTEM ELEMENTS